US012764439B2

(12) United States Patent
Lee et al.

(10) Patent No.: US 12,764,439 B2
(45) Date of Patent: Oct. 13, 2026

(54) IMAGE SENSOR DEVICE AND OPERATION METHOD THEREOF

(71) Applicant: Samsung Electronics Co., Ltd., Suwon-si (KR)

(72) Inventors: Minwoo Lee, Suwon-si (KR); Min-Sun Keel, Suwon-si (KR); Kyung-Min Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 250 days.

(21) Appl. No.: 18/400,213

(22) Filed: Dec. 29, 2023

(65) Prior Publication Data

US 2024/0422450 A1 Dec. 19, 2024

(30) Foreign Application Priority Data

Jun. 19, 2023 (KR) ........................ 10-2023-0077950

(51) Int. Cl.
*H04N 25/78* (2023.01)
*H04N 25/40* (2023.01)
(Continued)

(52) U.S. Cl.
CPC ............. *H04N 25/78* (2023.01); *H04N 25/40* (2023.01); *H04N 25/75* (2023.01); *H04N 25/772* (2023.01); *H04N 25/7795* (2023.01)

(58) Field of Classification Search
CPC ........ H04N 25/78; H04N 25/40; H04N 25/75; H04N 25/772; H04N 25/7795
See application file for complete search history.

(56) References Cited

U.S. PATENT DOCUMENTS 8,849,090 B2 9/2014 Kosakai et al.
9,100,514 B2 8/2015 Gu et al.
(Continued)

FOREIGN PATENT DOCUMENTS

JP 2012-023663 A 2/2012
KR 10-2017-0046391 A 5/2017
KR 10-2022-0098587 A 7/2022

OTHER PUBLICATIONS

Sony Semiconductor Solutions Corporation, Sony Semiconductor Solutions to Release Industry's First*1 CMOS Image Sensor for Security Cameras That Simultaneously Delivers Full-Pixel Output of Captured Images and High-Speed Output of Regions of Interest, https://www.sonysemicon.com/en/news/2022/2022072001.html, Jul. 2022, 9 pages.

(Continued)

*Primary Examiner* — Nicholas G Giles
(74) *Attorney, Agent, or Firm* — Muir Patent Law, PLLC

(57) ABSTRACT

Disclosed is an image sensor device which includes a first pixel located at a first row and a first column, corresponding to a first color filter, and outputting a first pixel signal through a first column line, a second pixel located at a second row different from the first row and the first column, corresponding to the first color filter, and outputting a second pixel signal through a second column line, and a conversion circuit receiving the first pixel signal through the first column line, receiving the second pixel signal through the second column line, and generating first image data and second image data based on the first pixel signal and the second pixel signal. The first pixel signal and the second pixel signal are respectively output through the first column line and the second column line simultaneously.

12 Claims, 38 Drawing Sheets

(51) Int. Cl.
*H04N 25/75* (2023.01)
*H04N 25/76* (2023.01)
*H04N 25/772* (2023.01)

(56) References Cited

U.S. PATENT DOCUMENTS

| | | | | |
|---|---|---|---|---|
| 11,252,348 | B2 | 2/2022 | Muraoka | |
| 11,290,670 | B2 | 3/2022 | Yoda | |
| 11,310,451 | B1 | 4/2022 | Ion et al. | |
| 2013/0089175 | A1 * | 4/2013 | Mo | H04N 25/616 377/49 |
| 2018/0295306 | A1 | 10/2018 | Cremers | |
| 2022/0141401 | A1 | 5/2022 | Kim et al. | |
| 2022/0217291 | A1 | 7/2022 | Kim et al. | |

OTHER PUBLICATIONS

Sony Semiconductor Solutions Corporation, Sony Semiconductor Solutions to Release Industry's First_1 CMOS Image Sensor for Security Cameras That Simultaneously Delivers Full-Pixel Output of Captured Images and High-Speed Output of Regions of Interest; https://www.sony.com/content/sony/en/en_us/SCA/companynews/press-releases/sony-electronics/2022/sony-smiconductorsolutions-to-release-industrys-first1-cmos-image-sensor-forsecurity-cameras-that-simultaneously-delivers-fullpixel-outputof-captured-images-and-highspeed-output-of-regions-ofinterest.html, Jul. 2022, 6 pages.

* cited by examiner

FIG. 5B
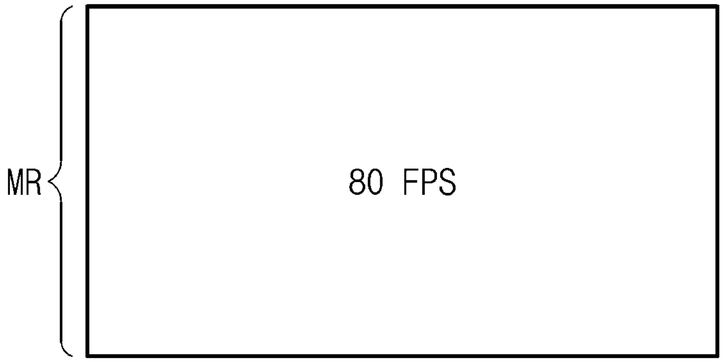
[Normal Mode]
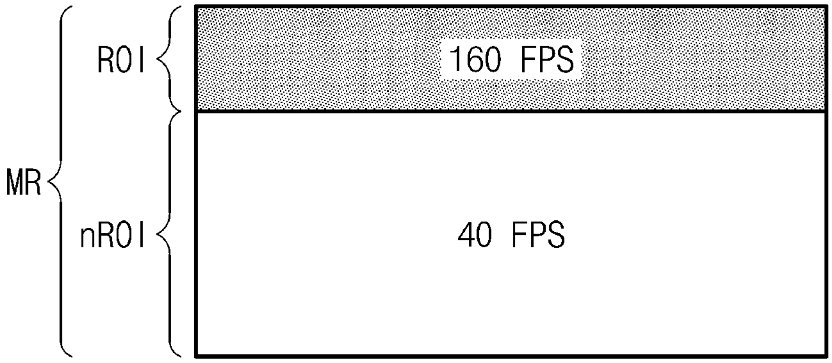
[ROI Mode]

[Readout on ROW1 for DT_M]
[Readout on ROW2 for DT_ROI]

[Readout on ROW2 for DT_M]
[Readout on ROW3 for DT_ROI]

[Readout on ROW3 for DT_M]
[Readout on ROW2 for DT_ROI]

[Readout on ROW4 for DT_M]
[Readout on ROW3 for DT_ROI]

[Readout on ROW2 for DT_M, DT_ROI]

FIG. 11B
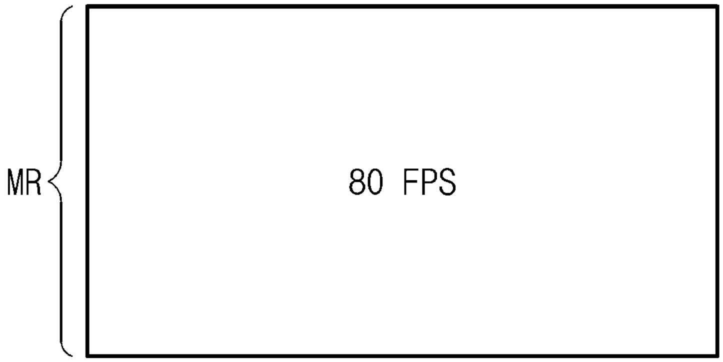
[Normal Mode]
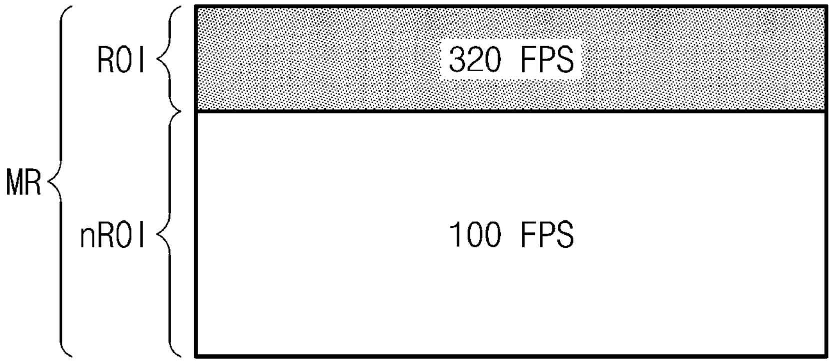
[ROI Mode]

[Readout on ROW1 for DT_M]
[Readout on ROW4 for DT_sub]

[Readout on ROW2 for DT_M]
[Readout on ROW1 for DT_sub]

[Readout on ROW3 for DT_M]
[Readout on ROW2 for DT_sub]

[Readout on ROW4 for DT_M]
[Readout on ROW3 for DT_sub]

[Readout on ROW2 or DT_M]
[Readout on ROW3 for DT_ROI]
[Readout on ROW1 for DT_sub]

FIG. 24

| Readout Mode | LPD-HCG | LPD-LCG | LPD-HCG | LPD-LCG | SPD-HCG | | SPD-LCG | |
|---|---|---|---|---|---|---|---|---|
| | RESET | RESET | SIGNAL | SIGNAL | RESET | SIGNAL | SIGNAL | RESET |
| HCG_ADC Operation | DT_M | - | DT_M | - | - | | LPD-HCG | |
| LCG_ADC Operation | - | DT_M | - | DT_M | LPD-HCG | | LPD-HCG | |

FIG. 25

| Readout Mode | LPD-HCG | | LPD-LCG | | SPD-HCG | | SPD-LCG | |
|---|---|---|---|---|---|---|---|---|
| | RESET | SIGNAL | SIGNAL | RESET | RESET | SIGNAL | SIGNAL | RESET |
| HCG_ADC Operation | DT_M | | DT_M | | DT_M | | DT_M | |
| LCG_ADC Operation | DT_ROI or DT_sub | | DT_ROI or DT_sub | | DT_ROI or DT_sub | | DT_ROI or DT_sub | |

IMAGE SENSOR DEVICE AND OPERATION METHOD THEREOF

CROSS-REFERENCE TO RELATED APPLICATIONS

This application claims priority under 35 U.S.C. § 119 to Korean Patent Application No. 10-2023-0077950 filed on Jun. 19, 2023, in the Korean Intellectual Property Office, the disclosure of which is incorporated by reference herein in its entirety.

BACKGROUND

Embodiments of the present disclosure described herein relate to an image sensor, and more particularly, relate to an image sensor device and an operation method thereof.

An image sensor obtains image information about an external object by converting a light reflected from the external object into an electrical signal. An electronic device that includes the image sensor may display an image in a display panel by using the obtained image information.

The image sensor may be mounted in various types of electronic devices. For example, the electronic device that includes the image sensor may be included as a component of various types of electronic devices such as a smartphone, a tablet personal computer (PC), a laptop PC, and a wearable device.

Nowadays, the image sensor supports various functions for providing various user experiences to the user. As an example, the image sensor may be mounted in an automated driving system and may provide various image information necessary for automated driving of the vehicle, such as an obstacle or a traffic signal in front of the vehicle. In this case, when the quality of an image obtained from the image sensor is reduced (e.g., when the quality of image is reduced due to a flicker phenomenon or motion blur), there may be a safety problem with the vehicle.

SUMMARY

Embodiments of the present disclosure provide an image sensor device with improved performance and an operation method thereof.

According to an embodiment, an image sensor device includes a first-pixel located at a first row and a first column, corresponding to a first color filter, and outputting a first pixel signal through a first column line, a second pixel located at a second row different from the first row and the first column, corresponding to the first color filter, and outputting a second pixel signal through a second column line, and a conversion circuit receiving the first pixel signal through the first column line, receiving the second pixel signal through the second column line, and generating first image data and second image data based on the first pixel signal and the second pixel signal. The first pixel signal and the second pixel signal are respectively output through the first column line and the second column line simultaneously.

According to an embodiment, an operation method of an image sensor device which includes a plurality of pixel rows includes performing a first readout operation on a first pixel row among the plurality of pixel rows, performing a second readout operation on a second pixel row different from the first pixel row from among the plurality of pixel rows, and generating first image data based on first pixel signals output by the first readout operation and generating second image data based on second pixel signals output by the second readout operation. The first readout operation and the second readout operation are simultaneously performed.

According to an embodiment, an operation method of an image sensor device which includes a plurality of pixel rows includes generating first image data associated with all the pixel rows based on a first frame rate, in a first operation mode, and generating second image data associated with some pixel rows among the plurality of pixel rows at a second frame rate and generating third image data associated with all the pixel rows at the first frame rate, in a second operation mode.

BRIEF DESCRIPTION OF THE FIGURES

The above and other objects and features of the present disclosure will become apparent by describing in detail embodiments thereof with reference to the accompanying drawings.

FIGS. 5A and 5B are a graph and a diagram for describing a range of interest (ROI) mode of an image sensor device.

FIGS. 11A and 11B are a graph and a diagram for describing an operation of an image sensor device of FIG. 2.

FIGS. 24 and 25 are diagrams for describing an operation of a conversion circuit according to a readout mode of an image sensor device of FIG. 23.

DETAILED DESCRIPTION

Below, embodiments of the present disclosure will be described in detail and clearly to such an extent that one of ordinary skill in the art may easily carry out the present disclosure.

Figure 1:
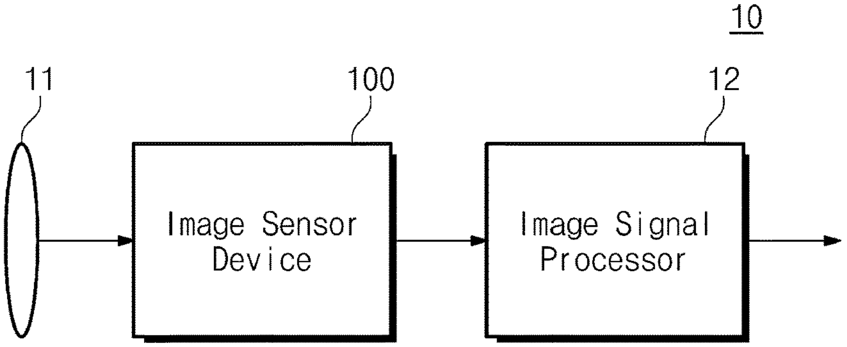
FIG. 1 is a diagram illustrating an image system according to an embodiment of the present disclosure.

FIG. 1 is a diagram illustrating an image system according to an embodiment of the present disclosure. Referring to FIG. 1, an image system 10 may include a lens 11, an image sensor device 100, and an image signal processor 12. In an embodiment, the image system 10 may be implemented as a part of various electronic devices such as a camera, a smartphone, a wearable device, an Internet of Things (IoT) device, home appliances, a tablet personal computer (PC), a personal digital assistant (PDA), a portable multimedia player (PMP), a navigation system, a drone, an advanced driver assistance system (ADAS), a traffic camera, and a CCTV. Also, the image system 10 may be installed in an electronic device that is provided as a part of a vehicle, furniture, manufacturing equipment, a door, and various kinds of measuring instruments.

The lens 11 may receive a light reflected from an external object. The image sensor device 100 may generate an electrical signal, based on the light received through the lens 11. For example, the image sensor device 100 may be implemented with a complementary metal oxide semiconductor (CMOS) image sensor. However, the present disclosure is not limited thereto. For example, the image sensor device 100 may be implemented based on various image sensors such as a dynamic vision sensor (DVS) and a digital pixel sensor (DPS).

The image signal processor 12 may receive an electrical signal (e.g., image data or output data including information about an external object or the front view) from the image sensor device 100 and may perform various image signal processing operations on the received signal. In an embodiment, the image signal processing operations may include various signal processing operations for improving the quality of image, such as a de-noising operation, a tone-mapping operation, a detail enhancing operation, a white balancing operation, a gamma correction operation, a de-mosaic operation, a sharping operation, and a color conversion operation.

In an embodiment, the image sensor device 100 may operate in various modes. For example, the image sensor device 100 may operate in a normal mode, a range of interest (ROI) mode, a sub-frame mode, or a complex mode. When the image sensor device 100 operates in the normal mode, the image sensor device 100 may be configured to output image data with a predefined frame rate. In this case, the image data may correspond to the entire area (or range) of a pixel array of the image sensor device 100. When the image sensor device 100 operates in the ROI mode, the image sensor device 100 may output image data associated with to the range of interest (or an interested range) of the entire area, at a frame rate relatively higher than the predefined frame rate. When the image sensor device 100 operates in the sub-frame mode, the image sensor device 100 may be configured to output a main frame and a sub-frame. When the image sensor device 100 operates in the complex mode, the image sensor device 100 may output the image data of the entire area, the image data of the range of interest, and the image data of the sub-frame. The above operation modes are provided only as an example, and the present disclosure is not limited thereto.

In an embodiment, the image sensor device 100 may output various image data through the operation modes described above. In this case, the image sensor device 100 according to an embodiment of the present disclosure may simultaneously perform the readout operations on at least two pixel rows and thus may output the image data of the entire area without the decrease in the frame rate. Accordingly, the performance of the image sensor device 100 may be improved. A structure and an operation of the image sensor device 100 according to an embodiment of the present disclosure will be described in detail with reference to the following drawings.

Figure 2:
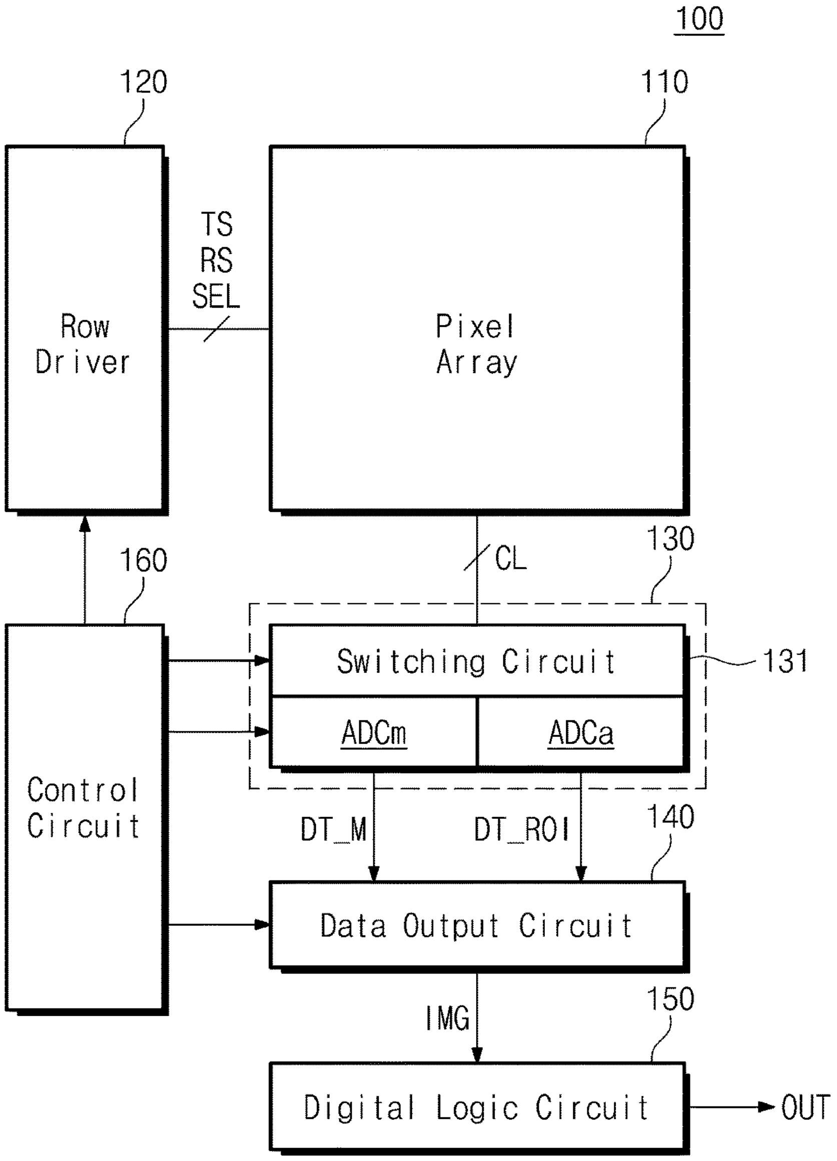
FIG. 2 is a block diagram illustrating an image sensor device of FIG. 1.

FIG. 2 is a block diagram illustrating an image sensor device of FIG. 1. Referring to FIGS. 1 and 2, the image sensor device 100 may include a pixel array 110, a row driver 120, a conversion circuit 130, a data output circuit 140, a digital logic circuit 150, and a control circuit 160.

The pixel array 110 may include a plurality of pixels arranged along rows and columns. The plurality of pixels may convert the light received from the outside into electrical signals in response to various control signals (e.g., a transfer signal TS, a reset signal RS, and a selection signal SEL) from the row driver 120 and may output the converted electrical signals through a plurality of column lines CL. In an embodiment, a row may indicate a pixel row in which a plurality of pixels are arranged, and a column may indicate a pixel column in which a plurality of pixels are arranged.

The row driver 120 may generate various control signals (e.g., TS, RS, and SEL) for controlling the plurality of pixels included in the pixel array 110. For example, the row driver 120 may generate the selection signal SEL for selecting pixels belonging to a selected row from among the plurality of pixels, the transfer signal TS for transferring charges to a floating diffusion node in each pixel of the selected row, and the reset signal RS for resetting the pixels of the selected row. The row driver 120 may provide the generated control signals (e.g., TS, RS, and SEL) to the plurality of pixels.

The conversion circuit 130 may be connected to the pixel array 110 through the plurality of column lines CL. The conversion circuit 130 may receive pixel signals from the plurality of pixels of the pixel array 110 through the plurality of column lines CL. The conversion circuit 130 may convert the received pixel signals into digital signals. For example, the conversion circuit 130 may include a switching circuit 131, a main analog-to-digital converter (ADCm), and an auxiliary analog-to-digital converter (ADCa). The switching circuit 131 may be configured to transfer the pixel signals received through the column lines CL to the main ADCm or the auxiliary ADCa. Each of the main ADCm and the auxiliary ADCa may convert the pixel signals received through the switching circuit 131 into digital signals. In an embodiment, the digital signals output from the main ADCm may constitute main data DT_M, and the digital signals output from the auxiliary ADCa may constitute data DT_ROI for the range of interest (hereinafter, referred to as "ROI data DT_ROI").

In an embodiment, the main data DT_M may indicate the image data corresponding to the entire area or all the rows captured by the pixel array 110 of the image sensor device 100. The ROI data DT_ROI may indicate the image data corresponding to a specific range of the entire area captured by the pixel array 110 of the image sensor device 100 or to specific rows among all the rows captured thereby. That is, the ROI data DT_ROI may correspond to a portion of the main data DT_M.

In an embodiment, each of the main ADCm and the auxiliary ADCa may include a ramp signal generator, a comparator, and a counter for the purpose of performing an operation of converting a pixel signal into a digital signal.

Below, for convenience, the description will be given as pixel signals are output from pixels or sub-pixels, but the present disclosure is not limited thereto. In an embodiment, the conversion circuit 130 may perform correlated double sampling (CDS) for the purpose of generating the main data DT_M or the ROI data DT_ROI. For example, the conversion circuit 130 may sample reset levels transferred through the plurality of column lines CL from the pixels of the selected row in the pixel array 110 and may then sample signal levels transferred through the plurality of column lines CL from the pixels of the selected row. The conversion circuit 130 may generate the main data DT_M or the ROI data DT_ROI based on differences between the sampled reset levels and the sampled signal levels. The "pixel signal" used in the specification may include the reset level and the signal level, and the main data DT_M and the ROI data DT_ROI may be generated by the conversion circuit 130 based on the CDS scheme.

The data output circuit 140 may output image data IMG based on the data DT_M and DT_ROI received from the conversion circuit 130. For example, the data output circuit 140 may include a plurality of memories, a sense amplifier, and a column decoder. The plurality of memories may temporarily store the data DT_M and DT_ROI received from the conversion circuit 130, and the sense amplifier may be configured to amplify the data stored in the plurality of memories. The column decoder may be configured to output the amplified data as the image data IMG. In an embodiment, the data output operation of the data output circuit 140 may be performed under control of the control circuit 160.

The digital logic circuit 150 may receive the image data IMG from the data output circuit 140. The digital logic circuit 150 may generate output data OUT by performing signal processing on the image data IMG. For example, the digital logic circuit 150 may perform signal processing on the image data IMG for high-dynamic range (HDR) implementation. Alternatively, the digital logic circuit 150 may be configured to perform at least some of various operations of the image signal processor 12.

Figure 3A:
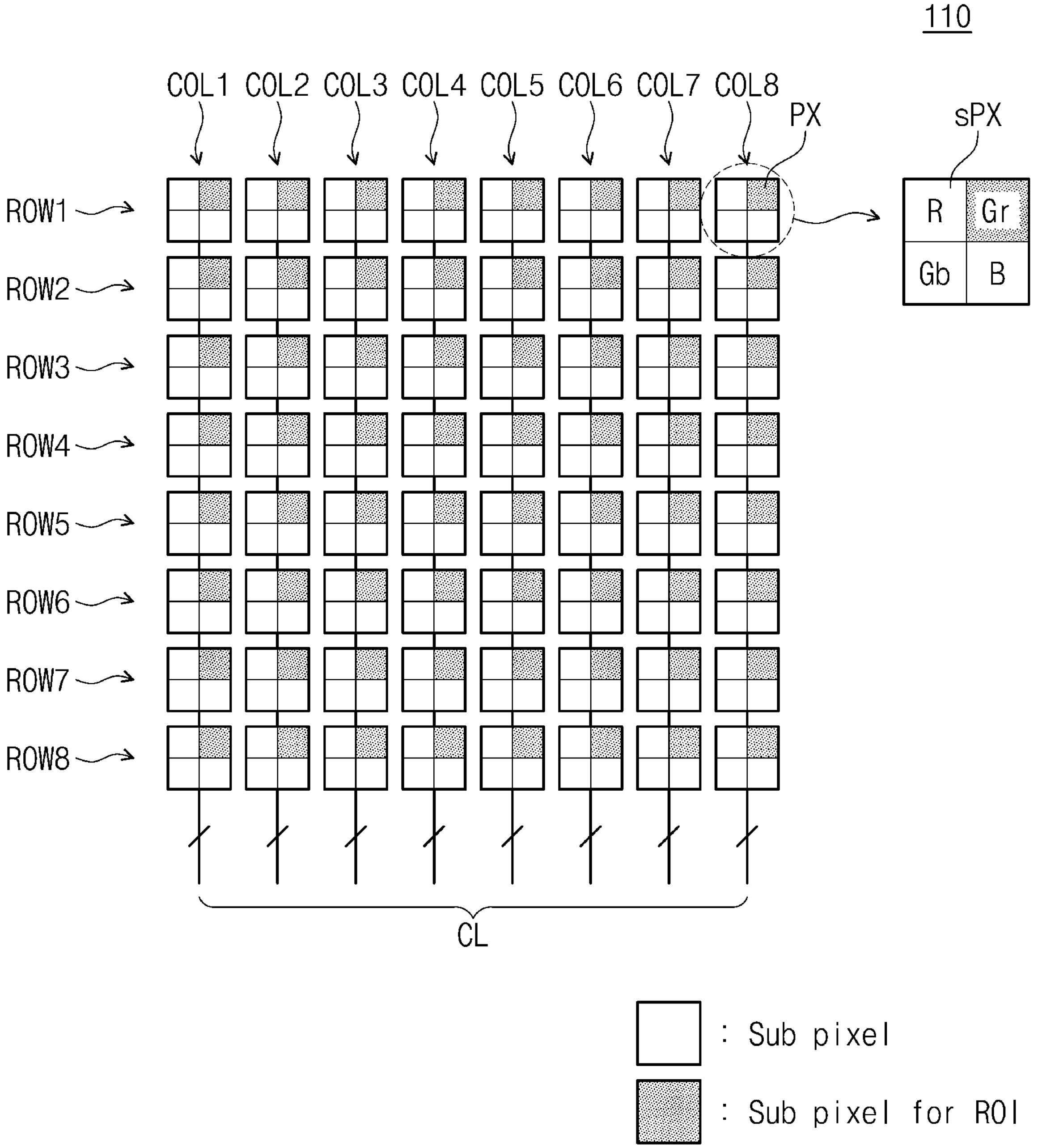
FIGS. 3A and 3B are diagrams illustrating a pixel array of FIG. 2.
Figure 3B:
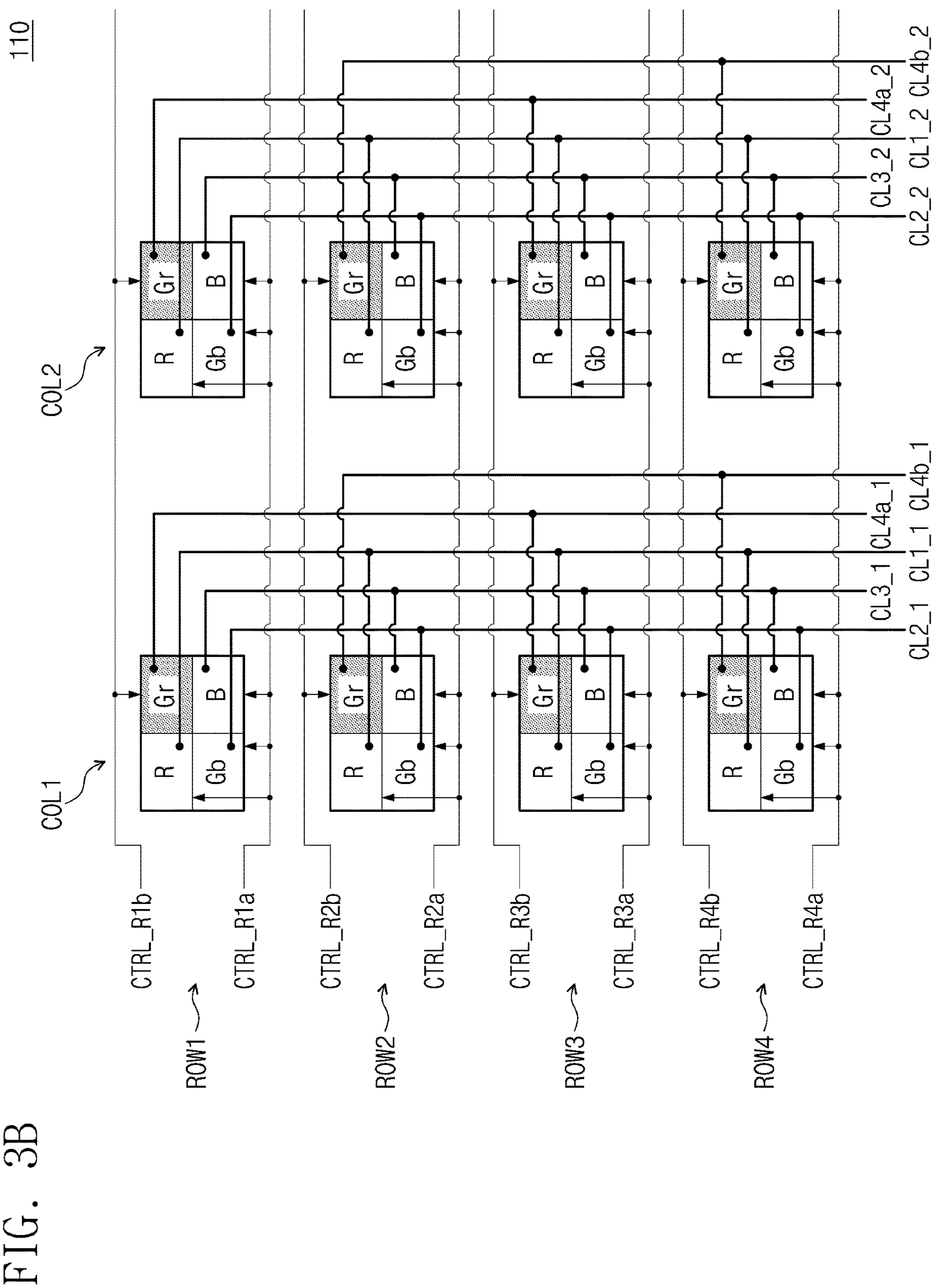

FIGS. 3A and 3B are diagrams illustrating a pixel array of FIG. 2. Referring to FIGS. 2 and 3A, the pixel array 110 may include a plurality of pixels PX. The plurality of pixels PX may be arranged along a plurality of rows ROW1 to ROW8 and a plurality of columns COL1 to COL8. For brevity of drawing, a partial configuration of the pixel array 110 is illustrated in FIGS. 3A and 3B, but the present disclosure is not limited thereto. The pixel array 110 may further include a plurality of pixels, which may be arranged along additional rows and additional columns.

In an embodiment, each of the plurality of pixels PX may include a plurality of sub-pixels sPX. Each of the plurality of sub-pixels SPX may include different color filters. For example, one pixel PX may include 4 sub-pixels sPX. The 4 sub-pixels sPX may respectively correspond to a red filter "R", a first green filter Gr, a second green filter Gb, and a blue filter "B".

In an embodiment, a sub-pixel corresponding to a specific filter from among the plurality of sub-pixels sPX may be used to generate the ROI data DT_ROI. For example, the sub-pixels sPX corresponding to the first green filter Gr may correspond to the range of interest ROI. In this case, the ROI data DT_ROI may be generated based on the pixel signals output from the sub-pixels corresponding to the first green filter Gr.

Below, for convenience of description, it is assumed that the color filters or a color filter array (CFA) of the plurality of pixels PX are formed to implement a Bayer pattern (RGBG). However, the present disclosure is not limited thereto. For example, the color filters or the color filter array of the plurality of pixels PX may be implemented in various patterns such as RCCB, RCCG, and RYYCy.

Below, for convenience of description, a sub-pixel corresponding to a specific color filter is referred to as a "specific color-sub-pixel (B/Gr/Gb/B-sub-pixel)". For example, a sub-pixel corresponding to the red filter "R" is referred to as an "R-sub-pixel", a sub-pixel corresponding to the blue filter "B" is referred to as a "B-sub-pixel", a sub-pixel corresponding to the first green filter Gr is referred to as a "Gr-sub-pixel", and a sub-pixel corresponding to the second green filter Gb is referred to as a "Gb-sub-pixel". However, the present disclosure is not limited thereto.

In an embodiment, the plurality of pixels PX or the plurality of sub-pixels sPX may respectively output the pixel signals through the plurality of column lines CL in response to a plurality of row control signals.

In an embodiment, the pixels PX or the sub-pixels sPX located at the same row may share the same row control signals. The pixels PX or the sub-pixels sPX located at the same column or corresponding to a color filter of the same type may be connected to the same column line CL.

In an embodiment, to generate the main data DT_M, the image sensor device 100 according to an embodiment of the present disclosure may read out the pixel signals from the plurality of pixels PX or the plurality of sub-pixels sPX; to generate the ROI data DT_ROI, the image sensor device 100 may read out the pixel signals from sub-pixels corresponding to the range of interest ROI (e.g., the Gr-sub-pixels located at rows corresponding to the range of interest ROI). To this end, the Gr-sub-pixels corresponding to the range of interest ROI may operate in response to row control signals different from those of sub-pixels located at the same row.

For example, as illustrated in FIG. 3B, the pixel array 110 may include 8 pixels PX. Each of the 8 pixels PX may include 4 sub-pixels sPX. The 4 sub-pixels sPX may respectively correspond to the red filter "R", the first green filter Gr, the second green filter Gb, and the blue filter "B". In this case, a sub-pixel corresponding to the first green filter Gr may be configured to output a pixel signal for generating the ROI data DT_ROI.

In this case, with respect to the sub-pixels R-sub-pixel, B-sub-pixel, and Gb-sub-pixel, the sub-pixels located at the first row ROW1 from among the 8 pixels PX may operate in response to a first row control signal CTRL_R1*a;* the sub-pixels located at the second row ROW2 from among the 8 pixels PX may operate in response to a second row control signal CTRL_R2*a;* the sub-pixels located at the third row ROW3 from among the 8 pixels PX may operate in response to a third row control signal CTRL_R3*a;* and the sub-pixels located at the fourth row ROW4 from among the 8 pixels PX may operate in response to a fourth row control signal CTRL_R4*a*. In this case, the Gr-sub-pixels located at the first row ROW1 may operate in response to a first row control signal CTRL_R1*b* different from the first row control signal CTRL_R1*a;* the Gr-sub-pixels located at the second row ROW2 may operate in response to a second row control signal CTRL_R2*b* different from the second row control signal CTRL_R2*a;* the Gr-sub-pixels located at the third row ROW3 may operate in response to a third row control signal CTRL_R3*b* different from the third row control signal CTRL_R3*a*; and the Gr-sub-pixels located at the fourth row ROW4 may operate in response to a fourth row control signal CTRL_R4*b* different from the fourth row control signal CTRL_R4*a*. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Sub-pixels that are located at the same column and correspond to the same color filter may be connected to the same column line. For example, in the sub-pixels located at the first column COL1, the R-sub-pixels may be connected to a 1_1-th column line CL1_1, the Gb-sub-pixels may be connected to a 2_1-th column line CL2_1, and the B-sub-pixels may be connected to a 3_1-th column line CL3_1. In the sub-pixels located at the second column COL2, the R-sub-pixels may be connected to a 1_2-th column line CL1_2, the Gb-sub-pixels may be connected to a 2_2-th column line CL2_2, and the B-sub-pixels may be connected to a 3_2-th column line CL3_2.

In an embodiment, even though the Gr-sub-pixels are located at the same column, the Gr-sub-pixels may be connected to different column lines. For example, some of the Gr-sub-pixels (e.g., the Gr-sub-pixels located at the first row ROW1 and the third row ROW3) located at the first column COLI may be connected to a 4a_1-th column line CL4*a*_1, and the others thereof (e.g., the Gr-sub-pixels located at the second row ROW2 and the fourth row ROW4) may be connected to a 4b_1-th column line CL4*b*_1. Some of the Gr-sub-pixels (e.g., the Gr-sub-pixels located at the first row ROW1 and the third row ROW3) located at the second column COL2 may be connected to a 4a_2-th column line CL4*a*_2, and the others thereof (e.g., the Gr-sub-pixels located at the second row ROW2 and the fourth row ROW4) may be connected to a 4b 2-th column line CL4*b*_2.

According to the structure of the pixel array 110 described with reference to FIGS. 3A and 3B, when the readout operation is performed with respect to pixels of a specific row to generate the main data DT_M, the readout operation may be performed with respect to pixels of any other row to generate the ROI data DT_ROI.

For example, the readout operation may be performed with respect to the first row ROW1 to generate the main data DT_M, and the readout operation may be performed with respect to the sub-pixels (e.g., the Gr-sub-pixels) of the second row ROW2 to generate the ROI data DT_RO1. In this case, the pixels PX of the first row ROW1 may output the pixel signals in response to the first row control signals CTRL_R1*a* and CTRL_R1*b,* and the pixel signals from the pixels PX of the first row ROW1 may be provided to the conversion circuit 130 through the column lines CL1_1, CL2_1 CL3_1, CL4*a*_1, CL1_2, CL2_2 CL3_2, and CL4*a*_2. The Gr-sub-pixels of the second row ROW2 may output the pixel signals in response to the 2b-th row control signal CTRL_R2*b,* and the pixel signals from the Gr-sub-pixels of the second row ROW2 may be output through the column lines CL4*b*_1 and CL4*b*_2.

As described above, the Gr-sub-pixels of the second row ROW2 may operate in response to a row control signal different from that of the R-sub-pixels, the B-sub-pixels, and the Gb-sub-pixels of the second row ROW2. That is, the Gr-sub-pixels of the second row ROW2 may be controlled to be independent of the R-sub-pixels, the B-sub-pixels, and the Gb-sub-pixels of the second row ROW2. Also, the Gr-sub-pixels of the second row ROW2 may be connected to column lines different from those of the Gr-sub-pixels of the first row ROW1. That is, the readout operation of the Gr-sub-pixels of the second row ROW2 and the readout operation of the Gr-sub-pixels of the first row ROW1 may be performed at the same time.

Accordingly, because the image sensor device 100 simultaneously performs the readout operation for generating the main data DT_M and the readout operation for generating the ROI data DT_ROI, the image data of the specific range (i.e., the range of interest ROI) may have a fast frame rate without the decrease in the frame rate corresponding to the main data DT_M.

Figure 4:
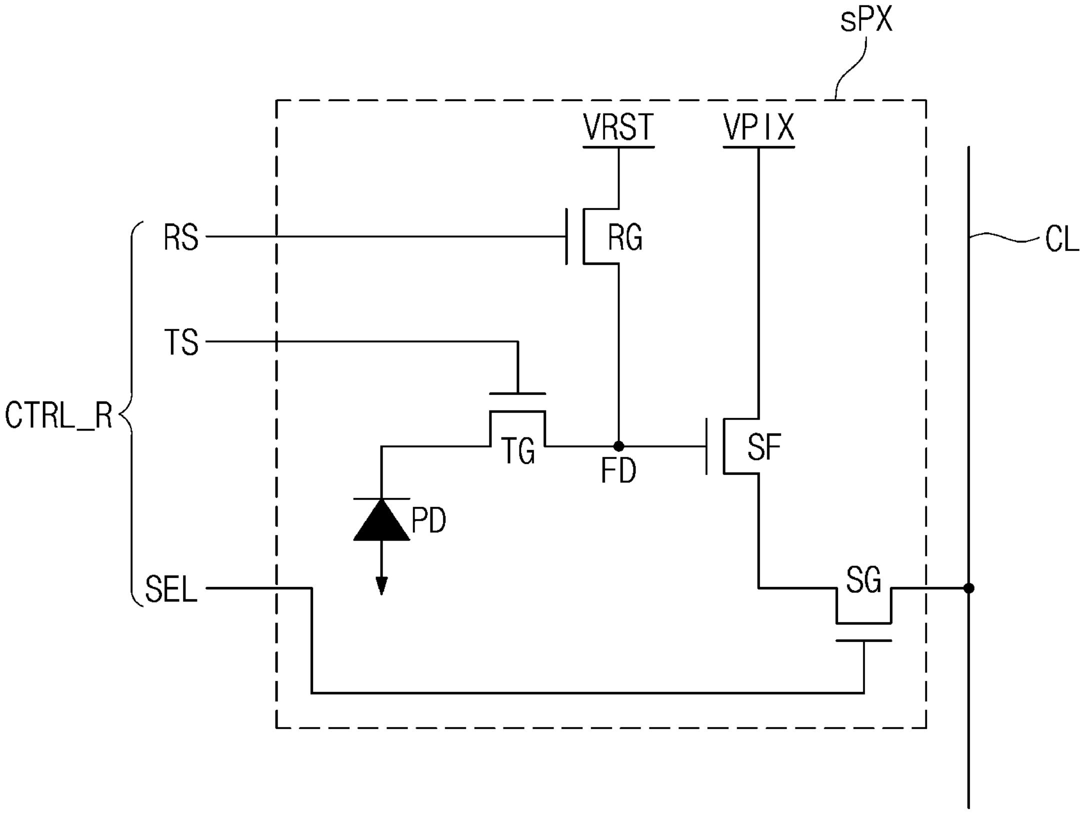
FIG. 4 is a circuit diagram illustrating one of a plurality of sub-pixels included in a pixel array of FIGS. 3A and 3B.

FIG. 4 is a circuit diagram illustrating one of a plurality of sub-pixels included in a pixel array of FIGS. 3A and 3B. In an embodiment, the structure of the sub-pixel illustrated in FIG. 4 is provided as an example, and the present disclosure is not limited thereto.

Referring to FIGS. 3A and 4, the sub-pixel sPX may include a photodiode PD, a transfer gate TG, a reset gate RG, a source follower SF, and a select gate SG.

The photodiode PD may be configured to generate charges corresponding to the intensity of light incident from the outside. The transfer gate TG may be connected between the photodiode PD and a floating diffusion node FD. The transfer gate TG may transfer the charges generated by the photodiode PD to the floating diffusion node FD in response to the transfer signal TS. The reset gate RG may be connected between a reset power supply voltage VRST and the floating diffusion node FD. The reset gate RG may reset the floating diffusion node FD with the reset power supply voltage VRST in response to the reset signal RS. The source follower SF may be connected between a pixel power supply voltage VPIX and the select gate SG. The source follower SF may operate in response to the level of the floating diffusion node FD. The select gate SG may be connected between the source follower SF and the column line CL. The select gate SG may operate in response to the selection signal SEL In an embodiment, the row control signals described with reference to FIGS. 1 to 3B may include the reset signal RS, the transfer signal TS, and the selection signal SEL described with reference to FIG. 4. However, the present disclosure is not limited thereto. For example, the row control signals may be variously changed and modified depending on the structure of the sub-pixel.

The structure of the sub-pixel described with reference to FIG. 4 is provided as an example, and the present disclosure is not limited thereto. For example, the sub-pixel may be implemented based on various sub-pixel structures such as a split photodiode structure, a 4-photodiode structure, and a shared pixel structure.

Figure 5A:
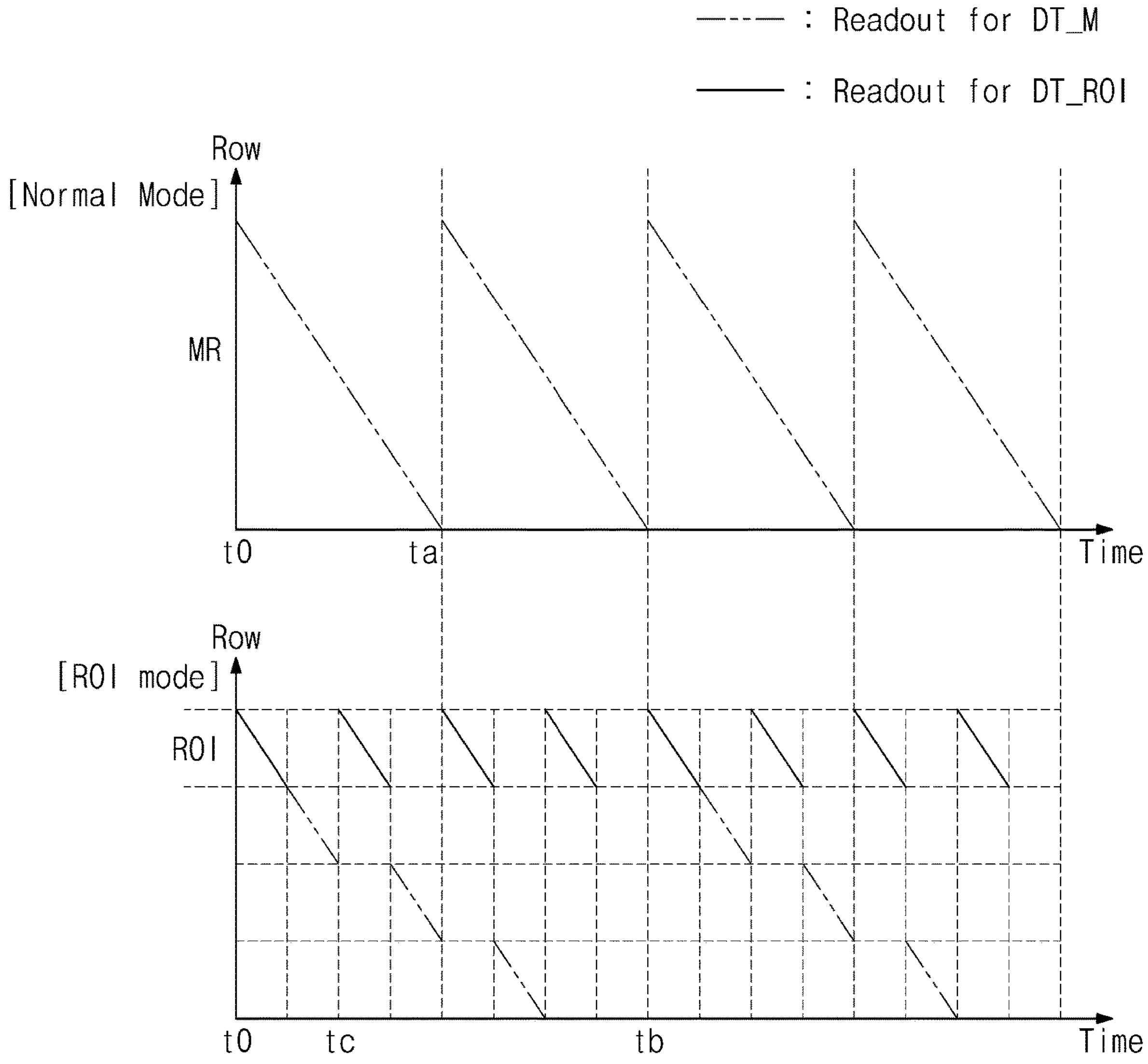

FIGS. 5A and 5B are a graph and a diagram for describing an ROI mode of an image sensor device. In the graphs of FIG. 5A, a horizontal axis represents a time, and a vertical axis represents a location for each of a plurality of rows included in a pixel array.

Referring to FIGS. 5A and 5B, an image sensor device may perform the readout operation on a main range MR or a range of interest ROI/non-range of interest nROI. In an embodiment, it is assumed that an external front view is captured by a pixel array of the image sensor device. In this case, the main range MR may indicate the entire external front view, and the main data DT_M may be image data corresponding to the main range MR or image data for expressing the main range MR. The range of interest ROI may indicate a partial range of the external front view to be expressed by the main data DT_M, and the ROI data DT_ROI may be image data corresponding to the range of interest ROI or image data for expressing the range of interest ROI. The non-range of interest nROI may indicate the remaining range of the external front view other than the range of interest ROI. The non-range of interest nROI may be expressed based on the main data DT_M obtained in the ROI mode of the image sensor device. The main range MR, the range of interest ROI, and the non-range of interest nROI may be classified in units of pixel row of the pixel array.

First of all, the image sensor device may operate in the normal mode. In this case, the image sensor device may generate the main data DT_M by sequentially performing the readout operations on the plurality of rows of the pixel array as illustrated in FIG. 5A.

As the image sensor device operates in the ROI mode, the image sensor device may provide a fast frame with respect to the specific range (i.e., the range of interest ROI). In an embodiment, a conventional image sensor device performs the readout operation on one row in one readout operation. That is, the conventional image sensor device may perform the readout operations on the range of interest ROI and the non-range of interest nROI, based on the time-interleaved scheme. For example, as illustrated in FIG. 5A, the image sensor device may perform the readout operation on the range of interest ROI and may then perform the readout operation on a portion of the non-range of interest nROI in units of pixel row. That is, the image sensor device may alternately perform the readout operation for generating the ROI data DT_ROI and the readout operation for generating the main data DT_M.

In an embodiment, the frame rate of image data may be defined based on the time period from a point in time when one frame starts to be generated to a point in time when a next frame data starts to be generated. For example, in the normal mode of the image sensor device, the frame rate of the main range may be defined by the reciprocal of the time period from t0 to ta. The frame rate of the range of interest ROI may be defined by the reciprocal of the time period from t0 to tc. The frame rate of the non-range of interest nROI may be defined by the reciprocal of the time period from t0 to tb.

As illustrated in FIG. 5B, it is assumed that the frame rate of the main range MR in the normal mode of the image sensor device is 80 FPS (Frame Per Second). In this case, when the image sensor device operates in the ROI mode, the frame rate of the range of interest ROI may increase to 160 FPS, but the frame rate of the non-range of interest nROI (i.e., the frame rate of the main data DT_M) may decrease to 40 FPS. The reason is that the conventional image sensor device performs the readout operation based on the time-interleaved scheme in the ROI mode, as described with reference to FIG. 5A. In this case, the frame rate of the non-range of interest nROI may decrease.

In contrast, according to embodiments of the present disclosure, the image sensor device 100 may simultaneously perform the readout operations on at least two rows. In this case, the image sensor device 100 may provide the fast frame rate of the ROI data DT_ROI without the decrease in the frame rate of the main data DT_M.

Figure 6:
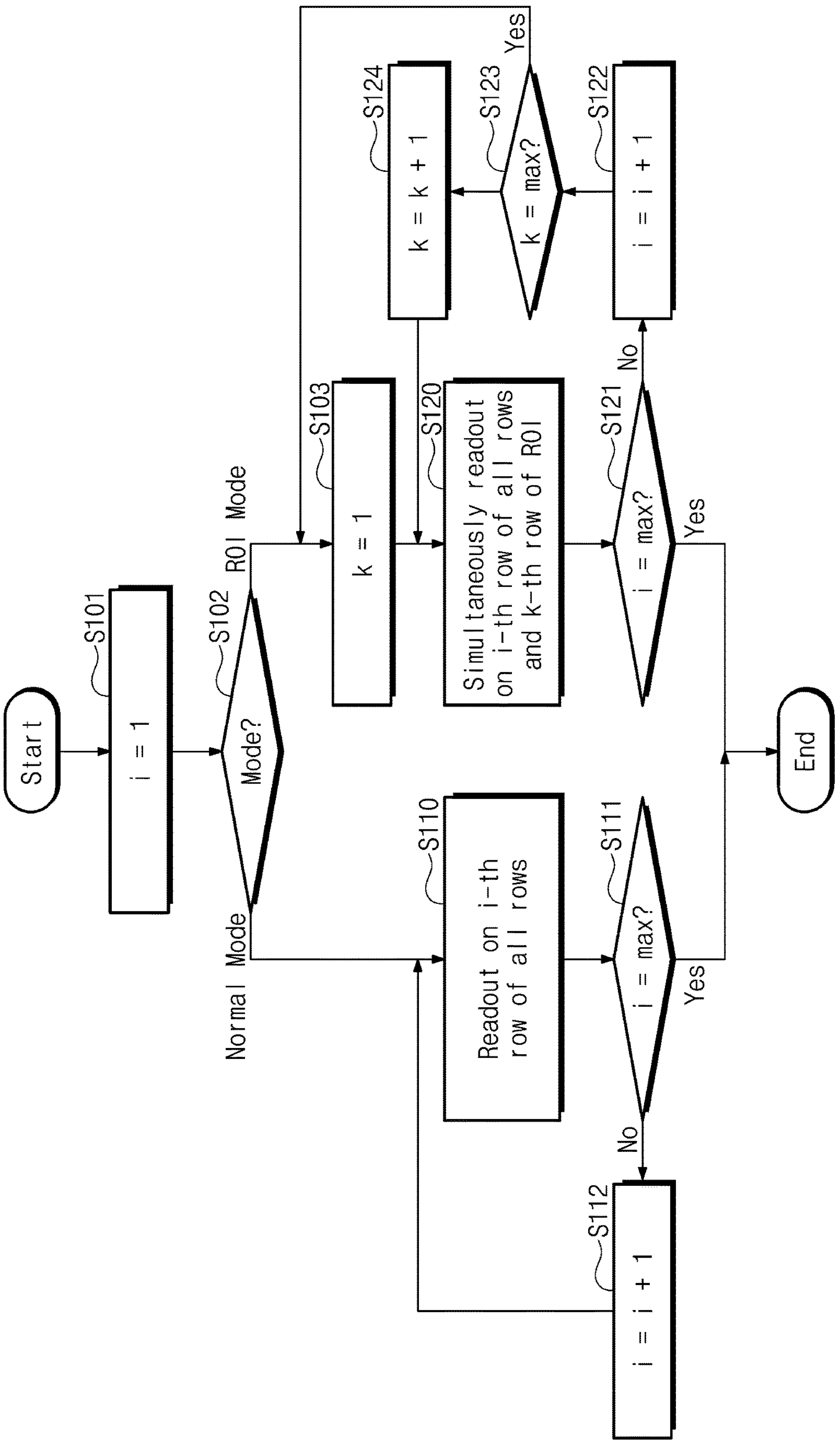
FIG. 6 is a flowchart illustrating an operation of an image sensor device of FIG. 2.

FIG. 6 is a flowchart illustrating an operation of an image sensor device of FIG. 2. In an embodiment, an operation according to the flowchart of FIG. 6 shows the readout operations for the plurality of pixels PX included in the pixel array 110 of the image sensor device 100. That is, one frame of the main data DT_M may be generated based on the flowchart of FIG. 6.

Referring to FIGS. 2 and 6, in operation S101, a variable "i" is set to "1". In an embodiment, the variable "i" may be simply used for describing the iterative readout operation with regard to the plurality of rows of the pixel array 110 of the image sensor device 100, and it may be understood that the variable "i" does not have any other technical meaning.

In operation S102, the image sensor device 100 may determine an operation mode. For example, the image sensor device 100 may operate based on one of the normal mode or the ROI mode. In an embodiment, the operation mode of the image sensor device 100 may be set by an external device.

When the operation mode is the normal mode, in operation S110, the image sensor device 100 may perform the readout operation on the i-th row among the plurality of rows. For example, the image sensor device 100 may read out pixel signals from the pixels PX located at the i-th row.

In operation S111, whether the variable "i" is the maximum value is determined. That the variable "i" is the maximum value means that the readout operation is performed for each of the plurality of rows of the pixel array 110 of the image sensor device 100 (i.e., that the readout operation of one frame is completed). When the variable "i" is not the maximum value, in operation S112, the variable "i" increases as much as "1". Afterwards, the image sensor device 100 may again perform operation S110.

When the variable "i" is the maximum value, the image sensor device 100 may end the readout operation for one frame. In an embodiment, when the variable "i" is the maximum value, the image sensor device 100 may again perform the readout operation for a next frame.

In an embodiment, through operation S110 to operation S112, the image sensor device 100 may generate the main data DT_M of one frame.

When a determination result in operation S102 indicates that the operation mode is the ROI mode, in operation S103, a variable "k" is set to "1". In an embodiment, the variable "k" may be for describing the iterative readout operation with regard to rows corresponding to the range of interest ROI, and it may be understood that the variable "k" does not have any other technical meaning.

In operation S120, the image sensor device 100 may simultaneously perform the readout operation on the i-th row among the plurality of rows of the pixel array 110 and the readout operation on the k-th row among the rows of the range of interest ROI. Afterwards, in operation S121, whether the variable "i" is the maximum value is determined. When the variable "i" is the maximum value, the image sensor device 100 ends the operation.

When the variable "i" is not the maximum value, in operation S122, the variable "i" increases as much as "1". Afterwards, in operation S123, whether the variable "k" is the maximum value is determined. That the variable "k" is the maximum value may mean that the readout operation is performed for each of the rows included in the range of interest ROI. That is, the variable "k" is the maximum value may mean that the ROI data DT_ROI of one frame is generated. When the variable "k" is not the maximum value, in operation S124, the variable "k" may increase as much as "1", and the image sensor device 100 may again perform operation S120. When the variable "k" is the maximum value, in operation S103, the variable "k" may again be set to "1", and the image sensor device 100 may again perform operation S120.

In an embodiment, the readout operation of the i-th row (i.e., the readout operation for generating the main data DT_M) may indicate the readout operation associated with pixels included in the i-th row from among the plurality of pixels of the pixel array 110. In contrast, the readout operation of the k-th row (i.e., the readout operation for generating the ROI data DT_ROI) may indicate the readout operation associated with sub-pixels corresponding to a specific color filter from among sub-pixels of pixels included in the k-th row among the rows of the range of interest ROI.

That is, when the image sensor device 100 operates in the ROI mode, the image sensor device 100 may generate the main data DT_M corresponding the non-range of interest nROI or the main range MR and may simultaneously generate the ROI data DT_ROI corresponding to the range of interest ROI. In this case, the main data DT_M may have the same frame rate as data generated in the normal mode, and the ROI data DT_ROI may have the fast frame rate. Accordingly, the image sensor device 100 may generate data with the fast frame rate without the decrease in the frame rate, with regard to a specific range.

Figure 7A:
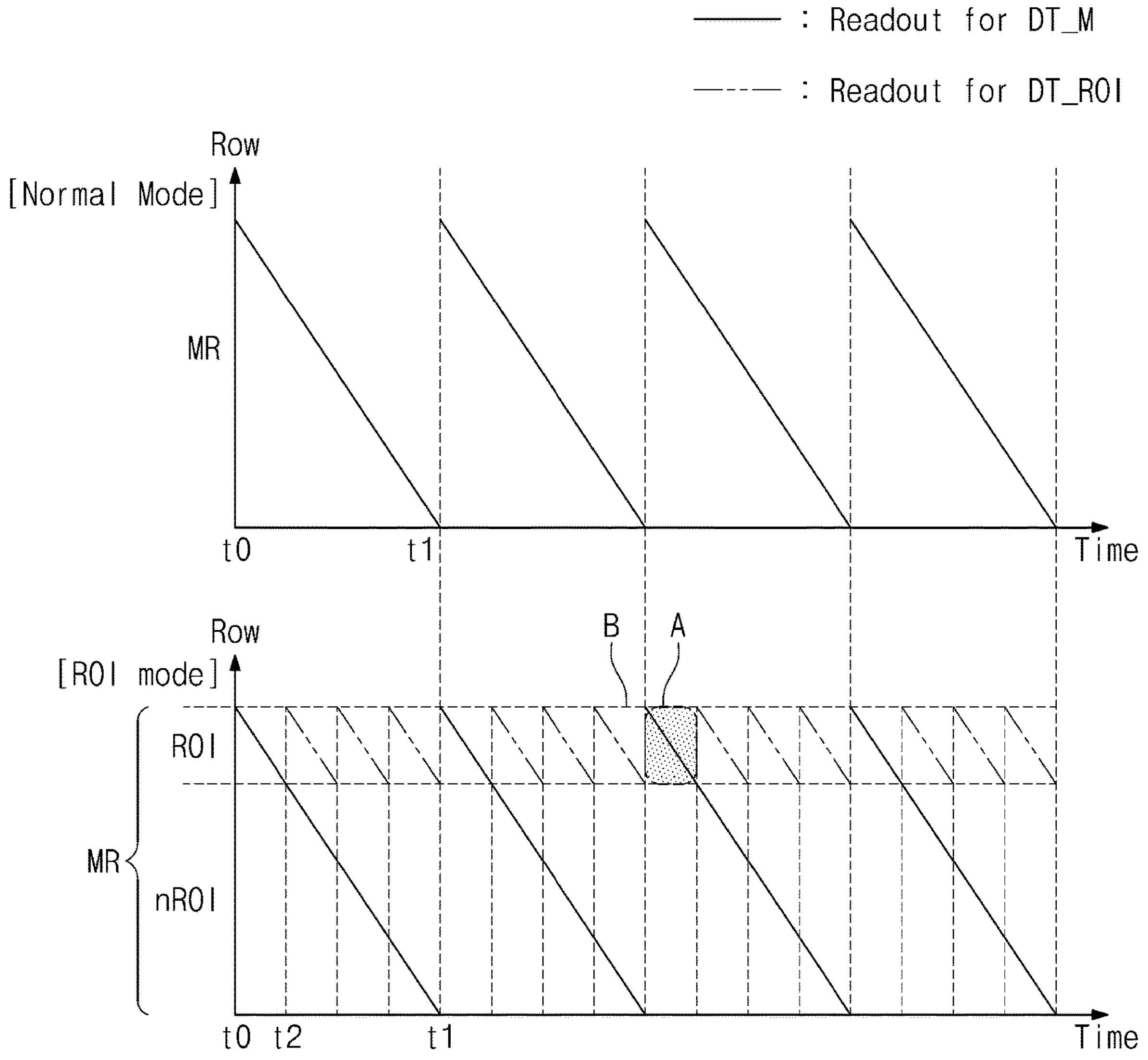
FIGS. 7A, 7B, and 7C are a graph and diagrams for describing an operation of an image sensor device according to the flowchart of FIG. 6.
Figure 7B:
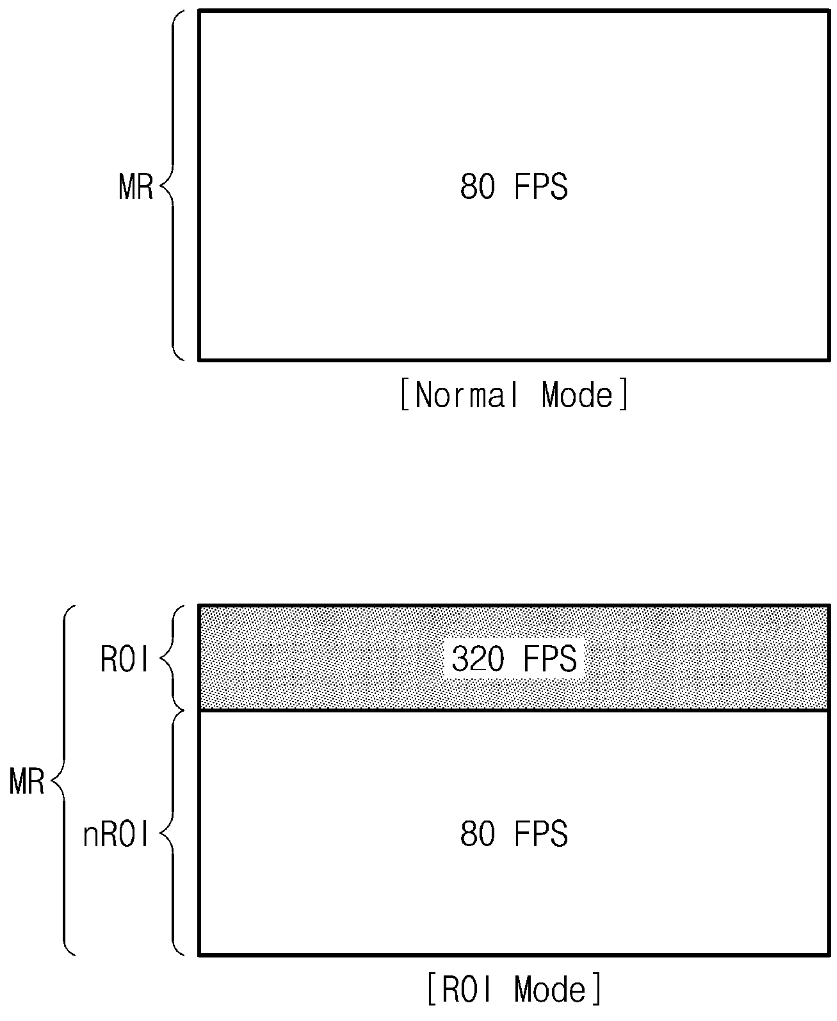
Figure 7C:
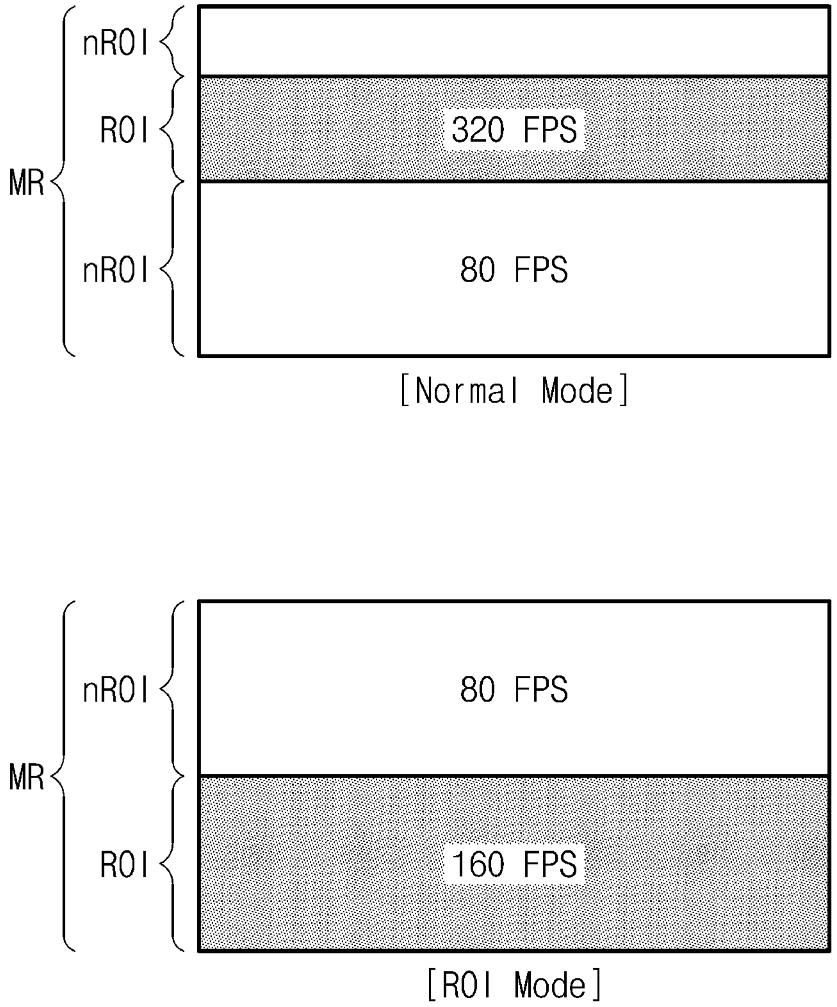

FIGS. 7A, 7B, and 7C are a graph and diagrams for describing an operation of an image sensor device according to the flowchart of FIG. 6. Referring to FIGS. 2, 6, 7A, and 7B, the image sensor device 100 may operate in one of the normal mode or the ROI mode.

When the image sensor device 100 operates based on the normal mode, the image sensor device 100 may generate the main data DT_M corresponding to the main range MR by sequentially performing the readout operation on the main range MR in units of pixel row, as illustrated in FIG. 7A.

When the image sensor device 100 operates in the ROI mode, the image sensor device 100 may simultaneously perform the readout operation of the range of interest ROI and the readout operation of the main range MR. In this case, the frame rate of the non-range of interest nROI or the main range MR may not decrease.

For example, as described with reference to FIGS. 5A and 5B, because the image sensor device performs the readout operation in units of pixel row, in the ROI mode, the image sensor device may alternately perform the readout operations on the range of interest ROI and the non-range of interest nROI in the time-interleaved scheme. As such, the frame rate of the non-range of interest nROI is inevitably lower than the frame rate of the main range MR in the normal mode.

In contrast, as illustrated in FIG. 7A, the image sensor device 100 may simultaneously perform the readout operation on the range of interest ROI and the readout operation on the non-range of interest nROI. In this case, the frame rate of the non-range of interest nROI is the same as the frame rate of the main range MR in the normal mode.

For example, as described above, the frame rate of image data may be defined by the reciprocal of the time period from a point in time when the readout operation of a specific row starts to a point in time when the next readout operation starts. Accordingly, as illustrated in FIG. 7A, the frame rate of the main range MR in the normal mode and the frame rate of the non-range of interest nROI in the ROI mode may be defined by the reciprocal of the time period from t0 to t1. That is, the frame rate of the non-range of interest nROI in the ROI mode may be the same as the frame rate of the main range MR in the normal mode. Also, in the ROI mode, the image sensor device 100 may repeatedly perform the readout operation on the range of interest ROI while the readout operation is performed with respect to the non-range of interest nROI. In this case, the frame rate of the range of interest ROI may be defined by the reciprocal of the time period from t0 to t2.

In detail, as illustrated in FIG. 7B, when the image sensor device 100 operates in the normal mode, the frame rate of the main range MR may be 80 FPS. When the image sensor device 100 operates in the ROI mode, the frame rate of the non-range of interest nROI may be maintained at 80 FPS, and the frame rate of the range of interest ROI may increase to 320 FPS. The reason is that the image sensor device 100 simultaneously performs the readout operations on at least two rows. Accordingly, the image sensor device 100 according to an embodiment of the present disclosure may support a relatively high frame rate with respect to a specific range without the decrease in the frame rate.

In the embodiment of FIG. 7B, the range of interest ROI is illustrated as being located on an upper portion of the main range MR. However, the present disclosure is not limited thereto. The range of interest ROI may be variously changed depending on the operation of the image sensor device 100 or under control of the external device (e.g., the image signal processor 12 or an application processor). For example, the location of the range of interest ROI may be changed to various locations within the main range MR. Alternatively, the size of the range of interest ROI may be variously changed within the main range MR. In an embodiment, the location and size of the range of interest ROI may be variable in units of pixel row.

In detail, as illustrated in FIG. 7C, the range of interest ROI may be located in the middle of the main range MR. In this case, in the main range MR, one non-range of interest nROI may be located on/above the range of interest ROI, and the other non-range of interest nROI may be located under/below the range of interest ROI. Alternatively, the range of interest ROI may be located on a lower portion of the main range MR.

In an embodiment, the frame rate of the range of interest ROI may correspond to the size of the range of interest ROI. For example, when the frame rate of the main range MR is 80 FPS, the frame rate of the non-range of interest nROI may be maintained at 80 FPS. In this case, when the size of the range of interest ROI is ¼ times the size of the main range MR, the frame rate of the range of interest ROI may be 320 (=80×4) FPS. Alternatively, when the size of the range of interest ROI is ½ times the size of the main range MR, the frame rate of the range of interest ROI may be 160(=80×2) FPS. That is, the frame rate of the ROI data DT_ROI may be determined depending on the ratio of the range of interest ROI to the main range MR.

However, the present disclosure is not limited thereto. For example, the frame rate of the range of interest ROI may be controlled by controlling a time take to perform one readout operation (or the readout operation for one row) in the range of interest ROI.

In an embodiment, as illustrated in FIG. 7A, in time period "A", an effective integration time (EIT) for generating the main data DT_M may be insufficient. For example, as illustrated in FIG. 7A, in time period "A", the readout operations may be performed with respect to the same row to generate the main data DT_M and the ROI data DT_ROI. In this case, in time period "B" immediately before time period "A", the readout operation may be performed to generate the ROI data DT_ROI. That is, in time period "A", the sufficient EIT may be required to generate the main data DT_M; however, the sufficient EIT may not be secured due to the readout operation in time period "B" immediately before time period "A". In this case, in time period "A" (i.e., in a time period where the readout operation for generating the main data DT_M and the readout operation for generating the ROI data DT_ROI are performed with respect to the same row), the image sensor device 100 may apply a weight to obtained pixel signals or may additionally perform the correction operation.

Figure 8:
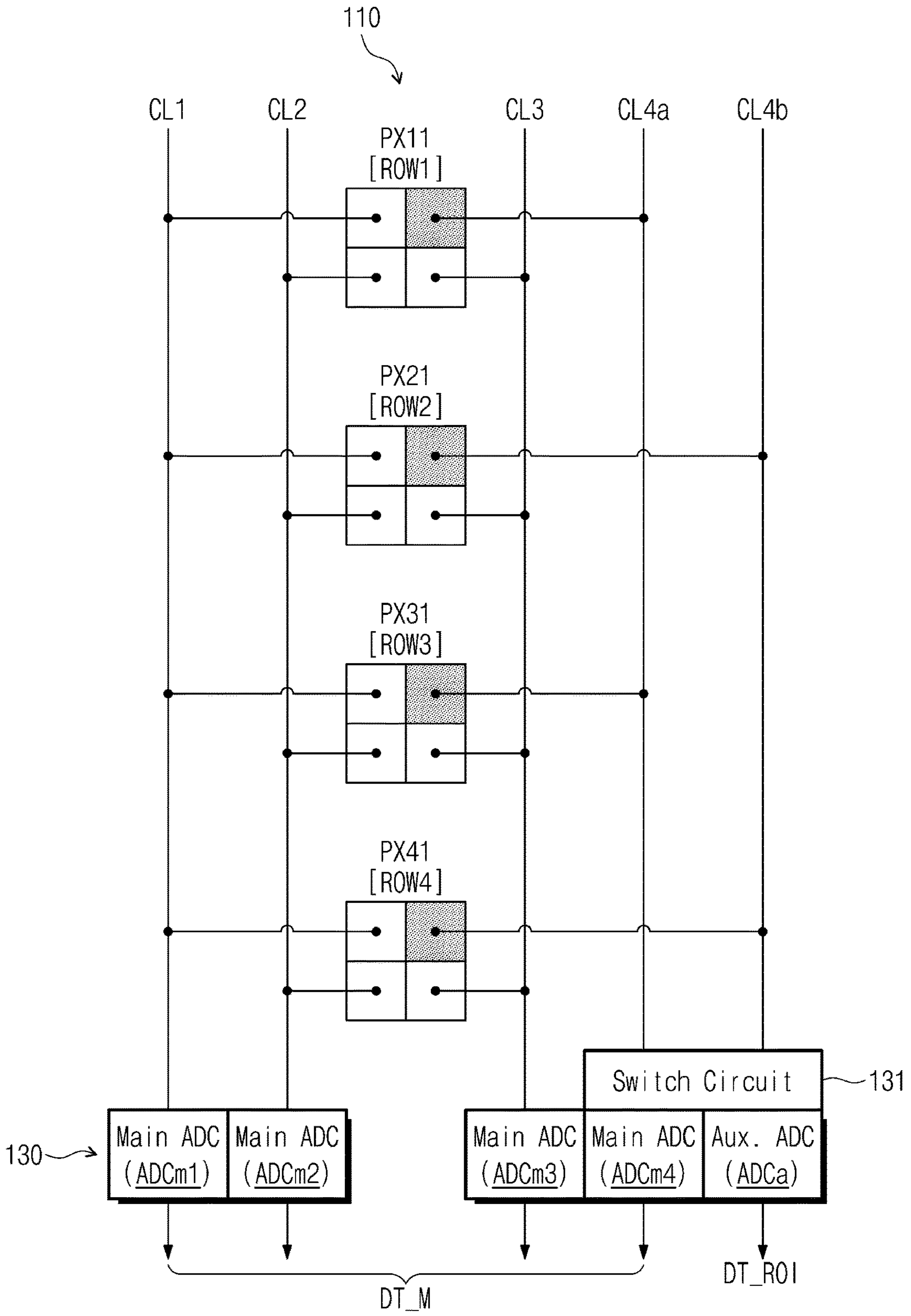
FIG. 8 is a diagram for describing an operation of an image sensor device of FIG. 2.

FIG. 8 is a diagram for describing an operation of an image sensor device of FIG. 2. An operation in which the main data DT_M and the ROI data DT_ROI are generated by using the pixel signals output from a plurality of pixels PX11 to PX41 will be described with reference to FIG. 8. For brevity of drawing and for convenience of description, a partial configuration of the image sensor device 100 is illustrated, but the present disclosure is not limited thereto.

Referring to FIGS. 2 and 8, the pixel array 110 may include the plurality of pixels PX11 to PX41. Each of the plurality of pixels PX11 to PX41 may include a plurality of sub-pixels. The structure of the plurality of sub-pixels is described with reference to FIGS. 3A, 3B, and 4, and thus, additional description will be omitted to avoid redundancy.

The plurality of pixels PX11 to PX41 may be located at different rows and may operate in response to different row control signals. The row control signals are described with reference to FIGS. 3A, 3B, and 4, and thus, additional description will be omitted to avoid redundancy.

The plurality of pixels PX11 to PX41 may be located at the same column. The plurality of pixels PX11 to PX41 may be connected to the column lines CL1, CL2, CL3, CL4*a*, and CL4*b*. In detail, in the sub-pixels of the plurality of pixels PX11 to PX41, sub-pixels corresponding to the same color filter may be connected to the same column line. For example, as described above, the plurality of pixels PX11 to PX41 may correspond to the color filter array of the Bayer pattern (i.e., the RGBG color pattern). In the sub-pixels of the plurality of pixels PX11 to PX41, the R-sub-pixels may be connected to the first column line CL1, the Gb-sub-pixels may be connected to the second column line CL2, and the B-sub-pixels may be connected to the third column line CL3.

In the sub-pixels of the plurality of pixels PX11 to PX41, each Gr-sub-pixel may be connected to the 4a-th column line CL4*a* or the 4b-th column line CL4*b*. For example, the Gr-sub-pixels among the sub-pixels of the plurality of pixels PX11 to PX41 may be used to generate the ROI data DT_ROI. In the embodiment of FIG. 8, as the Gr-sub-pixels of the pixels PX11 and PX13 are connected to the 4a-th column line CL4*a* and the Gr-sub-pixels of the pixels PX12 and PX14 are connected to the 4b-th column line CL4*b*, the readout operation for generating the ROI data DT_ROI may be performed together with the readout operation of any other row (e.g., a main range) (e.g., the readout operation for generating the main data DT_M).

The conversion circuit 130 may be connected to the plurality of column lines CL1, CL2, CL3, CL4*a*, and CL4*b*. The conversion circuit 130 may generate the main data DT M and the ROI data DT_ROI based on the pixel signals received through the plurality of column lines CL1, CL2, CL3, CL4*a*, and CL4*b*.

For example, the conversion circuit 130 may include a plurality of main ADCs ADCm1 to ADCm4 and an auxiliary ADC ADCa. The plurality of main ADCs ADCm1 to ADCm4 may generate the main data DT_M based on the pixel signals received through the plurality of column lines CL1, CL2, CL3, CL4*a*, and CL4*b*. The auxiliary ADC ADCa may generate the ROI data DT_ROI based on the pixel signals received through the column lines CL4*a* and CL4*b*.

The switching circuit 131 may be connected to the 4a-th and 4b-th column lines CL4*a* and CL4*b*. The switching circuit 131 may switch the connection of the 4a-th and 4b-th column lines CL4*a* and CL4*b* with the fourth main ADC ADCm4 and the auxiliary ADC ADCa such that the pixel signal corresponding to the main range MR is provided to the fourth main ADC ADCm4 and the pixel signal corresponding to the range of interest ROI is provided to the auxiliary ADC ADCa.

As described above, according to an embodiment of the present disclosure, even though sub-pixels that are used to generate the ROI data DT_ROI are located at the same column, the sub-pixels may be connected to different column lines. In this case, the readout operation of the ROI data DT_ROI and the readout operation of the main range MR (or the non-range of interest nROI) may be simultaneously performed.

In an embodiment, as described above, the switching circuit 131 may perform the switching operation on column lines connected to the sub-pixels used to generate the ROI data DT_ROI. In this case, because the ROI data DT_ROI are output through the same ADC (i.e., the auxiliary ADC ADCa), the noise of the pixel signal may be easily removed, and the following image processing may be simplified.

FIGS. 9A to 9D are diagrams for describing an operation of an image sensor device of FIG. 8. For convenience of description, components that are unnecessary to describe an operation of an image sensor device are omitted. In the embodiments of FIGS. 9A to 9D, it is assumed that the second row ROW2 and the third row ROW3 belong to the range of interest ROI. That is, the image sensor device 100 may sequentially perform the readout operations on the first to fourth rows ROW1 to ROW4 to generate the main data DT_M and may sequentially/repeatedly perform the readout operations on the second and third rows ROW2 and ROW3 to generate the ROI data DT_ROI.

Figure 9A:
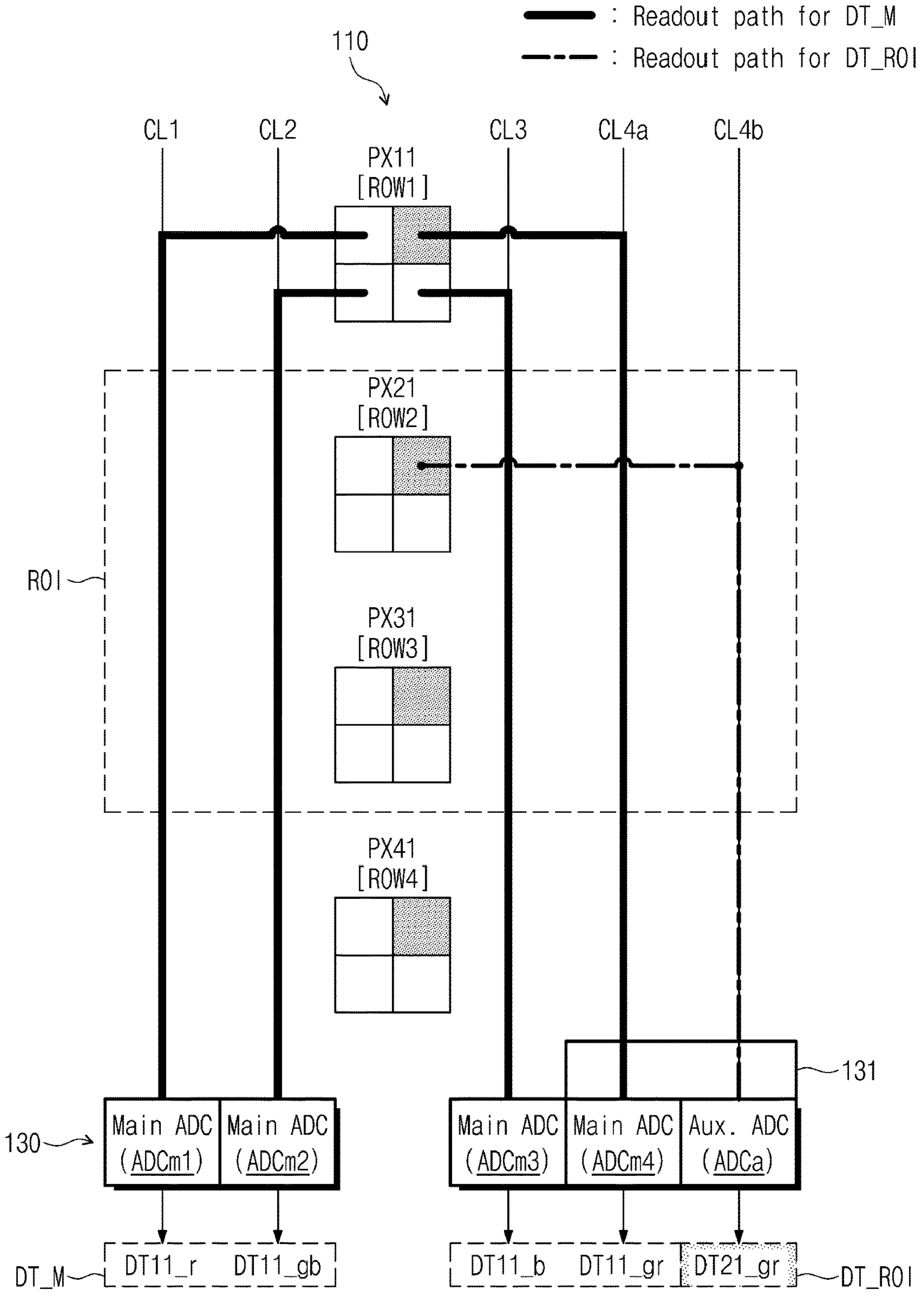
FIGS. 9A to 9D are diagrams for describing an operation of an image sensor device of FIG. 8.

First, as illustrated in FIG. 9A, the image sensor device 100 may simultaneously perform the readout operation on the pixels of the first row ROW1 for the generation of the main data DT_M and the readout operation on the pixels (or sub-pixels) of the second row ROW2 for the generation of the ROI data DT_ROI.

In this case, the R-sub-pixel among the sub-pixels of the pixel PX11 of the first row ROW1 may provide the pixel signal to the first main ADC ADCm1 through the first column line CL1, and the first main ADC ADCm1 may generate data DT11_*r* based on the received pixel signal. The Gb-sub-pixel among the sub-pixels of the pixel PX11 of the first row ROW1 may provide the pixel signal to the second main ADC ADCm2 through the second column line CL2, and the second main ADC ADCm2 may generate data DT11_*gb* based on the received pixel signal. The B-sub-pixel among the sub-pixels of the pixel PX11 of the first row ROW1 may provide the pixel signal to the third main ADC ADCm3 through the third column line CL3, and the third main ADC ADCm3 may generate data DT11_*b* based on the received pixel signal.

The Gr-sub-pixel among the sub-pixels of the pixel PX11 of the first row ROW 1 may output the pixel signal through the 4a-th column line CL4*a*. The Gr-sub-pixel among the sub-pixels of the pixel PX21 of the second row ROW2 may output the pixel signal through the 4b-th column line CL4*b*.

In the embodiment of FIG. 9A, the switching circuit 131 may perform a first switching operation such that the 4a-th column line CL4*a* is connected to the fourth main ADC ADCm4 and the 4b-th column line CL4*b* is connected to the auxiliary ADC ADCa.

Through the first switching operation of the switching circuit 131, the fourth main ADC ADCm4 may receive the pixel signal from the Gr-sub-pixel among the sub-pixels of the pixel PX11 of the first row ROW1 through the 4a-th column line CL4*a* and may generate data DT11_gr based on the received pixel signal.

Through the first switching operation of the switching circuit 131, the auxiliary ADC ADCa may receive the pixel signal from the Gr-sub-pixel among the sub-pixels of the pixel PX21 of the second row ROW2 through the 4b-th column line CL4*b* and may generate data DT21_*gr* based on the received pixel signal.

Figure 9B:
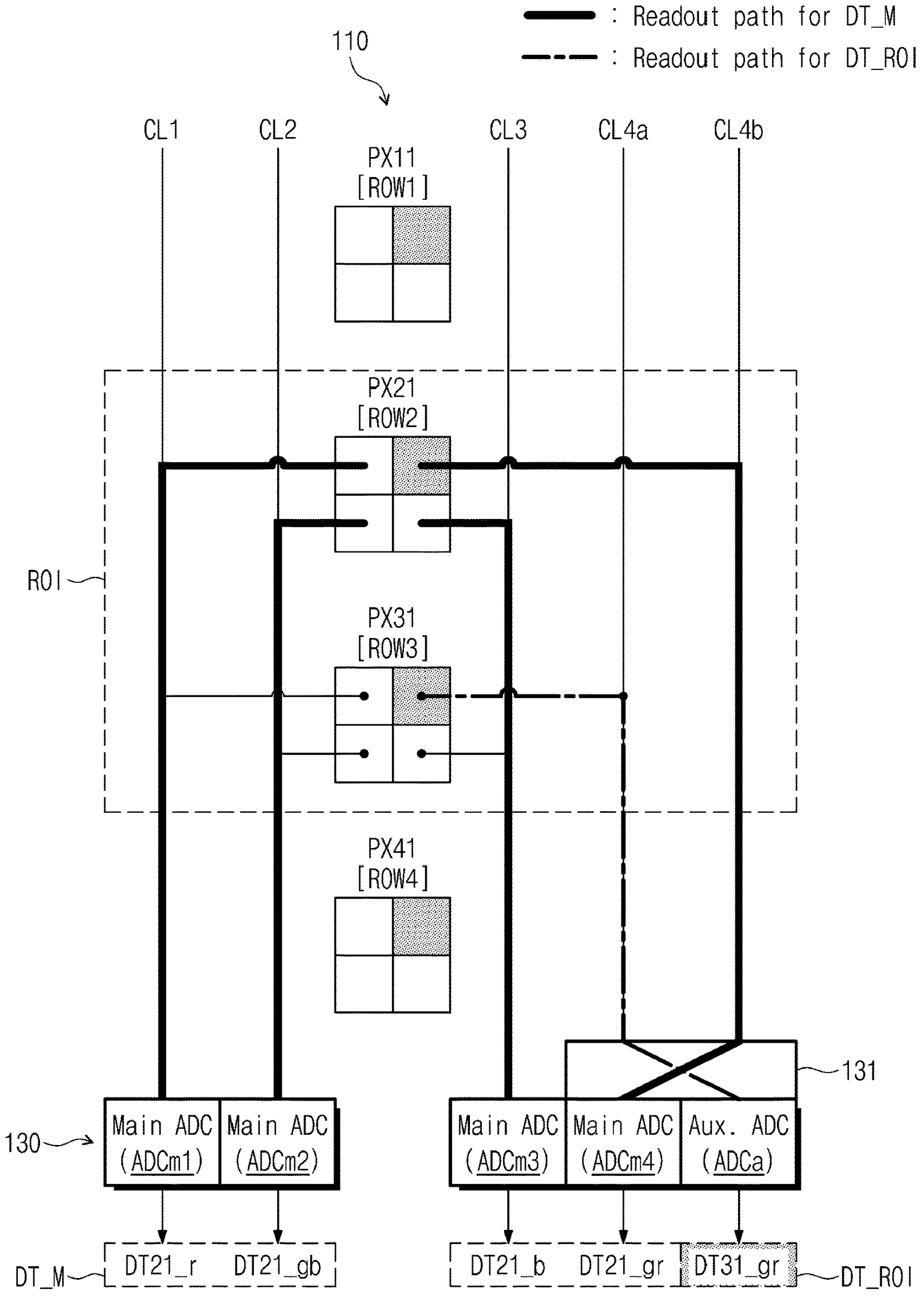

Next, as illustrated in FIG. 9B, the image sensor device 100 may simultaneously perform the readout operation on the pixels of the second row ROW2 for the generation of the main data DT_M and the readout operation on the pixels (or sub-pixels) of the third row ROW3 for the generation of the ROI data DT_ROI.

In this case, in the sub-pixels of the pixel PX21 of the second row ROW2, the R-sub-pixel, the Gb-sub-pixel, and the B-sub-pixel may respectively output the pixel signals through the first to third column lines CL1 to CL3. The first to third main ADCs ADCm1 to ADCm3 may respectively receive the pixel signals through the first to third column lines CL1 to CL3 and may respectively generate the data DT21_*r*, DT21_*gb*, and DT21_*b* based on the received pixel signals.

The Gr-sub-pixel among the sub-pixels of the pixel PX21 of the second row ROW2 may output the pixel signal through the 4b-th column line CL4*b*. The Gr-sub-pixel among the sub-pixels of the pixel PX31 of the third row ROW3 may output the pixel signal through the 4a-th column line CL4*a*.

In the embodiment of FIG. 9B, the switching circuit 131 may perform a second switching operation such that the 4b-th column line CL4*b* is connected to the fourth main ADC ADCm4 and the 4a-th column line CL4*a* is connected to the auxiliary ADC ADCa.

Through the second switching operation of the switching circuit 131, the fourth main ADC ADCm4 may receive the pixel signal from the Gr-sub-pixel among the sub-pixels of the pixel PX21 of the second row ROW2 through the 4b-th column line CL4*b* and may generate data DT21_*gr* based on the received pixel signal.

Through the second switching operation of the switching circuit 131, the auxiliary ADC ADCa may receive the pixel signal from the Gr-sub-pixel among the sub-pixels of the pixel PX31 of the third row ROW3 through the 4a-th column line CL4*a* and may generate data DT31_gr based on the received pixel signal.

Figure 9C:
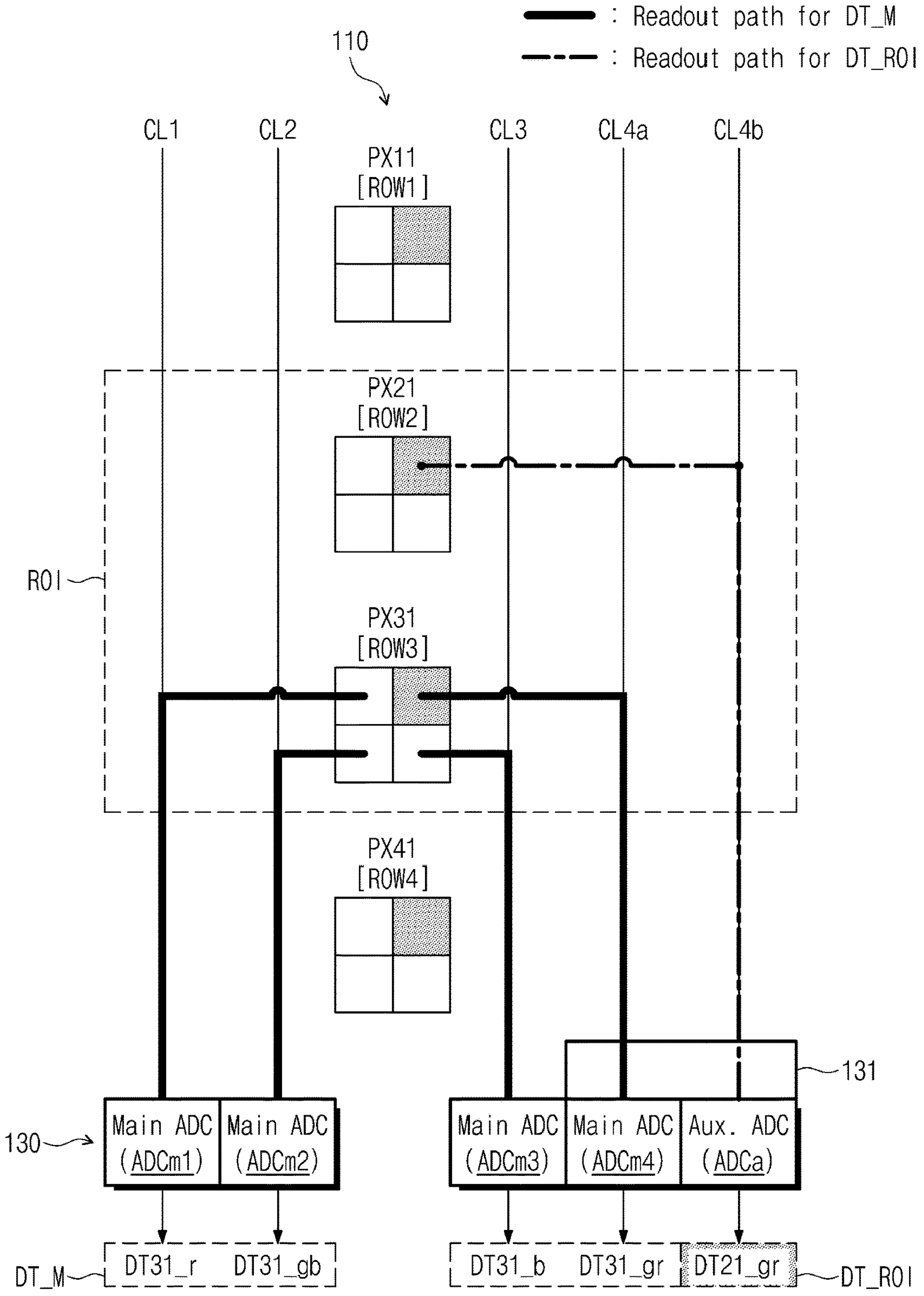

Next, referring to FIG. 9C, the image sensor device 100 may simultaneously perform the readout operation on the pixels of the third row ROW3 for the generation of the main data DT_M and the readout operation on the pixels (or sub-pixels) of the second row ROW2 for the generation of the ROI data DT_ROI.

In this case, in the sub-pixels of the pixel PX31 of the third row ROW3, the R-sub-pixel, the Gb-sub-pixel, and the B-sub-pixel may respectively output the pixel signals through the first to third column lines CL1 to CL3. The first to third main ADCs ADCm1 to ADCm3 may respectively receive the pixel signals through the first to third column lines CL1 to CL3 and may respectively generate the data DT31_*r*, DT31_*gb*, and DT31_*b* based on the received pixel signals.

The Gr-sub-pixel among the sub-pixels of the pixel PX31 of the third row ROW3 may output the pixel signal through the 4a-th column line CL4*a*. The Gr-sub-pixel among the sub-pixels of the pixel PX21 of the second row ROW2 may output the pixel signal through the 4b-th column line CL4*b*.

In the embodiment of FIG. 9C, the switching circuit 131 may perform the first switching operation such that the 4a-th column line CL4*a* is connected to the fourth main ADC ADCm4 and the 4b-th column line CL4*b* is connected to the auxiliary ADC ADCa.

Through the first switching operation of the switching circuit 131, the fourth main ADC ADCm4 may receive the pixel signal from the Gr-sub-pixel among the sub-pixels of the pixel PX31 of the third row ROW3 through the 4a-th column line CL4*a* and may generate data DT31_*gr* based on the received pixel signal.

Through the first switching operation of the switching circuit 131, the auxiliary ADC ADCa may receive the pixel signal from the Gr-sub-pixel among the sub-pixels of the pixel PX21 of the second row ROW2 through the 4b-th column line CL4*b* and may generate the data DT21_gr based on the received pixel signal.

Figure 9D:
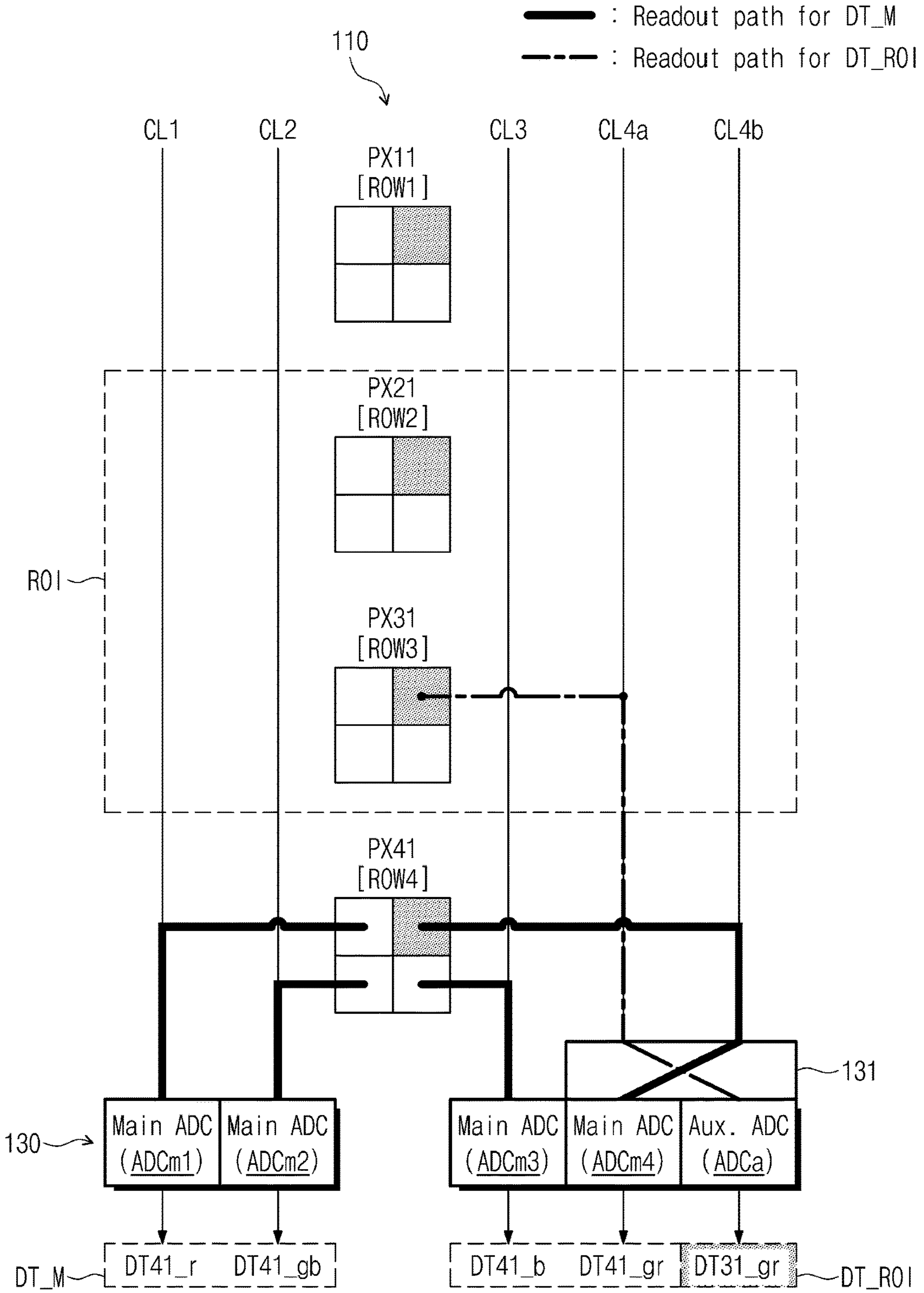

Then, referring to FIG. 9D, the image sensor device 100 may simultaneously perform the readout operation on the pixels of the fourth row ROW4 for the generation of the main data DT_M and the readout operation on the pixels (or sub-pixels) of the third row ROW3 for the generation of the ROI data DT_ROI.

In this case, in the sub-pixels of the pixel PX41 of the fourth row ROW4, the R-sub-pixel, the Gb-sub-pixel, and the B-sub-pixel may respectively output the pixel signals through the first to third column lines CL1 to CL3. The first to third main ADCs ADCm1 to ADCm3 may respectively receive the pixel signals through the first to third column lines CL1 to CL3 and may respectively generate the data DT41_*r*, DT41_*gb*, and DT41_*b* based on the received pixel signals.

The Gr-sub-pixel among the sub-pixels of the pixel PX41 of the fourth row ROW4 may output the pixel signal through the 4b-th column line CL4b. The Gr-sub-pixel among the sub-pixels of the pixel PX31 of the third row ROW3 may output the pixel signal through the 4a-th column line CL4*a*.

In the embodiment of FIG. 9D, the switching circuit 131 may perform the second switching operation such that the 4b-th column line CL4*b* is connected to the fourth main ADC ADCm4 and the 4a-th column line CL4*a* is connected to the auxiliary ADC ADCa.

Through the second switching operation of the switching circuit 131, the fourth main ADC ADCm4 may receive the pixel signal from the Gr-sub-pixel among the sub-pixels of the pixel PX41 of the fourth row ROW4 through the 4b-th column line CL4*b* and may generate data DT41_gr based on the received pixel signal.

Through the second switching operation of the switching circuit 131, the auxilary ADCADCa may receive the pixel signal from the Gr-sub-pixel among the sub-pixels of the pixel PX31 of the third row ROW3 through the 4a-th column line CL4*a* and may generate the data DT31_*gr* based on the received pixel signal.

In an embodiment, the data DT11_*r*, DT11_*gb*, DT11_*b*, DT11_*gr*, DT21_*r*, DT21_*gb*, DT21_*b*, DT21_*gr*, DT31_*r*, DT31_*gb*, DT31_*b*, DT31_gr, DT41_*r*, DT41_*gb*, DT41_*b*, and DT41_*gr* generated from the first to fourth main ADCs ADCm1 to ADCm4 may be included in the main data DT_M, and the data DT21_*gr* and DT_31_*gr* generated from the auxiliary ADC ADCa may be included in the ROI data DT_ROI.

In this case, while one readout operation is performed for each of the first to fourth rows ROW1 to ROW4 with regard to the main data DT_M (i.e., while one frame data associated with the main range MR are generated), the readout operation is performed two times for each of the second and third rows ROW2 and ROW3. That is, the fast frame rate may be supported with respect to the range of interest ROI while the frame rate of the main data DT_M is maintained.

Figure 10:
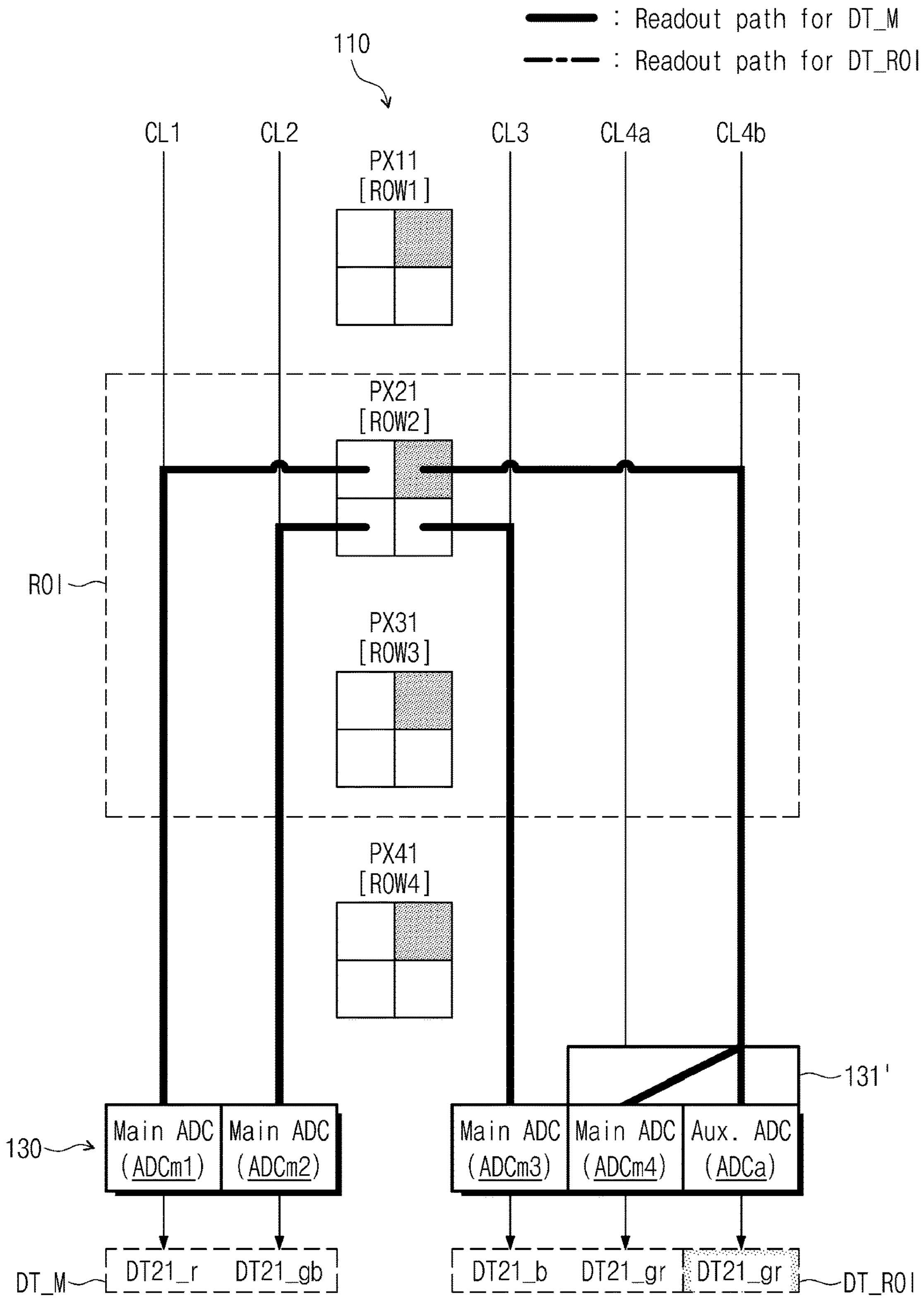
FIG. 10 is a diagram for describing an operation of an image sensor device of FIG. 8.

FIG. 10 is a diagram for describing an operation of an image sensor device of FIG. 8. For convenience of description, components that are unnecessary to describe an operation of an image sensor device are omitted. An embodiment in which the readout operation of the main data DT_M and the readout operation of the ROI data DT_ROI are simultaneously performed with respect to the second row ROW2 will be described with reference to FIG. 10. For example, like time period "A" illustrated in FIG. 7A, in a specific time period, the readout operation of the main data DT_M and the readout operation of the ROI data DT_ROI may be performed with respect to the same row. In this case, the switching circuit 131 may provide the pixel signal output from one sub-pixel to a main ADC and an auxiliary ADC, respectively.

In detail, referring to FIGS. 2 and 10, the image sensor device 100 may perform the readout operation on the second row ROW2 to generate the main data DT_M and the ROI data DT_ROI. In this case, the R-sub-pixel, the Gb-sub-pixel, the B-sub-pixel, and the Gr-sub-pixel of the pixel PX21 of the second row ROW2 may respectively output the pixel signals through the first, second, third, and 4b-th column lines CL1, CL2, CL3, and CL4*b*.

The first to third main ADCs ADCm1 to ADCm3 may respectively receive the pixel signals through the first to third column lines CL1 to CL3 and may generate data DT21_*r*, DT21_*gb*, and DT21_*b* corresponding to the pixel signals.

As described above, the main data DT_M and the ROI data DT_ROI are generated through the readout operation on the second row ROW2. That is, the pixel signal of the Gr-sub-pixel among the sub-pixels of the pixel PX21 of the second row ROW2 may be used to generate both the main data DT_M and the ROI data DT_ROI. To this end, a switching circuit 131' may perform the switching operation such that the 4b-th column line CL4*b* is connected to both the fourth main ADC ADCm4 and the auxiliary ADC ADCa. In this case, each of the fourth main ADC ADCm4 and the auxiliary ADC ADCa may receive the pixel signal through the 4b-th column line CL4*b* and may generate the data DT21_*gr* corresponding to the received pixel signal.

In an embodiment, the data DT21_*r*, DT21_*gb*, DT21_*b*, and DT21_*gr* generated from the first to fourth main ADCs ADCm1 to ADCm4 may be included in the main data DT_M, and the data DT21_*gr* generated from the auxiliary ADC ADCa may be included in the ROI data DT_ROI.

Figure 11A:
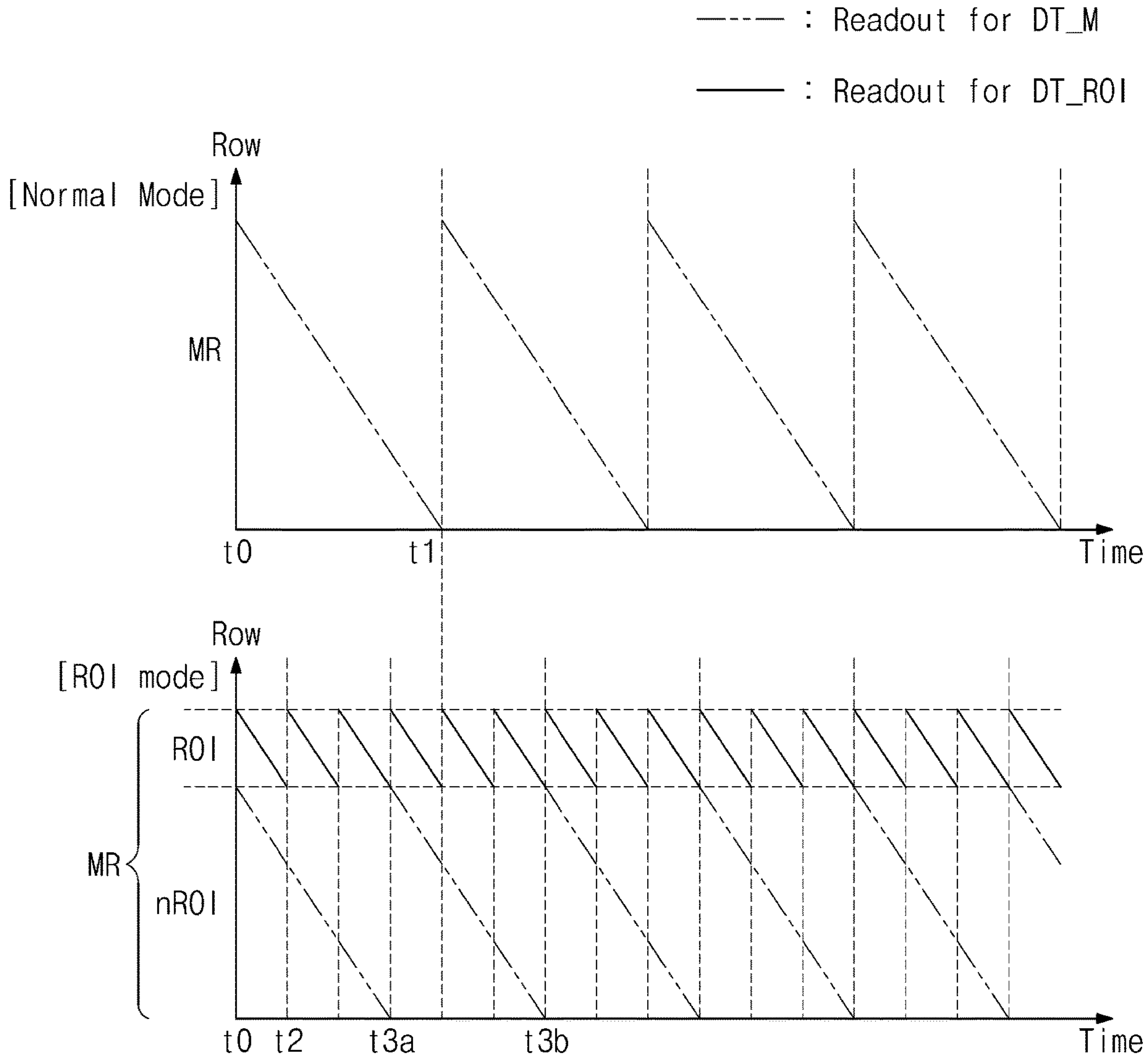

FIGS. 11A and 11B are a graph and a diagram for describing an operation of an image sensor device of FIG. 2. Referring to FIGS. 2, 11A, and 11B, the image sensor device 100 may operate in the normal mode or the ROI mode. The normal mode is similar to that described with reference to FIG. 7, and thus, additional description will be omitted to avoid redundancy.

In the ROI mode, the image sensor device 100 may perform the readout operation on the range of interest ROI and the readout operation on the non-range of interest nROI independently of each other. For example, in the embodiment described with reference to FIG. 7A, when the image sensor device 100 operates in the ROI mode, the image sensor device 100 simultaneously performs the readout operation on the range of interest ROI and the readout operation on the non-range of interest nROI. In this case, because the same readout operation as the normal mode is performed with respect to the non-range of interest nROI, the frame rate of the non-range of interest nROI in the ROI mode is the same as the frame rate of the main range MR in the normal mode.

In contrast, according to the embodiment of FIG. 11A, the image sensor device 100 may perform the readout operation on the non-range of interest nROI and the readout operation on the range of interest ROI independently of each other and at the same time. Herein, the non-range of interest nROI may be the remaining range of the main range MR other than the range of interest ROI. For example, as illustrated in FIG. 11A, during the time period from t0 to t3*a,* the image sensor device 100 may perform the readout operation on the non-range of interest nROI. At the same time, during the time period from t0 to t2, the image sensor device 100 may perform the readout operation on the range of interest ROI. Afterwards, during the time period from t3*a* to t3*b,* the image sensor device 100 may again perform the readout operation on the non-range of interest nROI.

In this case, the frame rate of the non-range of interest nROI may be higher than the frame rate of the main range MR in the normal mode. For example, as illustrated in FIG. 11A, the frame rate of the main range MR in the normal mode may be defined by the reciprocal of the time period from t0 to t1. The frame rate of the non-range of interest nROI may be defined by the reciprocal of the time period from t0 to t3*a*. In this case, the frame rate of the non-range of interest nROI may be higher than the frame rate of the main range MR in the normal mode.

In detail, as illustrated in FIG. 11B, in the normal mode, the frame rate of the main range MR may be 80 FPS. Assuming that the image sensor device 100 performs the readout operation on the range of interest ROI and the readout operation of the non-range of interest nROI independently and simultaneously in the ROI mode, the frame rate of the range of interest ROI may be 320 FPS, and the frame rate of the non-range of interest nROI may be 100 FPS. In an embodiment, the frame rate of the range of interest ROI and the frame rate of the non-range of interest nROI may be determined based on a ratio of the range of interest ROI or the non-range of interest nROI to the entire range.

As described above, the image sensor device 100 according to an embodiment of the present disclosure may support the fast frame rate with respect to a specific range or the range of interest ROI. In this case, because the readout operation of the range of interest ROI and the readout operation of the main range MR are simultaneously performed, the fast frame rate may be implemented in the range of interest ROI without the decrease in the frame rate of the main range MR.

Figure 12:
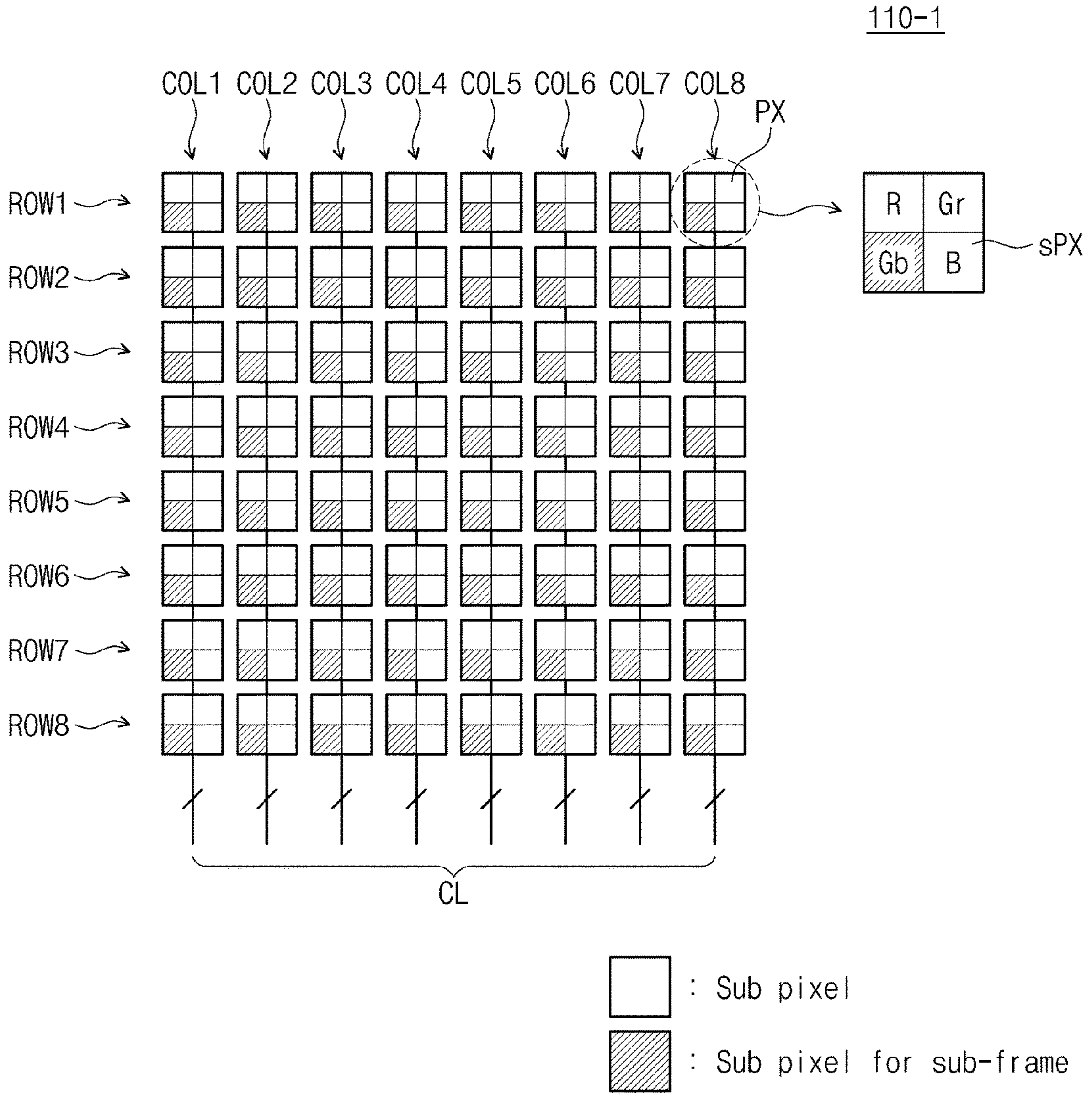
FIG. 12 is a diagram illustrating a pixel array of an image sensor device of FIG. 2.

FIG. 12 is a diagram illustrating a pixel array of an image sensor device of FIG. 2. Referring to FIGS. 2 and 12, the pixel array 110-1 may include the plurality of pixels PX. The plurality of pixels PX may be arranged along the plurality of rows ROW1 to ROW8 and the plurality of columns COL1 to COL8. Each of the plurality of pixels PX may include the plurality of sub-pixels sPX. The structures of the plurality of pixels PX and the plurality of sub-pixels sPX are similar to those described with reference to FIGS. 3A and 4, and thus, additional description will be omitted to avoid redundancy.

In an embodiment, at least one of the sub-pixels sPX of each pixel PX may be used to generate additional data. For example, a short exposure image may be required to compensate for or remove various quality reduction factors (e.g., motion blur) that occur in the image captured by the image sensor device 100. The image sensor device 100 may generate the short exposure image by using a specific sub-pixel among the sub-pixels of each pixel PX. Below, for convenience of description, the image or data that are obtained for image quality enhancement or additional information to be independent of the main data DT_M is referred to as a sub-frame, sub-frame data, or sub-data. As an example, sub-pixels (i.e., Gb-sub-pixels) corresponding to the second green filter Gb from among the plurality of sub-pixels may be used to generate the sub-data. However, the present disclosure is not limited thereto. For example, a location or color filter of sub-pixels used to generate the sub-data may be variously changed and modified.

As in the above description given with reference to FIGS. 5A and 5B, because the conventional image sensor device performs the readout operation in units of pixel row, to generate the sub-data, the conventional image sensor device generates the sub-data by using the time-interleaved scheme. In this case, as in the above description given with reference to FIGS. 5A and 5B, the frame rate of the main data DT_M may decrease, and the frame rate of the sub-data may also decrease.

According to embodiments of the present disclosure, the image sensor device 100 may simultaneously perform the readout operations on at least two rows. That is, the image sensor device 100 may generate the main data DT_M with respect to the main range MR through the readout operation on a specific row and may simultaneously generate sub-data DT_sub (refer to FIG. 15) through the readout operation on any other row. In other words, the image sensor device 100 may simultaneously perform the readout operation for generating the main data DT_M and the readout operation for generating the sub-data DT_sub. In this case, the sub-data may be generated at the frame rate of the main range MR without the decrease in the frame rate of the main range MR.

Figure 13:
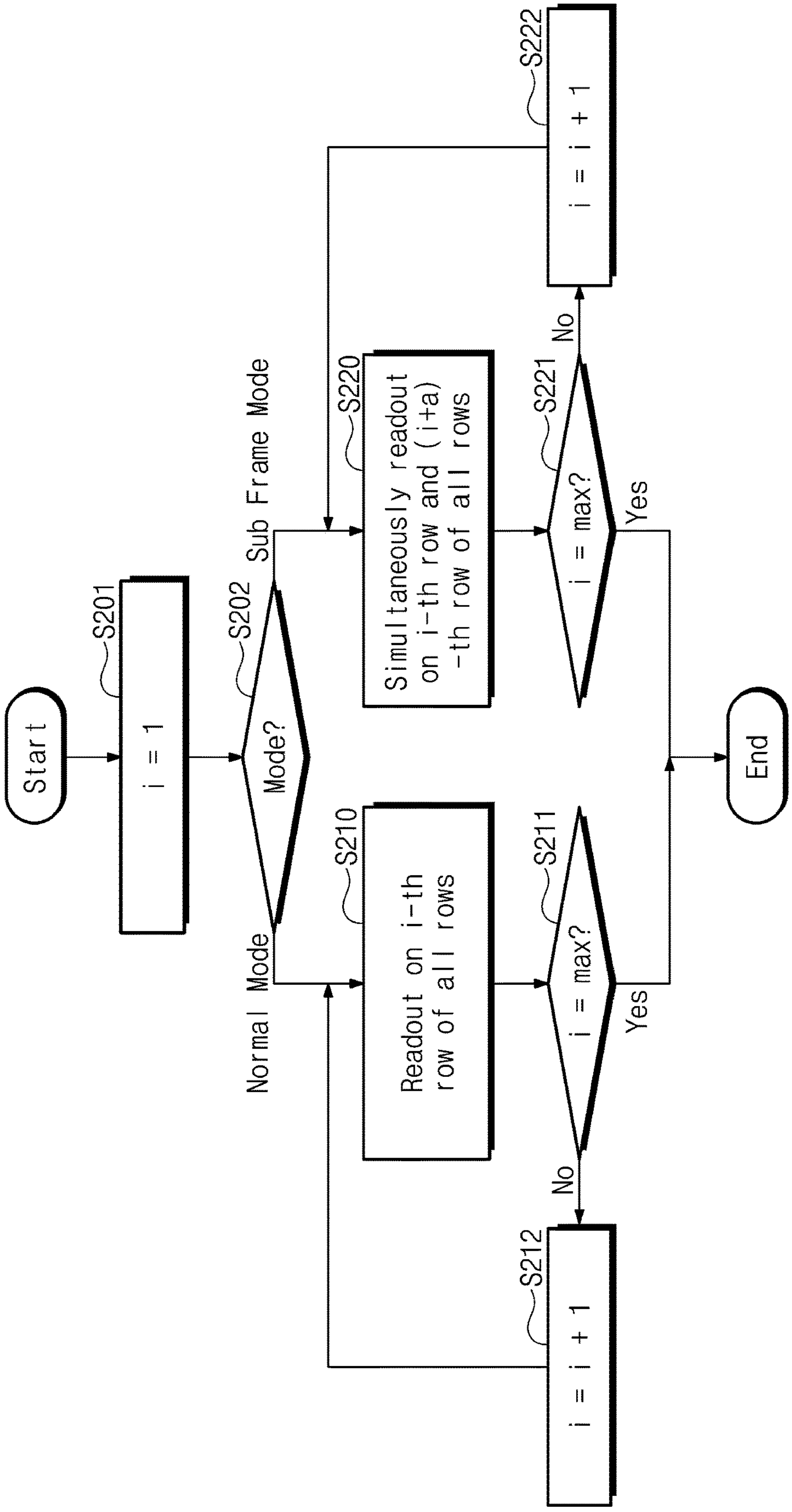
FIG. 13 is a flowchart illustrating an operation of an image sensor device including a structure of a pixel array of FIG. 12.

FIG. 13 is a flowchart illustrating an operation of an image sensor device including a structure of a pixel array of FIG. 12. In an embodiment, the sub-frame mode in which the image sensor device 100 simultaneously generates main data of a main range and sub-data.

Referring to FIGS. 2, 12, and 13, in operation S201, the variable "i" is set to "1". In operation S202, the image sensor device 100 may determine an operation mode. When the operation mode is the normal mode, the image sensor device 100 may perform operation S210, operation S211, and operation S212. Operation S210, operation S211, and operation S212 are similar to those described with reference to FIG. 6, and thus, additional description will be omitted to avoid redundancy.

When the operation mode is the sub-frame mode, in operation S220, the image sensor device 100 may simultaneously perform the readout operations on the i-th row and (i+a)-th row among the plurality of rows of the pixel array 110. For example, the image sensor device 100 may perform the readout operation on the pixel of the first row ROW1 for the purpose of generating the main data DT_M. Simultaneously, the image sensor device 100 may perform the readout operation on the pixel of the second row ROW2 for the purpose of generating the sub-data DT_sub. In an embodiment, the readout operation for generating the sub-data DT_sub may be performed with respect to a specific sub-pixel (e.g., the Gb-sub-pixel) among the sub-pixels included in the pixel of the second row ROW2.

In operation S221, whether the variable "i" is the maximum value may be determined. When the variable "i" is not the maximum value, in operation S222, the variable "i" increases as much as "1". Afterwards, the image sensor device 100 may again perform operation S220. In an embodiment, as the variable "i" increases, a value of (i+a) may exceed the maximum value of the variable "i"; in this case, the value of (i+a) may be determined to be "(i+a)−(a maximum value of a variable)". For example, when the number of rows included in the pixel array 110 is 1024 and the value of (i+a) is 1025, the value of (i+a) may be determined to be "1", and the image sensor device 100 may perform the readout operation on the pixels (or the sub-pixels) of the first row ROW1 for the purpose of generating the sub-data DT_sub.

When the variable "i" is the maximum value, the image sensor device 100 may end the readout operation associated with one frame. In an embodiment, when the variable "i" is the maximum value, the image sensor device 100 may again perform the readout operation of a next frame.

Figure 14:
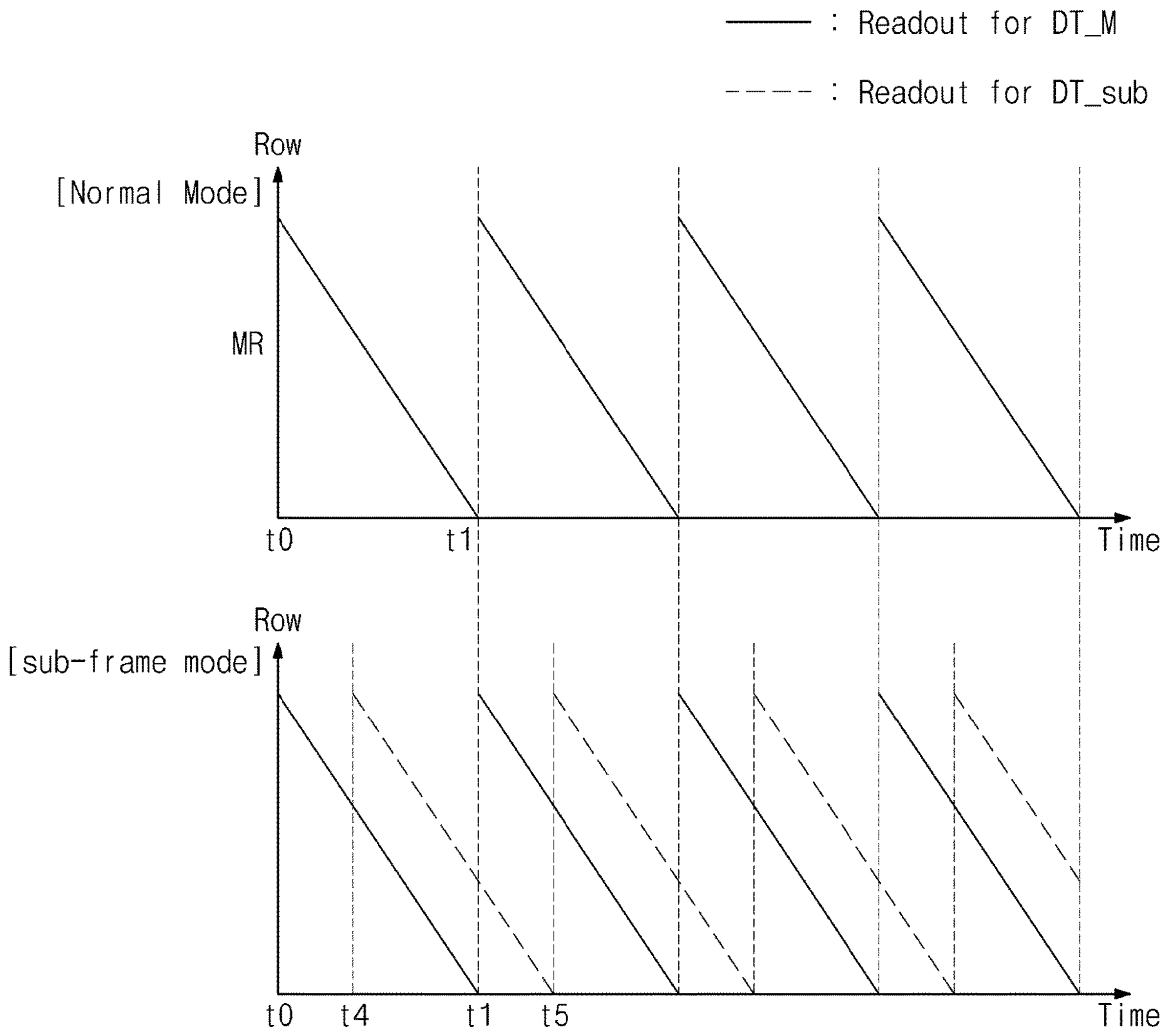
FIG. 14 is a graph for describing an operation of an image sensor device according to the flowchart of FIG. 13.

FIG. 14 is a graph for describing an operation of an image sensor device according to the flowchart of FIG. 13. Referring to FIGS. 2, 13, and 14, the image sensor device 100 may operate in the normal mode or the sub-frame mode. How the image sensor device 100 operates in the normal mode is described with reference to FIG. 7A, and thus, additional description will be omitted to avoid redundancy.

When the image sensor device 100 operates in the sub-frame mode, the image sensor device 100 may simultaneously perform the readout operation for generating the main data DT_M and the readout operation for generating the sub-data DT_sub. For example, during the time period from t0 to t1, the image sensor device 100 may sequentially perform the readout operations on the plurality of rows to generate the main data DT_M. During the time period from t4 to t5, the image sensor device 100 may sequentially perform the readout operations on a plurality of rows to generate the sub-data DT_sub. In this case, the readout operation for generating the main data DT_M and the readout operation for generating the sub-data DT_sub may be simultaneously performed. Components and operations necessary to implement the above operation are similar to those in the above ROI mode except that the readout operation for generating the sub-data DT_M is simultaneously performed In an embodiment, because the readout operation for generating the main data DT_M and the readout operation for generating the sub-data DT_sub are simultaneously performed, the frame rate of the main data DT_M may not decrease.

Figure 15:
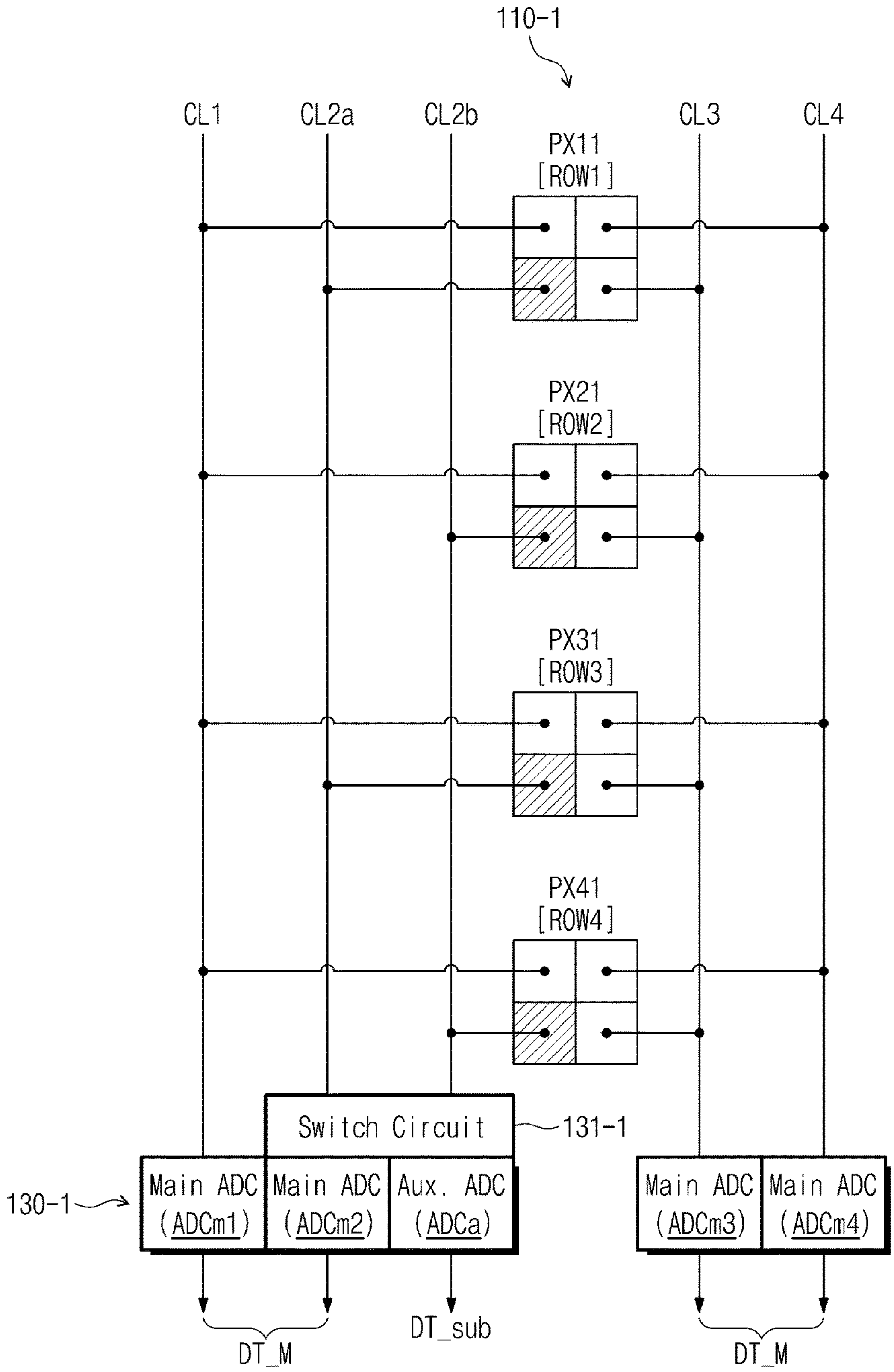
FIG. 15 is a diagram for describing an operation of an image sensor device according to the flowchart of FIG. 13.

FIG. 15 is a diagram for describing an operation of an image sensor device according to the flowchart of FIG. 13. An operation in which the main data DT_M and the sub-data DT_sub are generated by using the pixel signals output from the plurality of pixels PX11 to PX41 will be described with reference to FIG. 15. For brevity of drawing and for convenience of description, a partial configuration of the image sensor device 100 is illustrated, but the present disclosure is not limited thereto.

Referring to FIGS. 2 and 15, a pixel array 110-1 may include the plurality of pixels PX11 to PX41. Each of the plurality of pixels PX11 to PX41 may include the plurality of sub-pixels. The structure of the plurality of sub-pixels is described with reference to FIGS. 4 and 12, and thus, additional description will be omitted to avoid redundancy. The plurality of pixels PX11 to PX41 may be located at different rows and may operate in response to different row control signals.

In the embodiment of FIG. 3B, the sub-pixels (e.g., the Gr-sub-pixels) for generating the ROI data DT_ROI may operate in response to individual row control signals. However, in the embodiment of FIG. 15, the sub-pixels (e.g., the Gb-sub-pixels) for generating the sub-data DT_sub may operate in response to individual row control signals. In this case, the individual row control signal may indicate a row control signal that is physically distinguished from a row control signal for controlling the remaining pixels or sub-pixels of the same row.

The plurality of pixels PX11 to PX41 may be located at the same column. The plurality of pixels PX11 to PX41 may be connected to column lines CL1, CL2*a*, CL2*b*, CL3, and CL4. In detail, in the sub-pixels of the plurality of pixels PX11 to PX41, sub-pixels corresponding to the same color filter may be connected to the same column line. For example, as described above, the plurality of pixels PX11 to PX41 may correspond to the color filter array of the Bayer pattern. In the sub-pixels of the plurality of pixels PX11 to PX41, the R-sub-pixels may be connected to the first column line CL1, the Gr-sub-pixels may be connected to the fourth column line CL4, and the B-sub-pixels may be connected to the third column line CL3.

In the sub-pixels of the plurality of pixels PX11 to PX41, each Gb-sub-pixel may be connected to the 2a-th column line CL2*a* or the 2b-th column line CL2*b*. For example, the Gb-sub-pixels among the sub-pixels of the plurality of pixels PX11 to PX41 may be used to generate the sub-data DT_sub. As the Gb-sub-pixels of the pixels PX11 and PX31 of the first and third rows ROW1 and ROW3 are connected to the 2a-th column line CL2*a* and the Gb-sub-pixels of the pixels PX21 and PX41 of the second and fourth rows ROW2 and ROW4 are connected to the 2b-th column line CL2*b*, the readout operation for generating the sub-data DT_sub may be performed together with the readout operation on any other row (e.g., the readout operation for generating the main data DT_M).

A conversion circuit 130-1 may be connected to the plurality of column lines CL1, CL2*a*, CL2*b*, CL3, and CL4. The conversion circuit 130-1 may generate the main data DT M and the sub-data DT_sub based on the pixel signals received through the plurality of column lines CL1, CL2*a*, CL2*b*, CL3, and CL4.

For example, the conversion circuit 130-1 may include the plurality of main ADCs ADCm1 to ADCm4 and the auxiliary ADC ADCa. The plurality of main ADCs ADCm1 to ADCm4 may generate the main data DT_M based on the pixel signals received through the plurality of column lines CL1, CL2*a*, CL2*b*, CL3, and CL4. The auxiliary ADC ADCa may generate the sub-data DT_sub based on the pixel signals received through the column lines CL2*a* and CL2*b*.

The switching circuit 131-1 may be connected to the 2a-th and 2b-th column lines CL2*a* and CL2*b*. The switching circuit 131-1 may switch the connection of the 2a-th and 2b-th column lines CL2*a* and CL2*b* with the second main ADC ADCm2 and the auxiliary ADC ADCa such that the pixel signal corresponding to the main data DT_M is provided to the second main ADC ADCm2 and the pixel signal corresponding to the sub-data DT_sub is provided to the auxiliary ADC ADCa.

As described above, according to an embodiment of the present disclosure, even though sub-pixels that are used to generate the sub-data DT_sub are located at the same column, the sub-pixels may be connected to different column lines. In this case, the readout operation for generating the sub-data DT_sub and the readout operation for generating the main data DT_M may be simultaneously performed.

In an embodiment, as described above, the switching circuit 131-1 may perform the switching operation on column lines connected to the sub-pixels used to generate the sub-data DT_sub. In this case, because the sub-data DT_sub are output through the same ADC (i.e., the auxiliary ADC ADCa), the noise of the pixel signal may be easily removed, and the following image processing may be simplified.

FIGS. 16A to 16D are diagrams for describing an operation of an image sensor device of FIG. 15. For convenience of description, components that are unnecessary to describe an operation of the image sensor device 100 are omitted.

Figure 16A:
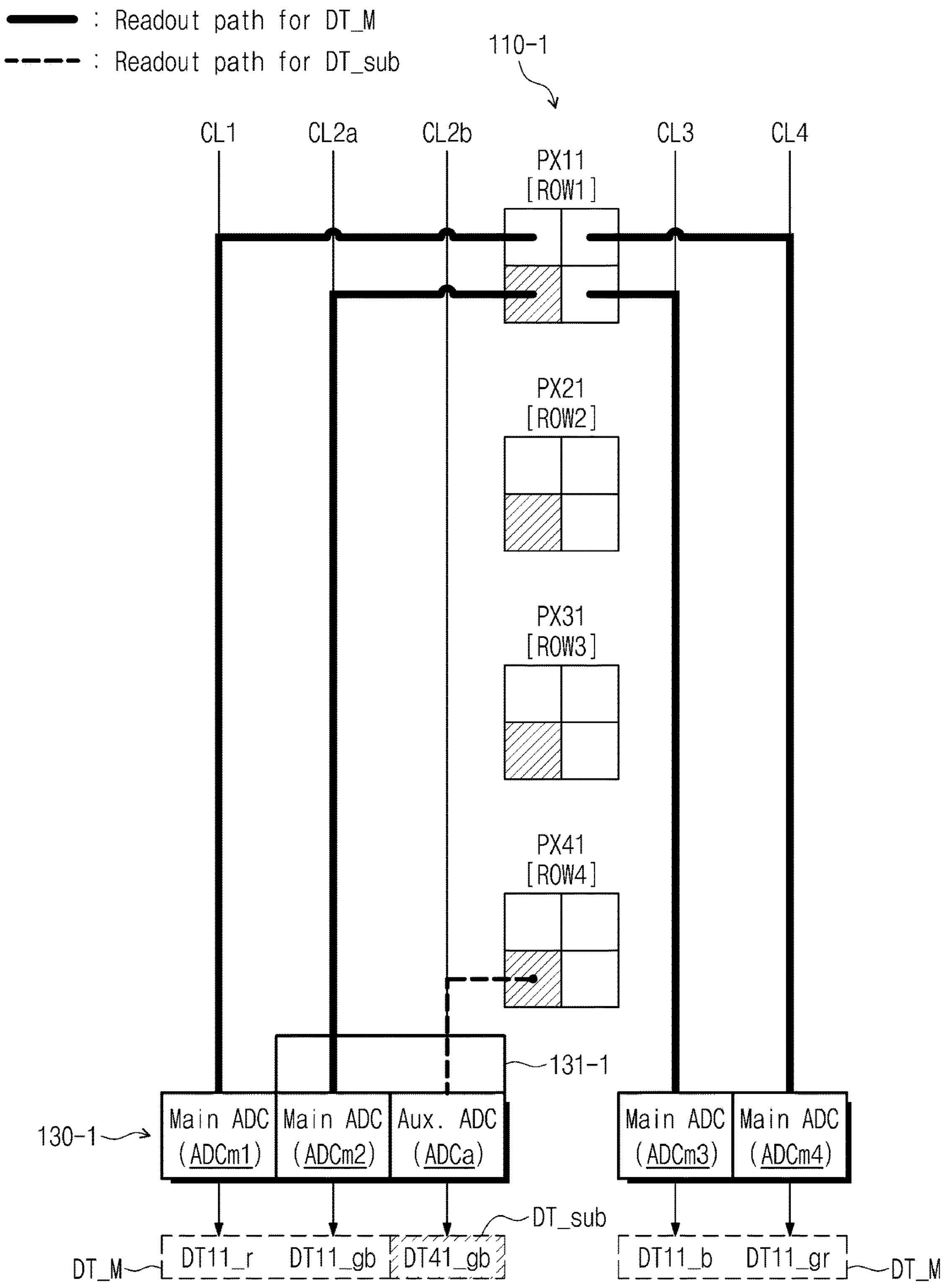
FIGS. 16A to 16D are diagrams for describing an operation of an image sensor device of FIG. 15.

First, as illustrated in FIG. 16A, the image sensor device 100 may simultaneously perform the readout operation on the first row ROW1 for the generation of the main data DT_M and the readout operation on the fourth row ROW4 for the generation of the sub-data DT_sub.

In this case, the R-sub-pixel, the B-sub-pixel, and the Gr-sub-pixel of the pixel PX11 of the first row ROW1 may respectively output the pixel signals through the first, third, and fourth column lines CL1, CL3, and CL4. The first, third, and fourth main ADCs ADCm1, ADCm3, and ADCm4 may respectively receive the pixel signals through the second the first, third, and fourth column lines CL1, CL3, and CL4 and may generate data DT11_*r*, DT11_*b*, and DT11_*gr* based on the received pixel signals.

The Gb-sub-pixel among the sub-pixels of the pixel PX11 of the first row ROW1 may output the pixel signal through the 2a-th column line CL2*a*. The Gb-sub-pixel among the sub-pixels of the pixel PX41 of the fourth row ROW4 may output the pixel signal through the 2b-th column line CL2*b*.

In the embodiment of FIG. 16A, the switching circuit 131-1 may perform a third switching operation such that the 2a-th column line CL2*a* is connected to the second main ADC ADCm2 and the 2b-th column line CL2*b* is connected to the auxiliary ADC ADCa.

Through the third switching operation of the switching circuit switching circuit 131-1, the second main ADC ADCm2 may receive the pixel signal from the Gb-sub-pixel among the sub-pixels of the pixel PX11 of the first row ROW1 through the 2a-th column line CL2*a* and may generate data DT11_*gb* based on the received pixel signal.

Through the third switching operation of the switching circuit 131-1, the auxiliary ADC ADCa may receive the pixel signal from the Gb-sub-pixel among the sub-pixels of the pixel PX41 of the fourth row ROW4 through the 2b-th column line CL2*b* and may generate data DT41_*gb* based on the received pixel signal.

Figure 16B:
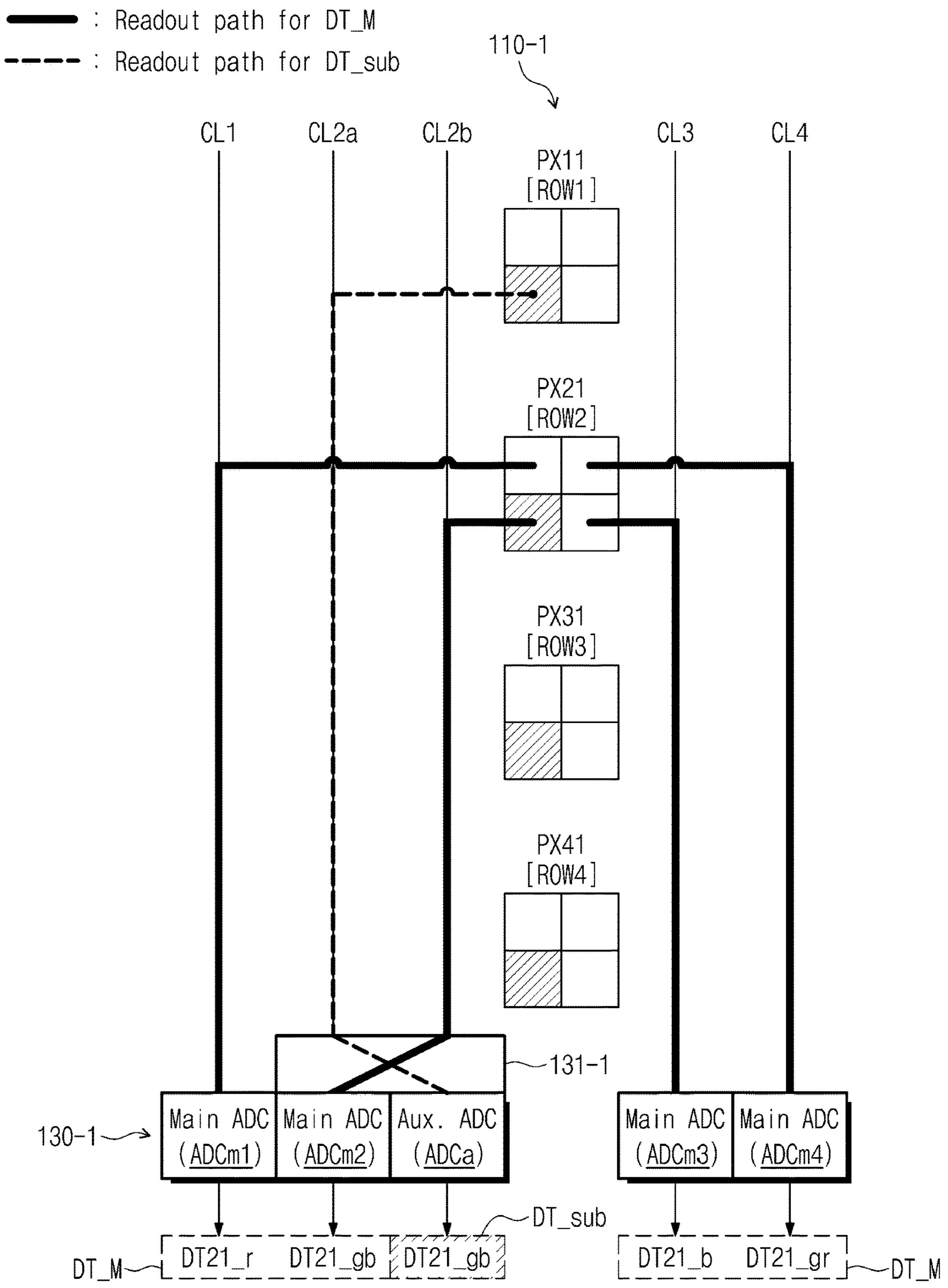

Next, as illustrated in FIG. 16B, the image sensor device 100 may simultaneously perform the readout operation on the second row ROW2 for the generation of the main data DT_M and the readout operation on the first row ROW1 for the generation of the sub-data DT_sub. The embodiment of FIG. 16B is similar to the embodiment of FIG. 16A except that the readout operations are performed with respect to different rows and the operation of the switching circuit 131-1 is reversed.

Through the operation of FIG. 16B, data DT21_*r*, DT21_*gb*, DT21_*b*, and DT21_*gr* corresponding to the pixel PX21 of the second row ROW2 may be generated from the first to fourth main ADCs ADCm1 to ADCm4, and data DT21_*gb* corresponding to the Gb-sub-pixel of the pixel PX11 of the first row ROW1 may be generated from the auxiliary ADC ADCa.

Figure 16C:
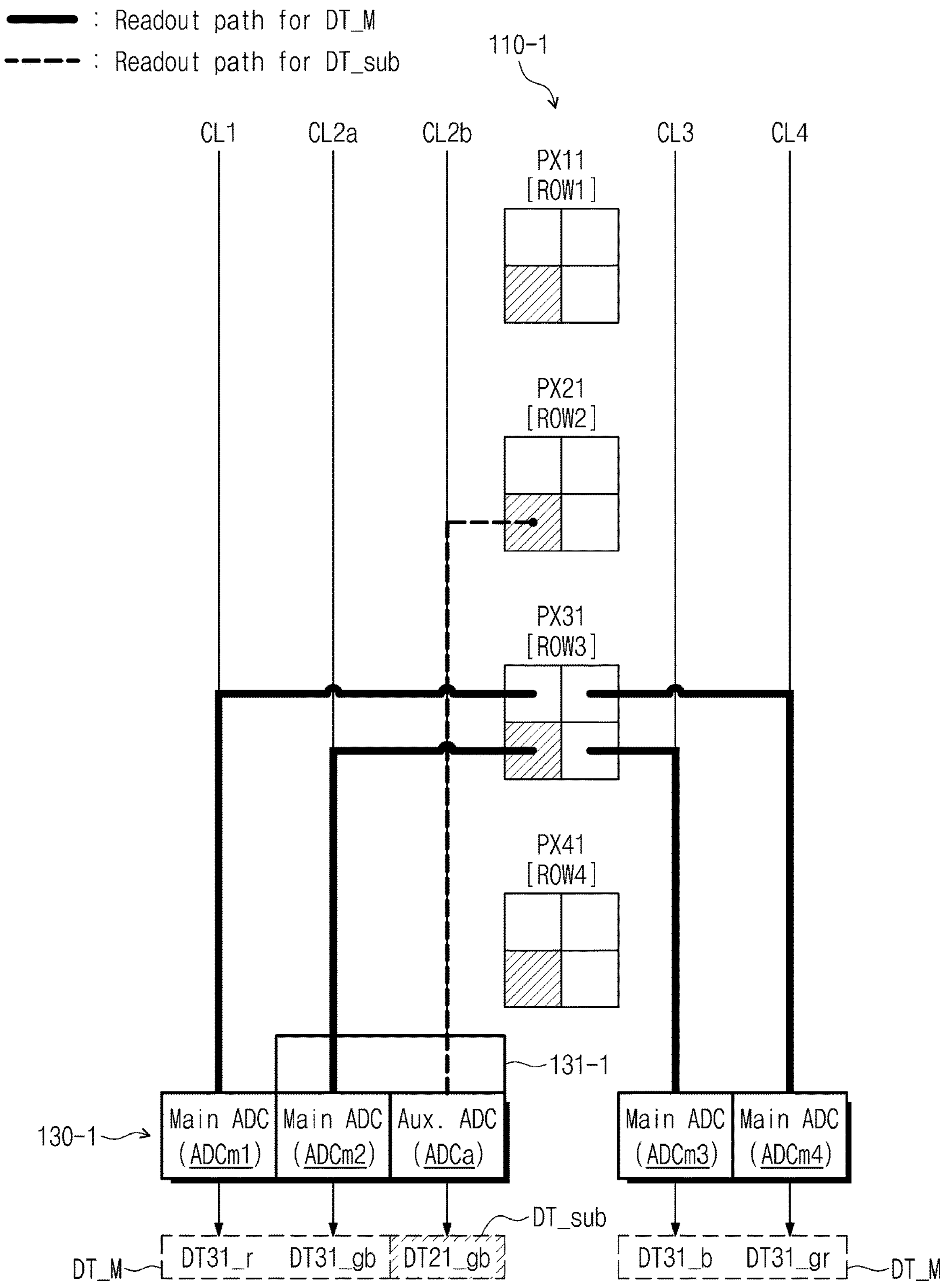

Next, as illustrated in FIG. 16C, the image sensor device 100 may simultaneously perform the readout operation on the third row ROW3 for the generation of the main data DT_M and the readout operation on the second row ROW2 for the generation of the sub-data DT_sub. The embodiment of FIG. 16C is similar to the embodiment of FIG. 16B except that the readout operations are performed with respect to different rows and the operation of the switching circuit 131-1 is reversed.

Through the operation of FIG. 16C, data DT31_*r*, DT31_*gb*, DT31_*b*, and DT31_*gr* corresponding to the pixel PX31 of the third row ROW3 may be generated from the first to fourth main ADCs ADCm1 to ADCm4, and data DT21_*gb* of the Gb-sub-pixel of the pixel PX21 of the second row ROW2 may be generated from the auxiliary ADC ADCa.

Figure 16D:
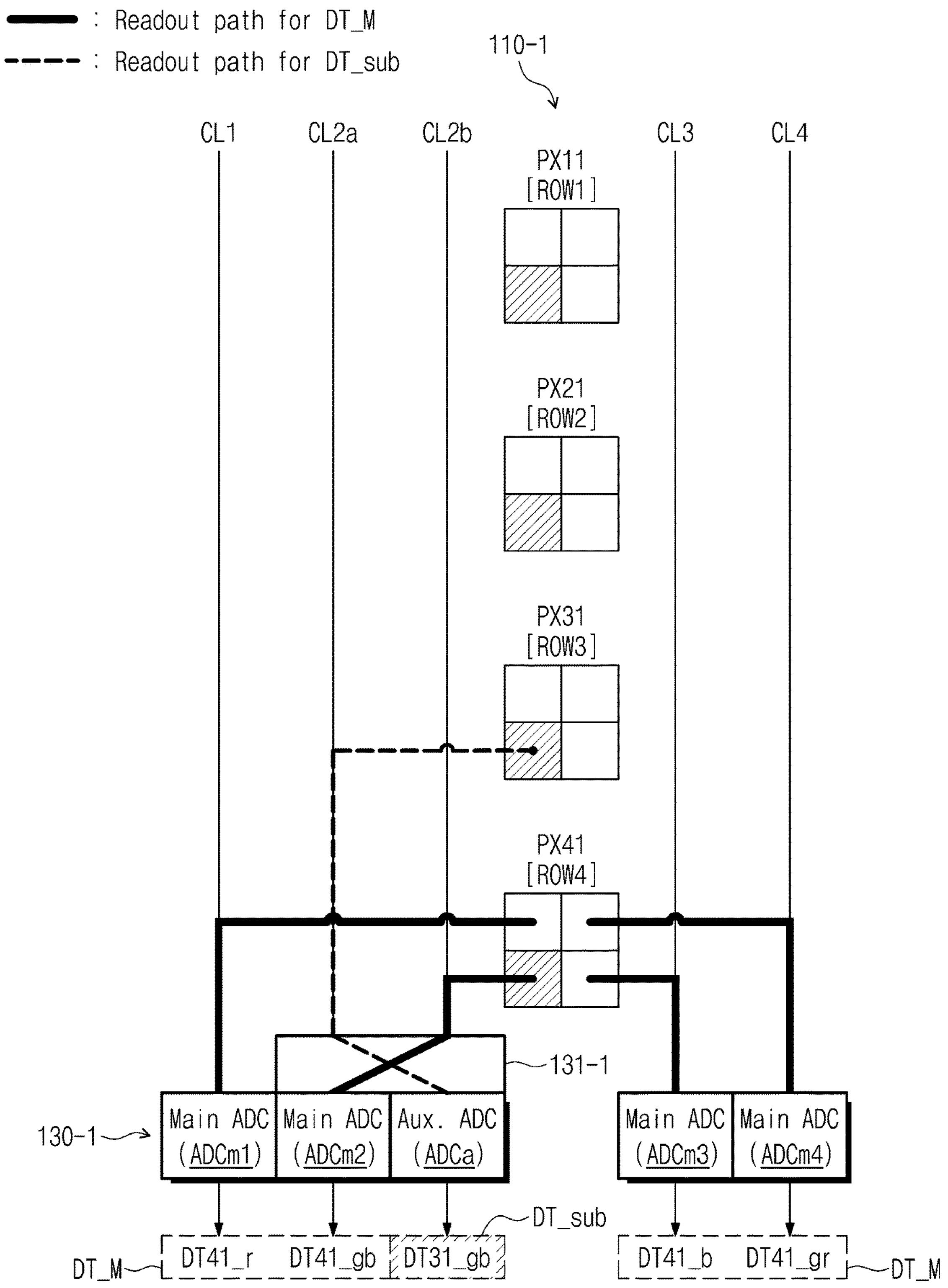

Then, as illustrated in FIG. 16D, the image sensor device 100 may simultaneously perform the readout operation on the fourth row ROW4 for the generation of the main data DT_M and the readout operation on the third row ROW3 for the generation of the sub-data DT_sub. The embodiment of FIG. 16D is similar to the embodiment of FIG. 16A or 16C except that the readout operations are performed with respect to different rows and the operation of the switching circuit 131-1 is reversed.

Through the operation of FIG. 16D, data DT41_*r*, DT41_*gb*, DT41_*b*, and DT41_*gr* corresponding to the pixel PX41 of the fourth row ROW4 may be generated from the first to fourth main ADCs ADCm1 to ADCm4, and data DT31_*gb* of the Gb-sub-pixel of the pixel PX31 of the third row ROW3 may be generated from the auxiliary ADC ADCa.

In an embodiment, the data DT11_*r*, DT11_*gb*, DT11_*b*, DT11_*gr*, DT21_*r*, DT21_*gb*, DT21_*b*, DT21_*gr*, DT31_*r*, DT31_*gb*, DT31_*b*, DT31_*gr*, DT41_*r*, DT41_*gb*, DT41_*b*, and DT41_*gr* generated from the first to fourth main ADCs ADCm1 to ADCm4 may be included in the main data DT_M, and the data DT41_*gb*, DT11_*gb*, DT21_*gb*, and DT_31_*gb* generated from the auxiliary ADC ADCa may be included in the sub-data DT_sub.

In this case, while one readout operation is performed for each of the first to fourth rows ROW1 to ROW4 with regard to the main data DT_M, one readout operation is performed for each of the first to fourth rows ROW1 to ROW4 with regard to the sub-data DT_sub. That is, the sub-data DT_sub may be generated at the frame rate of the main data DT_M without the decrease in the frame rate of the main data DT_M.

Figure 17:
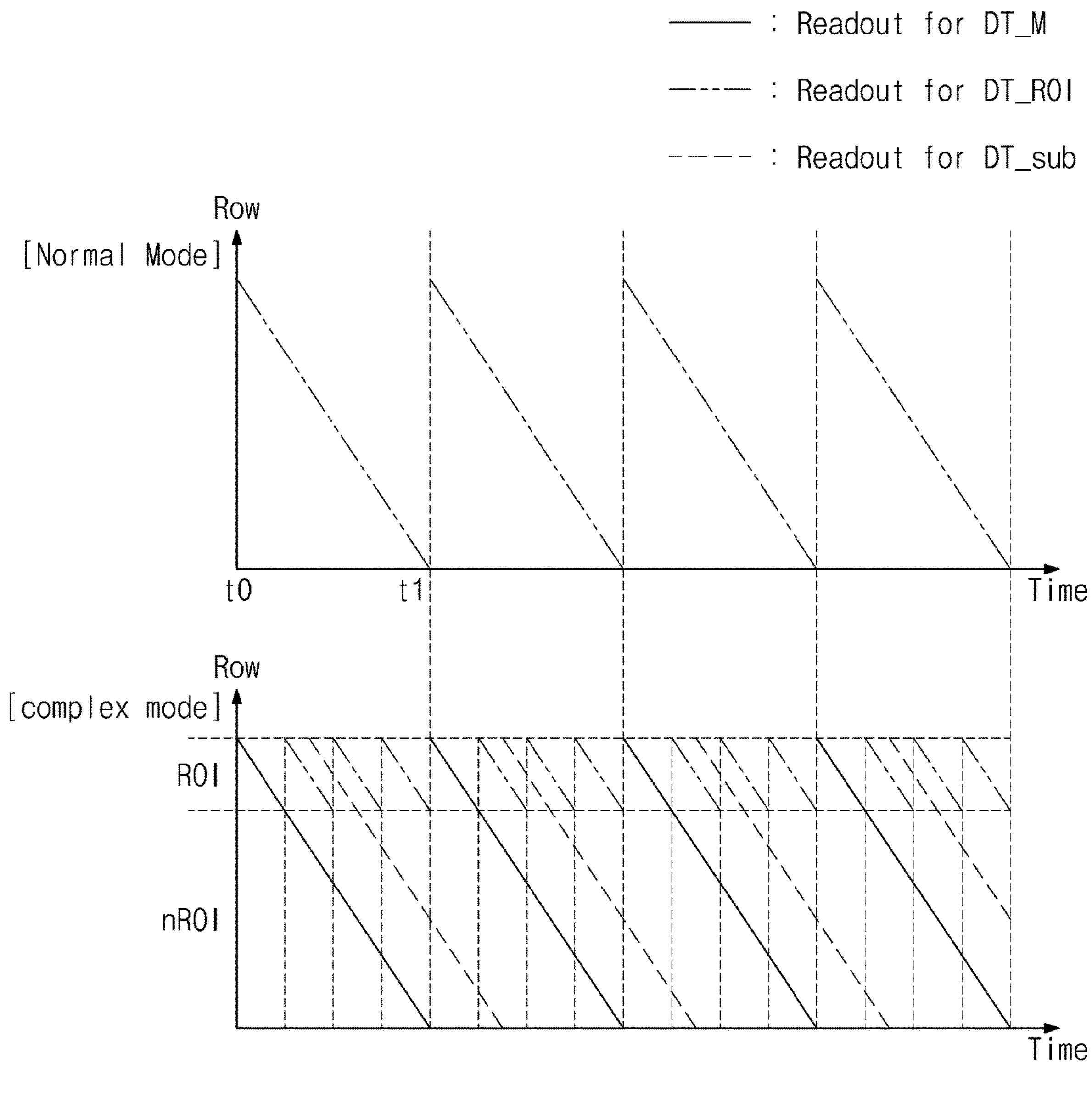
FIG. 17 is a graph for describing an operation of an image sensor device of FIG. 2.

FIG. 17 is a graph for describing an operation of an image sensor device of FIG. 2. In the above embodiments, the image sensor device 100 that operates based on the normal mode, the ROI mode, or the sub-frame mode is described. However, the present disclosure is not limited thereto.

Referring to FIGS. 2 and 17, the image sensor device 100 may operate in the complex mode. For example, the image sensor device 100 may sequentially perform the readout operations on the plurality of rows for the purpose generating the main data DT_M. Simultaneously, the image sensor device 100 may sequentially perform the readout operations on the rows included in the range of interest ROI for the purpose of generating the ROI data DT_ROI. Simultaneously, the image sensor device 100 may sequentially perform the readout operations on the plurality of rows for the purpose of generating the sub-data DT_sub. That is, the image sensor device 100 may simultaneously generate the main data DT_M, the ROI data DT_ROI, and the sub-data DT_sub by simultaneously performing the readout operations on at least three rows. In this case, as in the above description, the sub-data DT_sub may be generated at the same frame rate as the main data DT_M and the ROI data DT_ROI of the fast frame without the decrease in the frame rate of the main data DT_M.

In an embodiment, the complex mode of the image sensor device 100 of FIG. 17 corresponds to a combination of the ROI mode and the sub-frame mode, which will be described in detail with reference to FIGS. 18 and 19.

Figure 18:
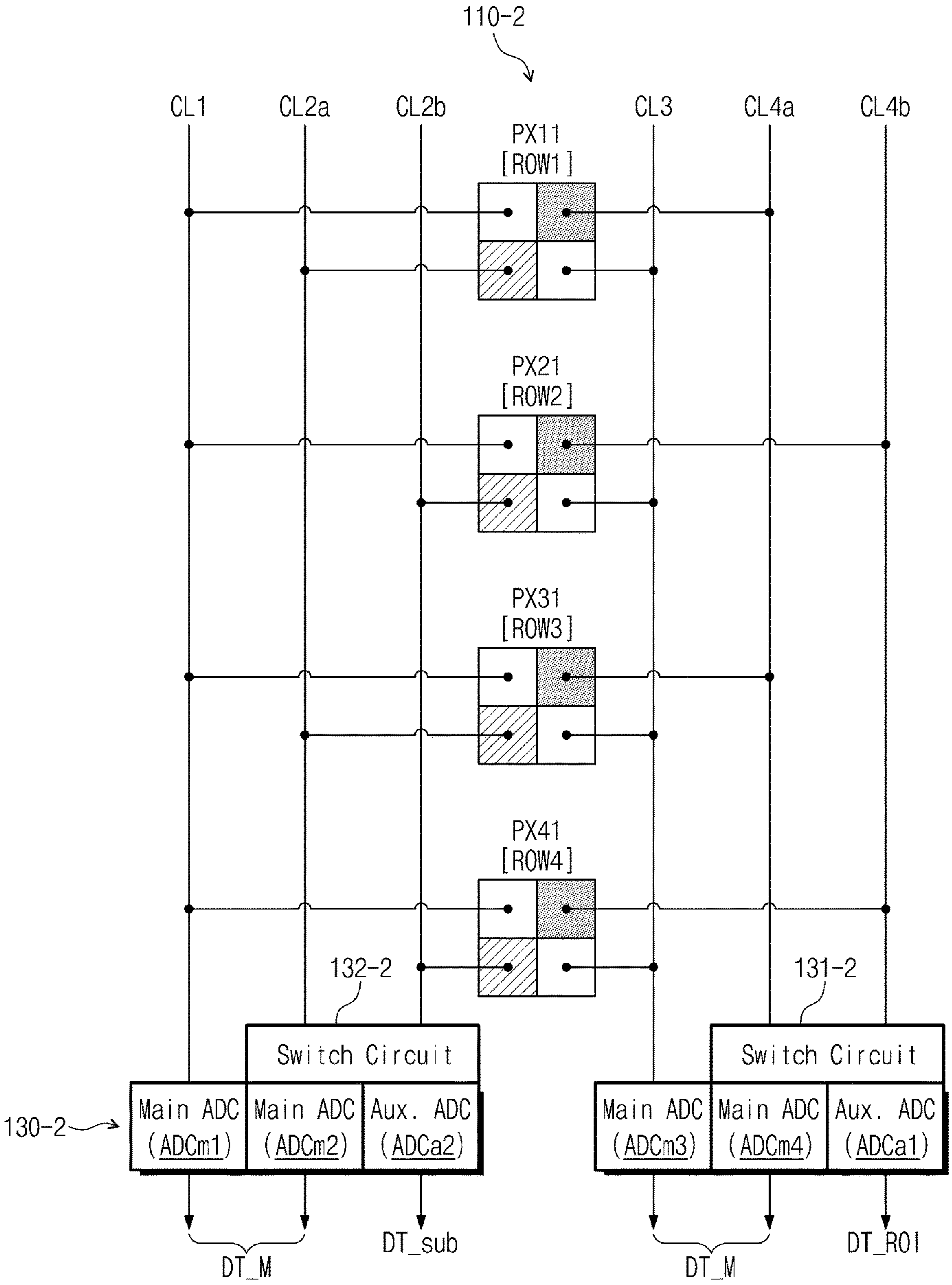
FIG. 18 is a diagram for describing an operation of an image sensor device according to the graph of FIG. 17.

FIG. 18 is a diagram for describing an operation of an image sensor device according to the graph of FIG. 17. An operation in which the main data DT_M, the ROI data DT_ROI, and the sub-data DT_sub are generated by using the pixel signals output from the plurality of pixels PX11 to PX41 will be described with reference to FIG. 18. For brevity of drawing and for convenience of description, a partial configuration of the image sensor device 100 is illustrated, but the present disclosure is not limited thereto.

Referring to FIGS. 2 and 18, a pixel array 110-2 may include the plurality of pixels PX11 to PX41. Each of the plurality of pixels PX11 to PX41 may include the plurality of sub-pixels. The structure of the plurality of sub-pixels is described with reference to FIG. 4, and thus, additional description will be omitted to avoid redundancy.

The plurality of pixels PX11 to PX41 may be located at different rows and may operate in response to different row control signals. In an embodiment, as in the above description, in the sub-pixels of the plurality of pixels PX11 to PX41, the sub-pixels corresponding to the first green filter Gr may be used to generate the ROI data DT_ROI, and the sub-pixels corresponding to the second green filter Gb may be used to generate the sub-data DT_sub. In this case, in the sub-pixels of the plurality of pixels PX11 to PX41, the sub-pixels corresponding to the first green filter Gr and the sub-pixels corresponding to the second green filter Gb may operate in response to individual row control signals. In an embodiment, the individual row control signal may indicate a row control signal that is physically distinguished from a row control signal for controlling the pixels of the same row or the sub-pixels of the same row.

The plurality of pixels PX11 to PX41 may be located at the same column. The plurality of pixels PX11 to PX41 may be connected to the column lines CL1, CL2*a*, CL2*b*, CL3, CL4*a*, and CL4*b*. In detail, in the sub-pixels of the plurality of pixels PX11 to PX41, sub-pixels corresponding to the same color filter may be connected to the same column line. For example, as described above, the plurality of pixels PX11 to PX41 may correspond to the color filter array of the Bayer pattern. In the sub-pixels of the plurality of pixels PX11 to PX41, the sub-pixels corresponding to the red filter "R" may be connected to the first column line CL1, the sub-pixels corresponding to the blue filter "B" may be connected to the third column line CL3. In the sub-pixels of the plurality of pixels PX11 to PX41, the sub-pixels corresponding to the first green filter Gr may be connected to the 4a-th and 4b-th column lines CL4*a* and CL4*b*, and the sub-pixels corresponding to the second green filter Gb may be connected to the 2a-th and 2b-th column lines CL2*a* and CL2*b*.

In this case, as described above, even though the readout operation is performed with respect to a specific row to generate the main data DT_M, the readout operations may be simultaneously performed with respect to any other rows for generating the ROI data DT_ROI and the sub-data DT_sub.

A conversion circuit 130-2 may be connected to the plurality of column lines CL1, CL2*a*, CL2*b*, CL3, CL4*a*, and CL4*b*. The conversion circuit 130-2 may generate the main data DT_M, the ROI data DT_ROI, and the sub-data DT_sub based on the pixel signals received through the plurality of column lines CL1, CL2*a*, CL2*b*, CL3, CL4*a*, and CL4*b*.

For example, the conversion circuit 130-2 may include switching circuits 131-2 and 132-2, the plurality of main ADCs ADCm1 to ADCm4, and auxiliary ADCs ADCa1 and ADCa2. The plurality of main ADCs ADCm1 to ADCm4 may generate the main data DT_M based on the pixel signals received through the plurality of column lines CL1, CL2*a*, CL2*b*, CL3, CL4*a*, and CL4*b*. The first auxiliary ADC ADCa1 may generate the ROI data DT_ROI based on the pixel signals received through the column lines CL4*a* and CL4*b*. The second auxiliary ADC ADCa2 may generate the sub-data DT_sub based on the pixel signals received through the column lines CL2*a* and CL2*b*.

The first switching circuit 131-2 may be connected to the 4a-th and 4b-th column lines CL4*a* and CL4*b*. The first switching circuit 131-2 may switch the connection of the 4a-th and 4b-th column lines CL4*a* and CL4*b* with the fourth main ADC ADCm4 and the first auxiliary ADC ADCa1 such that the pixel signal corresponding to the main data DT_M is provided to the fourth main ADC ADCm4 and the pixel signal corresponding to the ROI data DT_ROI is provided to the first auxiliary ADC ADCa1.

The second switching circuit 132-2 may be connected to the 2a-th and 2b-th column lines CL2*a* and CL2*b*. The second switching circuit 132-2 may switch the connection of the 2a-th and 2b-th column lines CL2*a* and CL2*b* with the second main ADC ADCm2 and the second auxiliary ADC ADCa2 such that the pixel signal corresponding to the main data DT_M is provided to the second main ADC ADCm2 and the pixel signal corresponding to the sub-data DT_sub is provided to the second auxiliary ADC ADCa2.

As described above, according to an embodiment of the present disclosure, even though the sub-pixels used to generate the ROI data DT_ROI and the sub-pixels used to generate the sub-data DT_sub are located at the same column, the sub-pixels may be connected to different column lines. In this case, the readout operations for generating the main data DT_M, the ROI data DT_ROI, and the sub-data DT_sub may be simultaneously performed.

Figure 19:
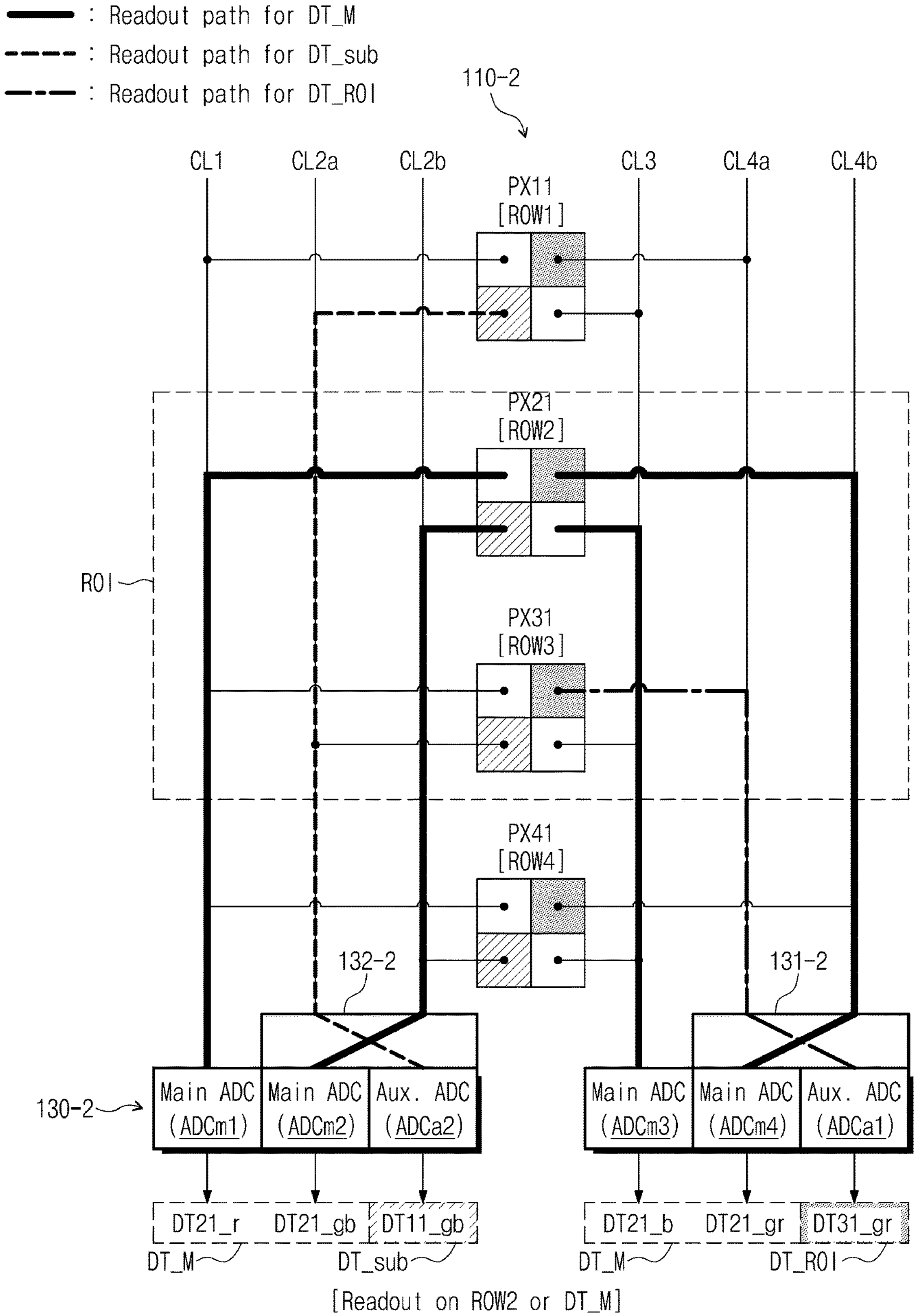
FIG. 19 is a diagram for describing an operation of an image sensor device of FIG. 18.

FIG. 19 is a diagram for describing an operation of an image sensor device of FIG. 18. In the embodiment of FIG. 19, it is assumed that the second row ROW2 and the third row ROW3 belong to the range of interest ROI. That is, the image sensor device 100 may sequentially perform the readout operations on the first to fourth rows ROW1 to ROW4 for the purpose of generating the main data DT_M. The image sensor device 100 may sequentially/repeatedly perform the readout operations on the second and third rows ROW2 and ROW3 for the purpose of generating the ROI data DT_ROI. Also, the image sensor device 100 may sequentially perform the readout operations on the first to fourth rows ROW1 to ROW4 for the purpose of generating the sub-data DT_sub.

For convenience of description, components that are unnecessary to describe an operation of the image sensor device 100 are omitted.

Referring to FIGS. 2, 18, and 19, the image sensor device 100 may perform the readout operation on the second row ROW2 to generate the main data DT_M. At the same time, the image sensor device 100 may perform the readout operation on the third row ROW3 for the purpose of generating the ROI data DT_ROI. Simultaneously, the image sensor device 100 may perform the readout operation on the first row ROW1 for the purpose of generating the sub-data DT_sub.

In this case, the R-sub-pixel, the Gb-sub-pixel, the B-sub-pixel, and the Gr-sub- pixel of the pixel PX21 of the second row ROW2 may respectively output the pixel signals through the first, 2b-th, third, and 4b-th column lines CL1, CL2*b*, CL3, and CL4*b*. The Gb-sub-pixel among the sub-pixels of the pixel PX11 of the first row ROW1 may output the pixel signal through the 2a-th column line CL2*a*. The Gr-sub-pixel among the sub-pixels of the pixel PX31 of the third row ROW3 may output the pixel signal through the 4a-th column line CL4*a*.

In this case, the pixel signals corresponding to the main data DT_M are output through the 1, 2b-th, third, and 4b-th column lines CL1, CL2*b*, CL3, and CL4*b*, the pixel signal corresponding to the sub-data DT_sub is output through the 2a-th column line CL2*a*, and the pixel signal corresponding to the ROI data DT_ROI is output through the 4a-th column line CL4*a*. To this end, the first switching circuit 131-2 may perform the second switching operation such that the 4a-th column line CL4*a* is connected to the first auxiliary ADC ADCa1 and the 4b-th column line CL4*b* is connected to the fourth main ADC ADCm4 and may perform the fourth switching operation such that the 2a-th column line CL2*a* is connected to the second auxiliary ADC ADCa2 and the 2b-th column line CL2*b* is connected to the second main ADC ADCm2.

As such, the first to fourth main ADCs ADCm1 to ADCm4 may respectively generate data DT21_*r*, DT21_*gb*, DT21_*b*, and DT21_*gr* based on the received pixel signals, the first auxiliary ADC ADCa1 may generate the data DT31_*gr* based on the received pixel signal, and the second auxiliary ADC ADCa2 may generate the data DT11_*gb* based on the received pixel signal. In this case, the data DT21_*r*, DT21_*gb*, DT21_*b*, and DT21_*gr* generated by the first to fourth main ADCs ADCm1 to ADCm4 may be included in the main data DT_M, the data DT31_*gr* generated by the first auxiliary ADC ADCa1 may be included in the ROI data DT_ROI, and the data DT11_*gb* generated by the second auxiliary ADC ADCa2 may be included in the sub-data DT_sub.

As in the above description, the image sensor device 100 may simultaneously generate the main data DT_M, the ROI data DT_ROI, and the sub-data DT_sub by repeatedly performing the readout operations on the plurality of rows.

An embodiment in which ROI data DT_ROI and the sub-data DT_sub are generated through the readout operations on different rows is described with reference to FIGS. 18 and 19, but the present disclosure is not limited thereto. For example, the readout operation may be performed with respect to the same row to generate the ROI data DT_ROI and the sub-data DT_sub. In detail, in the embodiments of FIG. 18, the readout operation may be performed with respect to the pixel PX31 of the third row ROW3 to generate the main data DT_M, and the readout operation may be performed with respect to the second row ROW2 to generate the ROI data DT_ROI and the sub-data DT_sub. In this case, the readout operation on the second row ROW2 may be performed with respect to the Gr-sub-pixel and the Gb-sub-pixel, the pixel signal output from the Gr-sub-pixel of the pixel PX21 may be provided to the switching circuit 131-2 through the 4b-th column line CL4*b*, and the pixel signal output from the Gb-sub-pixel of the pixel PX21 may be provided to the switching circuit 132-2 through the 2b-th column line CL2*b*. The switching circuits 131-2 and 132-2 may perform the switching operations such that the 4b-th column line CL4*b* and the 2b-th column line CL2*b* are respectively connected to the first auxiliary ADC ADCa1 and the second auxiliary ADC ADCa2. As such, the ROI data DT_ROI and the sub-data DT_sub may be normally generated.

An embodiment in which the ROI data DT_ROI and the sub-data DT_sub are generated through the readout operations on different colors is described with reference to FIGS. 18 and 19, but the present disclosure is not limited thereto. For example, the ROI data DT_ROI and the sub-data DT_sub may be generated by using sub-pixels (e.g., the Gr-sub-pixels) of the same color. In this case, the Gr-sub-pixels of the 3(n−2)-th rows (n being a natural number) may be connected to an a-th column line, the Gr-sub-pixels of the 3(n−1)-th rows may be connected to a b-th column line, and the Gr-sub-pixels of the 3n-th rows may be connected to a c-th column line. As such, the readout operation on one of the 3(n−2)-th rows, the readout operation on one of the 3(n−1)-th rows, and the readout operation on one of the 3n-th rows may be simultaneously performed, and the main data DT_M, the ROI data DT_ROI, and the sub-data DT_sub may be respectively generated by the readout operations thus performed.

Figure 20:
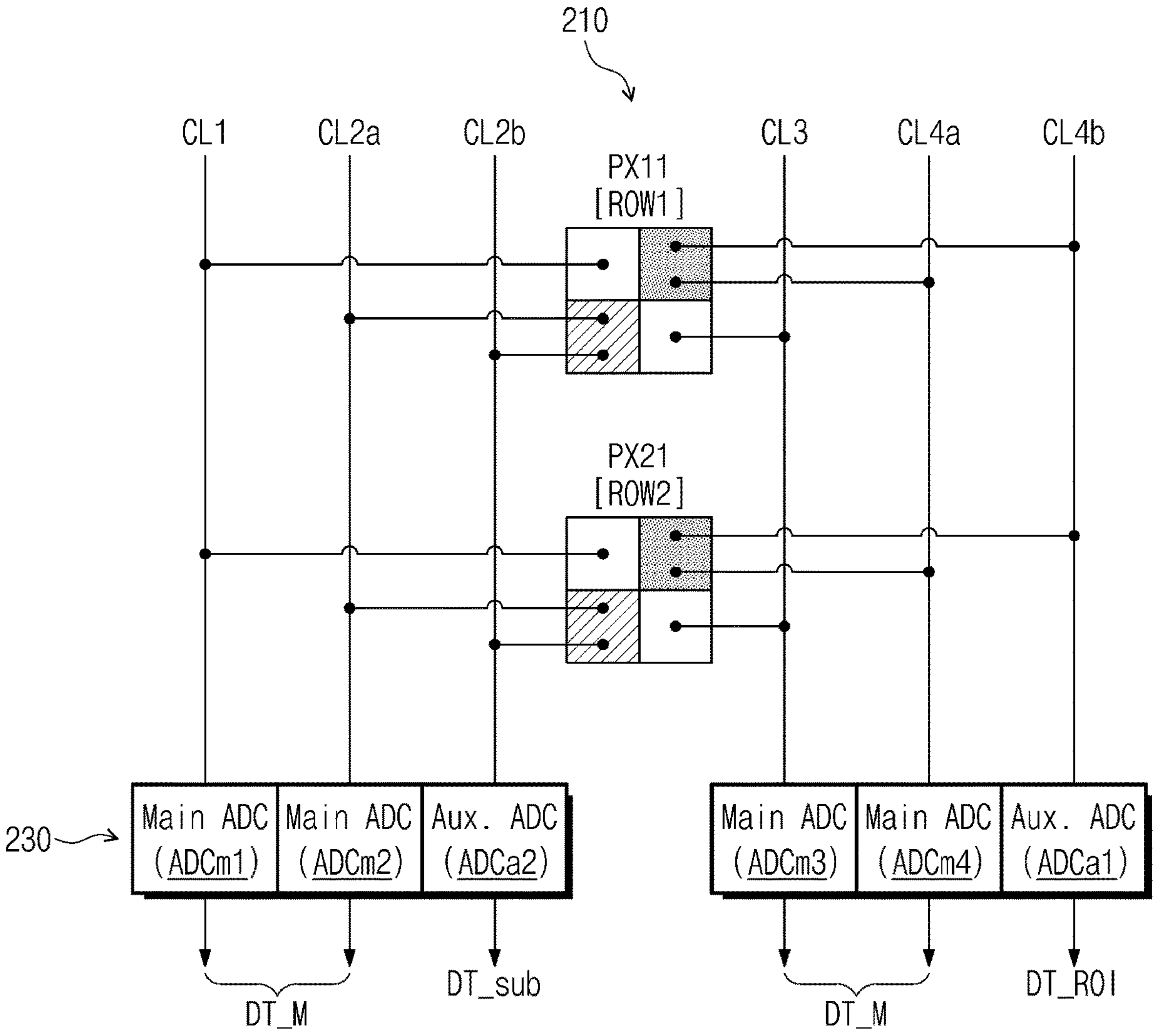
FIG. 20 is a diagram illustrating a portion of an image sensor device according to an embodiment of the present disclosure.

FIG. 20 is a diagram illustrating a portion of an image sensor device according to an embodiment of the present disclosure. For convenience of description, additional description associated with the components described above will be omitted to avoid redundancy. A pixel array 210 and a conversion circuit 230 illustrated in FIG. 20 may be replaced with the pixel array 110 and the conversion circuit 130 of FIG. 2.

Referring to FIG. 20, the pixel array 210 may include a plurality of pixels PX11 and PX21. Each of the plurality of pixels PX11 and PX21 may include a plurality of sub-pixels. In an embodiment, in each pixel, one of the sub-pixels may be used to generate the ROI data DT_ROI, and another thereof may be used to generate the sub-data DT_sub.

In an embodiment, as in the above description, the plurality of pixels PX11 and PX21 may include the color filter array of the Bayer pattern, the Gr-sub-pixels may be used to generate the ROI data DT_ROI, and the Gb-sub-pixels may be used to generate the sub-data DT_sub.

In this case, the R-sub-pixel may be connected to the first column line CL1, the B-sub-pixel may be connected to the third column line CL3, the Gr-sub-pixel may be connected to both the 4a-th column line CL4*a* and the 4b-th column line CL4*b*, and the Gb-sub-pixel may be connected to both the 2a-th column line CL2*a* and the 2b-th column line CL2*b*.

The conversion circuit 230 may include the plurality of main ADCs ADCm1 to ADCm4 and the plurality of auxiliary ADCs ADCa1 and ADCa2 The plurality of main ADCs ADCm1 to ADCm4 may be respectively connected to the first, 2a-th, third, and 4a-th column lines CL1, CL2*a*, CL3, and CL4*a* and may respectively generate pieces of data corresponding to the main data DT_M in response to the received pixel signals. The first auxiliary ADC ADCa1 may be connected to the 4b-th column line CL4*b* and may generate data corresponding to the ROI data DT_ROI based on the received pixel signal. The second auxiliary ADC ADCa2 may be connected to the 2b-th column line CL2*b* and may generate data corresponding to the sub-data DT_sub based on the received pixel signal.

In the above embodiments, the image sensor device 100 may simultaneously perform the readout operations on at least two rows for the purpose of simultaneously generating the main data DT_M, the ROI data DT_ROI, and the sub-data DT_sub. In this case, to output each of the main data DT_M, the ROI data DT_ROI, and the sub-data DT_sub through the same ADC, there is used a switching circuit configured to perform switching or routing between a plurality of column lines and a plurality of ADCs. However, the present disclosure is not limited thereto. For example, as described with reference to FIG. 20, some sub-pixels may be connected to two column lines. In this case, when the readout operation is performed with respect to the first row ROW 1 to generate the main data DT_M, the row control signal (e.g., the selection signal SEL) may be controlled such that the Gb-sub-pixel of the pixel PX11 outputs the pixel signal through the 2a-th column line CL2*a* and the Gr-sub-pixel of the pixel PX11 outputs the pixel signal through the 4a-th column line CL4*a*.

Alternatively, when the readout operation is performed with respect to the first row ROW1 to generate the sub-data DT_sub, the row control signal (e.g., the selection signal SEL) may be controlled such that the Gb-sub-pixel of the pixel PX11 outputs the pixel signal through the 2b-th column line CL2*b*.

Alternatively, when the readout operation is performed with respect to the first row ROW1 to generate the ROI data DT_ROI, the row control signal (e.g., the selection signal SEL) may be controlled such that the Gr-sub-pixel of the pixel PX11 outputs the pixel signal through the 4b-th column line CL4*b*.

As described above, column lines through which pixel signals from some sub-pixels are to be output may be determined based on a target (e.g., the main data DT_M, the ROI data DT_ROI, or the sub-data DT_sub) of the readout operation.

Figure 21:
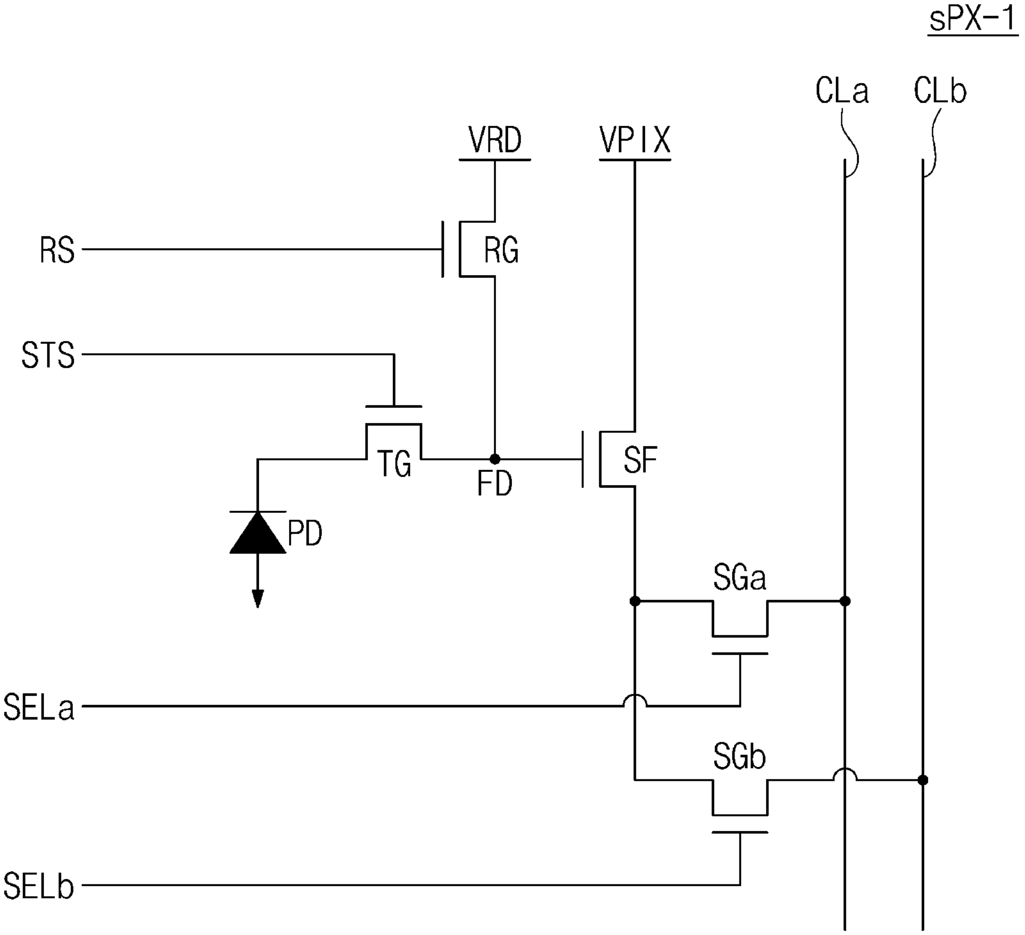
FIG. 21 is a circuit diagram illustrating one of a plurality of sub-pixels of FIG. 20.

FIG. 21 is a circuit diagram illustrating one of a plurality of sub-pixels of FIG. 20. Referring to FIGS. 20 and 21, a sub-pixel sPX-1 may include the photodiode PD, the transfer gate TG, the reset gate RG, the source follower SF, a first select gate SGa, and a second select gate SGb. The operations and the connection relationship of the photodiode PD, the transfer gate TG, the reset gate RG, and the source follower SF are similar to those described with reference to FIG. 4, and thus, additional description will be omitted to avoid redundancy.

The first select gate SGa may be connected between the source follower SF and an a-th column line CLa and may operate in response to a first selection signal SELa. The second select gate SGb may be connected between the source follower SF and a b-th column line CLb and may operate in response to a second selection signal SELb.

In an embodiment, it is assumed that the sub-pixel sPX-1, the a-th column line CLa, and the b-th column line CLb respectively correspond to the Gr-sub-pixel, the 4a-th column line CL4*a*, and the 4b-th column line CL4*b* of FIG. 20. That is, the main data DT_M or the ROI data DT_ROI may be generated based on the pixel signal output from the sub-pixel sPX-1. Accordingly, when the pixel signal output from the sub-pixel sPX-1 corresponds to the main data DT_M, the first selection signal SELa may be activated; when the pixel signal output from the sub-pixel sPX-1 corresponds to the ROI data DT_ROI, the second selection signal SELb may be activated. In an embodiment, the first and second selection signals SELa and SELb may be controlled by the row driver 120 (refer to FIG. 2).

Figure 22:
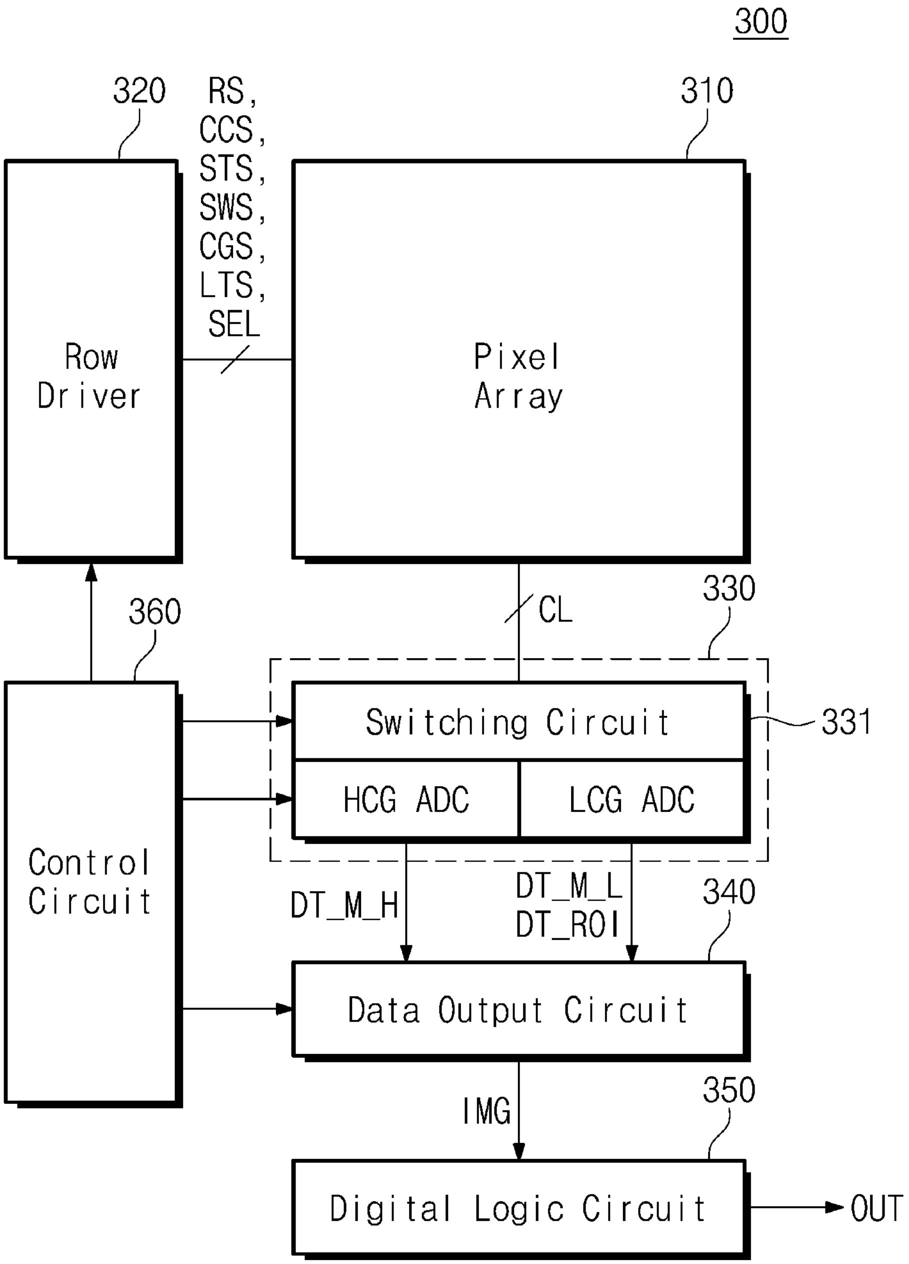
FIG. 22 is a block diagram illustrating an image sensor device according to an embodiment of the present disclosure.
Figure 23:
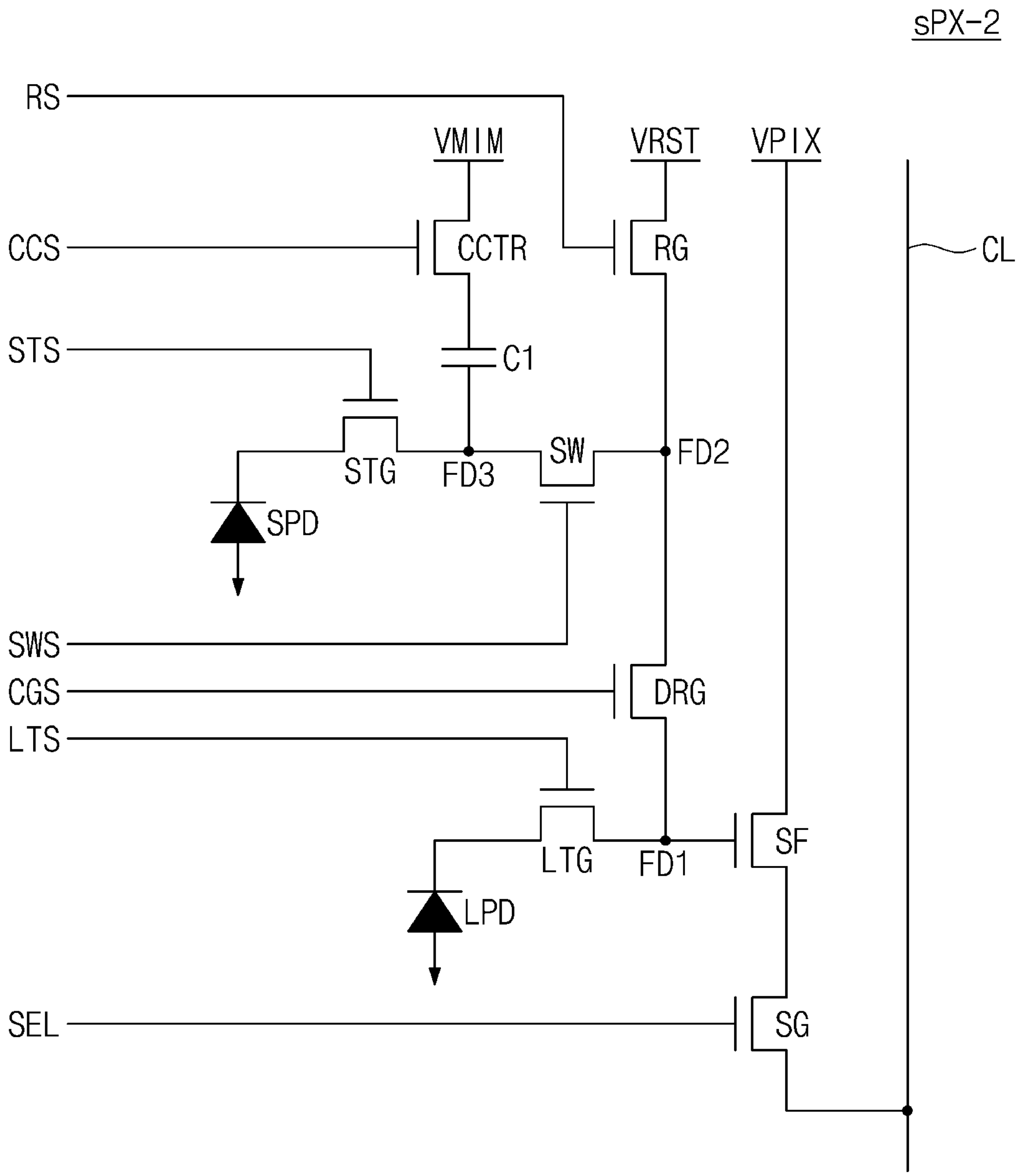
FIG. 23 is a circuit diagram illustrating a sub-pixel included in a pixel array of FIG. 22.

FIG. 22 is a block diagram illustrating an image sensor device according to an embodiment of the present disclosure. FIG. 23 is a circuit diagram illustrating a sub-pixel included in a pixel array of FIG. 22. Referring to FIGS. 22 and 23, an image sensor device 300 may include a pixel array 310, a row driver 320, a conversion circuit 330, a data output circuit 340, a digital logic circuit 350, and a control circuit 360. The data output circuit 340, the digital logic circuit 350, and the control circuit 360 are similar to those described above, and thus, additional description will be omitted to avoid redundancy.

The pixel array 310 may include a plurality of pixels arranged along a plurality of rows and a plurality of columns. Each of the plurality of pixels may include a plurality of sub-pixels. The plurality of sub-pixels may have a split photodiode structure. For example, as illustrated in FIG. 23, one sub-pixel sPX-2 may include a large photodiode LPD, a small photodiode SPD, a large transfer gate LTG, a source follower SF, a select gate SG, a gain control gate DRG, a reset gate RG, a switch SW, a capacitor control transistor CCTR, a small transfer gate STG, and a first capacitor C1.

The large transfer gate LTG may be connected between the large photodiode LPD and a first floating diffusion node FD1 and may operate in response to a large transfer signal LTS. The source follower SF may be connected between the pixel power supply voltage VPIX and the select gate SG and may operate in response to a level of the first floating diffusion node FD1.

The gain control gate DRG may be connected between the first floating diffusion node FD1 and a second floating diffusion node FD2 and may operate in response to a gain control signal CGS. The reset gate RG may be connected between the reset power supply voltage VRST and the second floating diffusion node FD2 and may operate in response to the reset signal RS.

The switch SW may be connected between the second floating diffusion node FD2 and a third floating diffusion node FD3 and may operate in response to a switching signal SWS. The small transfer gate STG may be connected between the small photodiode SPD and the third floating diffusion node FD3 and may operate in response to a small transfer signal STS.

The first capacitor C1 may be connected between the capacitor control transistor CCTR and the third floating diffusion node FD3. The capacitor control transistor CCTR may be connected between the first capacitor C1 and a capacitor power supply voltage VMIM and may operate in response to a capacitor control signal CCS.

In an embodiment, the large photodiode LPD and the small photodiode SPD may generate charges based on the light incident from the outside. The large photodiode LPD has a wider light reception area than the small photodiode SPD. That is, when the same light is incident, the large photodiode LPD may be quickly saturated compared to the small photodiode SPD. Accordingly, the large photodiode LPD may generate effective image information in a low-illuminance environment, and the small photodiode SPD may generate effective image information in a high-illuminance environment.

The large photodiode LPD and the small photodiode SPD may selectively operate depending on ambient illuminance of an object. For example, the large photodiode LPD may operate to generate a pixel signal in the low-illuminance environment; the small photodiode SPD may operate to generate a pixel signal in the high-illuminance environment, with an exposure time elongated. As the images obtained from the large photodiode LPD and the small photodiode SPD are merged, the dynamic range of the image sensor device 300 may be improved (i.e., the HDR may be implemented).

In an embodiment, the sub-pixel sPX-2 may support a dual conversion gain mode. For example, each of the large photodiode LPD and the small photodiode SPD of the sub-pixel sPX-2 may operate in a high conversion gain mode or a low conversion gain mode. The high conversion gain mode may be advantageous in the low-illuminance environment, and the low conversion gain mode may be advantageous in the high-illuminance environment. Accordingly, as each of the large photodiode LPD and the small photodiode SPD of the sub-pixel sPX-2 operates in the high conversion gain mode or the low conversion gain mode, the dynamic range of the image sensor device 300 may be improved (i.e., the HDR may be implemented).

In an embodiment, various row control signals (e.g., STS, LTS, SWS, RS, CGS, CCS, and SEL) for driving the sub-pixel sPX-2 may be driven or controlled by the row driver 320. In an embodiment, the row control signals (e.g., STS, LTS, SWS, RS, CGS, CCS, and SEL) for driving the sub-pixel sPX-2 may be controlled in units of pixel row on the pixel array 310. In an embodiment, as described above, the sub-pixels that are used to generate the ROI data DT ROI or the sub-data DT_sub may operate in response to individual row control signals. Even though the sub-pixels that are used to generate the ROI data DT_ROI or the sub-data DT_sub are located at the same row as the remaining sub-pixels, the sub-pixels may operate in response to independent row control signals.

The conversion circuit 330 may include a switching circuit 331, a high conversion gain ADC ADC_HCG and a low conversion gain ADC ADC_LCG. The switching circuit 331 may be connected to the pixel array 310 through the plurality of column lines CL. Depending on an operation of a plurality of pixels or a plurality of sub-pixels included in the pixel array 310, the switching circuit 331 may perform a switching operation such that the column lines CL are connected to the high conversion gain ADC ADC_HCG or the low conversion gain ADC ADC_LCG.

The high conversion gain ADC ADC_HCG may generate data based on the pixel signals received through the switching circuit 331. In this case, the data generated from the high conversion gain ADC ADC_HCG may be data corresponding to sub-pixels operating in the high conversion gain mode. The low conversion gain ADC ADC_LCG may generate data based on the pixel signals received through the switching circuit 331. In this case, the data generated from the low conversion gain ADC ADC_LCG may be data corresponding to sub-pixels operating in the low conversion gain mode.

For example, the image sensor device 300 may support various readout modes. As an example, the image sensor device 300 may perform the readout operation on the sub-pixel sPX-2 illustrated in FIG. 23. In this case, the readout operation on the sub-pixel sPX-2 may include LPD-HCG readout, LPD-LCG readout, SPD-HCG readout, and SPD-LCG readout. The LPD-HCG readout indicate an operation of reading out the pixel signal from the large photodiode LPD in the high conversion gain mode; the LPD-LCG readout indicates an operation of reading out the pixel signal from the large photodiode LPD in the low conversion gain mode; the SPD-HCG readout indicates an operation of reading out the pixel signal from the small photodiode SPD in the high conversion gain mode; and the SPD-LCG readout indicates an operation of reading out the pixel signal from the small photodiode SPD in the low conversion gain mode.

In this case, the image sensor device 300 may perform the LPD-HCG readout and the LPD-LCG readout with respect to the large photodiode LPD in the RRSS scheme. For example, the LPD-HCG readout may include reset level sampling (hereinafter, referred to as "reset sampling") with respect to the large photodiode LPD in the high conversion gain mode and signal level sampling (hereinafter, referred to as "signal sampling") with respect to the large photodiode LPD in the high conversion gain mode. The LPD-LCG readout may include reset level sampling (hereinafter, referred to as "reset sampling") with respect to the large photodiode LPD in the low conversion gain mode and signal level sampling (hereinafter, referred to as "signal sampling") with respect to the large photodiode LPD in the low conversion gain mode.

The RRSS scheme is a scheme in which the readout operation is performed in order of LPD-HCG reset sampling, LPD-LCG reset sampling, LPD-HCG signal sampling, and LPD-LCG signal sampling. In this case, to distinguish the pixel signal (or data) by the LPD-HCG readout and the pixel signal (or data) by the LPD-LCG readout, different ADCs need to be used for respective readouts. Accordingly, the LPD-HCG reset sampling and the LPD-HCG signal sampling may be performed by the high conversion gain ADC ADC_HCG, and the LPD-LCG reset sampling and the LPD-LCG signal sampling may be performed by the low conversion gain ADC ADC_LCG.

High conversion gain main data DT_M_H generated from the high conversion gain ADC ADC_HCG and low conversion gain main data DT_M_L generated from the low conversion gain ADC ADC_LCG may be provided to the data output circuit 340.

In an embodiment, some of the plurality of sub-pixels included in the pixel array 310 may be used to generate the ROI data DT_ROI (or the sub-data DT_sub). In an embodiment, a way to read out the sub-pixels used to generate the ROI data DT_ROI (or the sub-data DT_sub) (e.g., a way to perform the readout operations on different rows at the same time) is described above, and thus, additional description will be omitted to avoid redundancy.

In an embodiment, the pixel signals output from the sub-pixels used to generate the ROI data DT_ROI (or the sub-data DT_sub) may be provided to the low conversion gain ADC ADC_LCG, and the low conversion gain ADC ADC_LCG may generate the ROI data DT_ROI (or the sub-data DT_sub) based on the received pixel signals. That is, the low conversion gain ADC ADC_LCG may perform a function similar to that of the auxiliary ADC ADCa described with reference to FIGS. 1 to 21 under a given condition.

In an embodiment, as in the above description given with reference to FIGS. 1 to 21, even though the sub-pixels used to generate the ROI data DT_ROI (or the sub-data DT_sub) are located at the same column, to perform the readout operation at the same time with any other rows, the sub-pixels may be connected to different column lines. This is described above, and thus, additional description will be omitted to avoid redundancy.

As described above, the image sensor device 300 according to an embodiment of the present disclosure may include the plurality of sub-pixels having the split photodiode structure. The HDR of the image sensor device 300 may be easily implemented through the sub-pixel of the split photodiode structure. In an embodiment, the image sensor device 300 may simultaneously perform the readout operations on at least two rows for the purpose of generating the ROI data DT_ROI or the sub-data DT_sub. In this case, the low conversion gain ADC ADC_LCG that is used for HDR implementation in the image sensor device 300 may be used as an ADC that is used to generate the ROI data DT_ROI or the sub-data DT_sub. That is, because the image sensor device 300 does not additionally require an auxiliary ADC for generating the ROI data DT_ROI or the sub-data DT_sub, a hardware configuration of the image sensor device 300 may be simplified.

FIGS. 24 and 25 are diagrams for describing an operation of a conversion circuit according to a readout mode of an image sensor device of FIG. 23. For convenience of description, it is assumed that the image sensor device 300 generates the main data DT_M by performing the readout operation on pixels of one row based on the readout modes to be described with reference to FIG. 24 or 25. In this case, the image sensor device 300 may simultaneously perform the readout operations on different rows for the purpose of generating the ROI data DT_ROI or the sub-data DT_sub.

Referring to FIGS. 23 to 25, the image sensor device 300 may perform the readout operation on a plurality of pixels or a plurality of sub-pixels based on various readout modes. For example, the image sensor device 300 may perform the LPD-HCG readout operation, the LPD-LCG readout operation, the SPD-HCG readout operation, and the LPD-LCG readout operation.

In this case, as illustrated in FIG. 24, the image sensor device 300 may perform the LPD-HCG readout operation and the LPD-LCG readout operation based on the RRSS scheme. For example, to generate the main data DT_M, the image sensor device 300 may sequentially perform the LPD-HCG reset sampling, the LPD-LCG reset sampling, the LPD-HCG signal sampling, and the LPD-LCG signal sampling with respect to the sub-pixels.

Afterwards, the image sensor device 300 may perform the SPD-HCG readout operation and the SPD-LCG readout operation. In this case, the SPD-HCG readout operation and the SPD-LCG readout operation may be performed based on the RSSR scheme. For example, to generate the main data DT_M, the image sensor device 300 may sequentially perform the SPD-HCG reset sampling, the SPD-HCG signal sampling, the SPD-LCG signal sampling, and the SPD-LCG reset sampling with respect to the sub-pixels.

Because the LPD-HCG readout operation and the LPD-LCG readout operation are performed based on the RRSS scheme, the LPD-HCG reset sampling and the LPD-HCG signal sampling may be performed by the high conversion gain ADC ADC_HCG, and the LPD-LCG reset sampling and the LPD-HCG signal sampling may be performed by the low conversion gain ADC ADC_LCG. As such, information corresponding to the main data DT_M may be output from the high conversion gain ADC ADC_HCG and the low conversion gain ADC ADC_LCG through the LPD-HCG readout operation and the LPD-LCG readout operation.

Because the SPD-HCG readout operation and the SPD-LCG readout operation are performed based on the RSSR scheme, the SPD-HCG reset sampling, the SPD-HCG signal sampling, the SPD-LCG signal sampling, and the SPD-LCG reset sampling may be performed by the same ADC (e.g., the high conversion gain ADC ADC_HCG). As such, information corresponding to the main data DT_M may be output from the high conversion gain ADC ADC_HCG through the SPD-HCG readout operation and the SPD-LCG readout operation.

In an embodiment, the image sensor device 300 according to an embodiment of the present disclosure may generate the main data DT_M together with the ROI data DT_ROI or the sub-data DT_sub. A separate ADC is required to generate the ROI data DT_ROI or the sub-data DT_sub. In this case, as illustrated in FIG. 24, when the SPD-HCG readout operation and the SPD-LCG readout operation are performed in the RSSR scheme, the low conversion gain ADC ADC_LCG is not used. As such, the image sensor device 300 according to an embodiment of the present disclosure may perform the SPD-HCG readout operation and the SPD-LCG readout operation in the RSSR scheme and may simultaneously perform the readout operation on a specific sub-pixel of any other row to generate the ROI data DT_ROI or the sub-data DT_sub.

In this case, the ROI data DT_ROI or the sub-data DT_sub may be generated by performing the readout operation with respect to a row different from the row of the main data DT_M in a scheme similar to that of the SPD-HCG readout operation and the SPD-LCG readout operation, and thus, the dynamic range of the ROI data DT_ROI or the sub-data DT_sub may be improved.

In an embodiment, as illustrated in FIG. 25, the image sensor device 300 may perform the LPD-HCG readout operation and the LPD-LCG readout operation in the RSSR scheme and may perform the SPD-HCG readout operation and the SPD-LCG readout operation in the RSSR scheme. In this case, like the SPD-HCG readout operation and the SPD-LCG readout operation described with reference to FIG. 24, the image sensor device 300 may perform the LPD-HCG readout operation, the LPD-LCG readout operation, the SPD-HCG readout operation, and the SPD-LCG readout operation by using the high conversion gain ADC ADC_HCG. That is, the low conversion gain ADC ADC_LCG may be used to generate the ROI data DT_ROI or the sub-data DT_sub. In this case, because the LPD-HCG readout operation, the LPD-LCG readout operation, the SPD-HCG readout operation, and the SPD-LCG readout operation are performed in the RSSR scheme with respect to the sub-pixels used to generate the ROI data DT_ROI or the sub-data DT_sub, the dynamic range of the ROI data DT_ROI or the sub-data DT_sub may be improved.

As described above, the image sensor device 300 may include the plurality of sub-pixels having the split photodiode structure. In this case, the image sensor device 300 may support the dual conversion gain with respect to the plurality of sub-pixels and may include the high conversion gain ADC ADC_HCG for generating main data corresponding to the high conversion gain and the low conversion gain ADC ADC_LCG for generating main data corresponding to the low conversion gain. According to the above description, in a specific readout mode (e.g., a readout mode or readout period where the low conversion gain ADC ADC_LCG is not used), the image sensor device 300 may perform the readout operation on sub-pixels for generating the ROI data DT_ROI or the sub-data DT_sub by using the low conversion gain ADC ADC_LCG. Accordingly, there may be a minimal change of hardware for generating the ROI data DT_ROI or the sub-data DT_sub.

Figure 26:
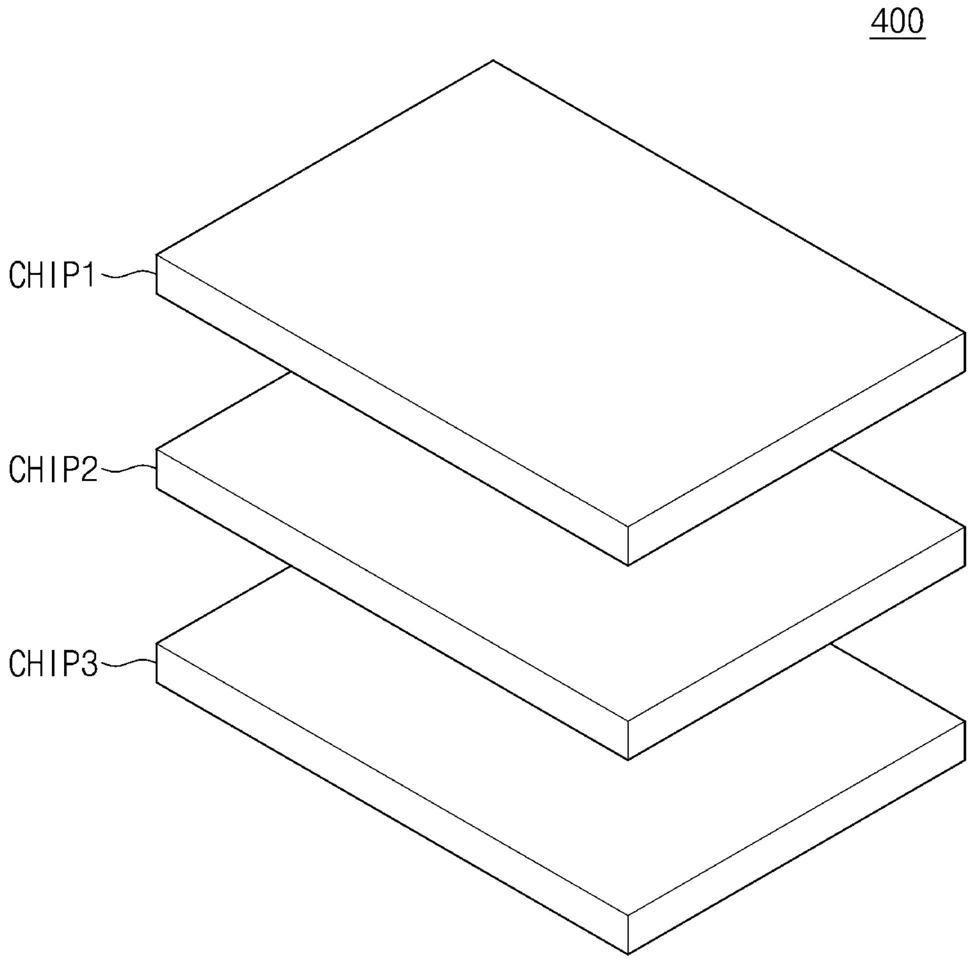
FIG. 26 is a diagram illustrating an image sensor device according to an embodiment of the present disclosure.

FIG. 26 is a diagram illustrating an image sensor device according to an embodiment of the present disclosure. Referring to FIG. 26, an image sensor device 400 may include a plurality of chips CHIP1 to CHIP3. In an embodiment, the image sensor device 400 may have a structure in which the plurality of chips CHIP1 to CHIP3 are stacked.

The first chip CHIP1 may include a pixel array included in the image sensor device 400. The second chip CHIP2 may include various analog circuits (e.g., an ADC, a row driver, and a ramp generator) used in the image sensor device 400. The third chip CHIP3 may include various digital circuits (e.g., a digital logic circuit and a memory circuit) used in the image sensor device 400. However, the present disclosure is not limited thereto. For example, components of the image sensor device 400 may be distributed and disposed in the first to third chips CHIP1 to CHIP3.

In an embodiment, the first to third chips CHIP 1 to CHIP3 may be stacked based on various methods such as C2C bonding and a combination of a through-hole and a metal pad.

Figures 26, 27:
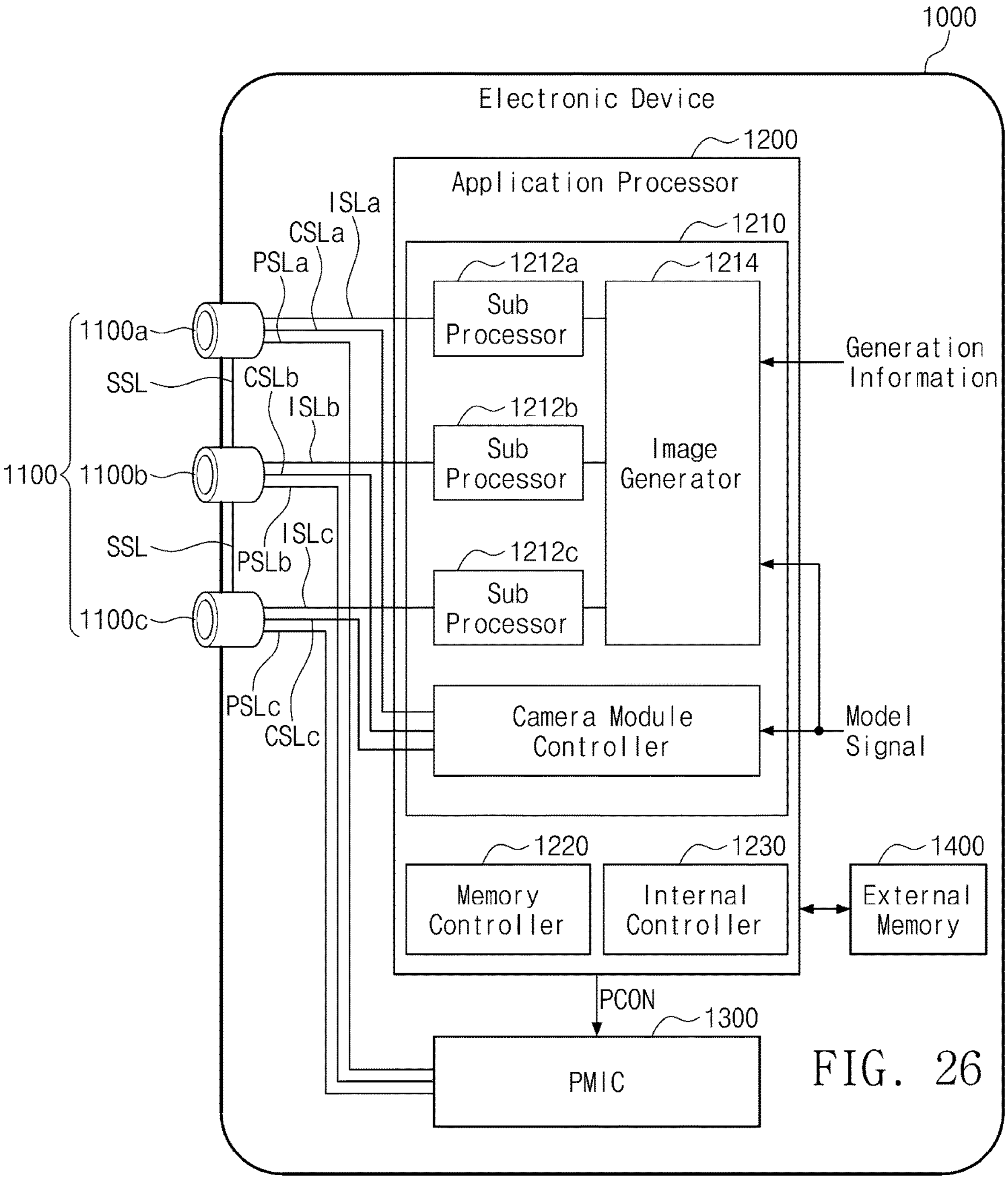
FIG. 27 is a block diagram of an electronic device including a multi-camera module.
Figure 28:
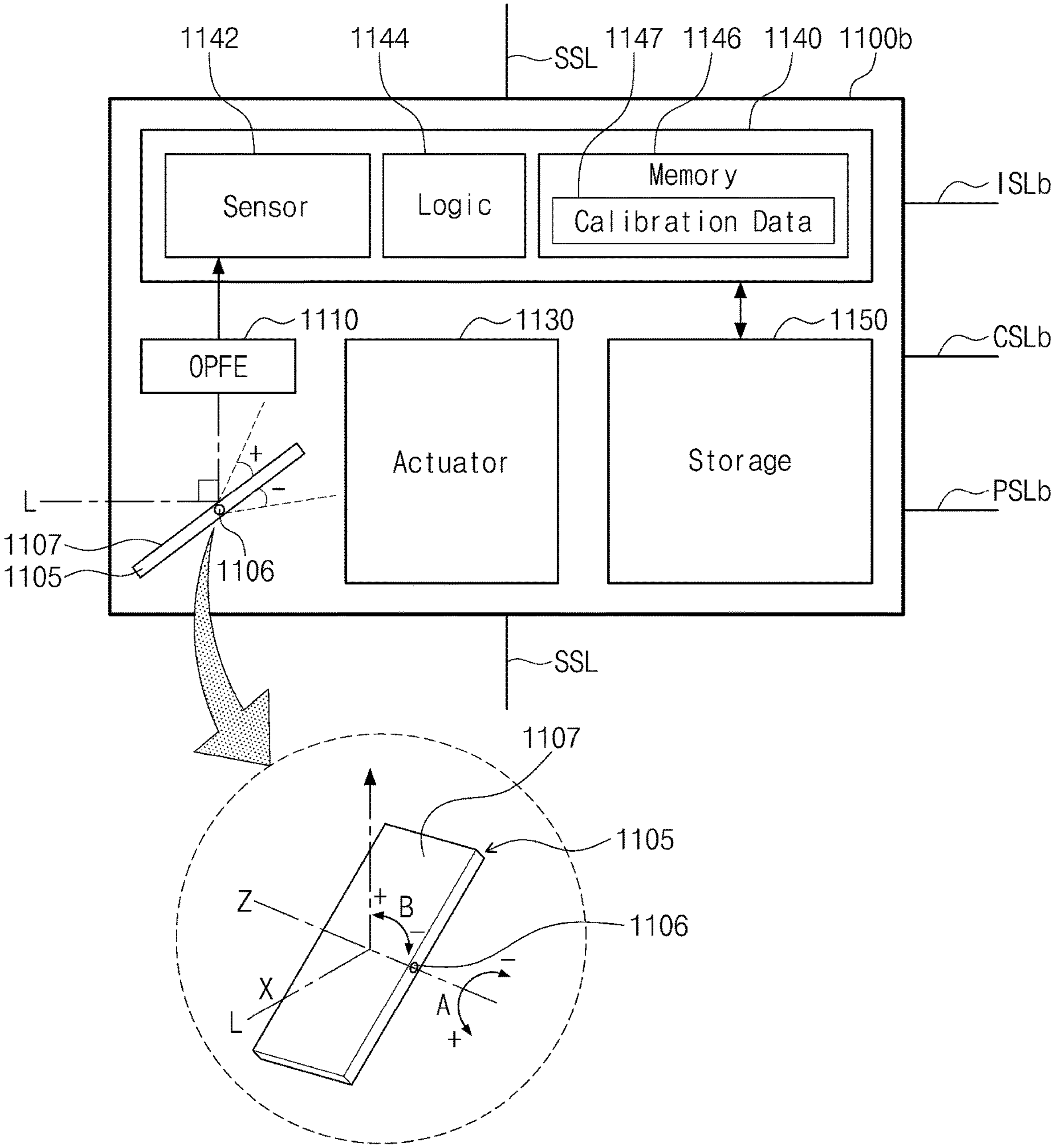
FIG. 28 is a block diagram illustrating a camera module of FIG. 27 in detail.

FIG. 27 is a block diagram of an electronic device including a multi-camera module. FIG. 28 is a block diagram illustrating a camera module of FIG. 27 in detail.

Referring to FIG. 27, an electronic device 1000 may include a camera module group 1100, an application processor 1200, a PMIC 1300, and an external memory 1400.

The camera module group 1100 may include a plurality of camera modules 1100*a*, 1100*b*, and 1100*c*. An electronic device including three camera modules 1100*a*, 1100*b*, and 1100*c* is illustrated in FIG. 27, but the present disclosure is not limited thereto. In some embodiments, the camera module group 1100 may be modified to include only two camera modules. Also, in some embodiments, the camera module group 1100 may be modified to include "n" camera modules (n being a natural number of 4 or more).

Below, a detailed configuration of the camera module 1100*b* will be more fully described with reference to FIG. 28, but the following description may be equally applied to the remaining camera modules 1100*a* and 1100*c*.

Referring to FIG. 28, the camera module 1100*b* may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some embodiments, as illustrated in FIG. 28, a maximum rotation angle of the prism 1105 in direction "A" may be equal to or smaller than 15 degrees in a positive A direction and may be greater than 15 degrees in a negative A direction, but the present disclosure is not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., Z direction) parallel to a direction in which the central axis 1106 extends.

The OPFE 1110 may include optical lenses composed of "m" groups (m being a natural number), for example. Here, "m" lens may move in the second direction (Y) to change an optical zoom ratio of the camera module 1100*b*. For example, when a default optical zoom ratio of the camera module 1100*b* is "Z", the optical zoom ratio of the camera module 1100*b* may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100*b*. For example, the control logic 1144 may control an operation of the camera module 1100*b* based on a control signal provided through a control signal line CSLb.

The memory 1146 may store information, which is necessary for an operation of the camera module 1100*b*, such as calibration data 1147. The calibration data 1147 may include information necessary for the camera module 1100*b* to generate image data by using the light "L" provided from the outside. The calibration data 1147 may include, for example, information about the degree of rotation described above, information about a focal length, information about an optical axis, etc. In the case where the camera module 1100*b* is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but the present disclosure is not limited thereto.

Referring together to FIGS. 27 and 28, in some embodiments, each of the plurality of camera modules 1100*a*, 1100*b*, and 1100*c* may include the actuator 1130. As such, the same calibration data 1147 or different calibration data 1147 may be included in the plurality of camera modules 1100*a*, 1100*b*, and 1100*c* depending on operations of the actuators 1130 therein.

In some embodiments, one camera module (e.g., 1100*b*) among the plurality of camera modules 1100*a*, 1100*b*, and 1100*c* may be a folded lens shape of camera module in which the prism 1105 and the OPFE 1110 described above are included, and the remaining camera modules (e.g., 1100*a* and 1100*c*) may be a vertical shape of camera module in which the prism 1105 and the OPFE 1110 described above are not included; however, the present disclosure is not limited thereto.

In some embodiments, one camera module (e.g., 1100*c*) among the plurality of camera modules 1100*a*, 1100*b*, and 1100*c* may be, for example, a vertical shape of depth camera extracting depth information by using an infrared ray (IR). In this case, the application processor 1200 may merge image data provided from the depth camera and image data provided from any other camera module (e.g., 1100*a* or 1100*b*) and may generate a three-dimensional (3D) depth image.

In some embodiments, at least two camera modules (e.g., 1100*a* and 1100*b*) among the plurality of camera modules 1100*a*, 1100*b*, and 1100*c* may have different fields of view. In this case, the at least two camera modules (e.g., 1100*a* and 1100*b*) among the plurality of camera modules 1100*a*, 1100*b*, and 1100*c* may include different optical lens, but the present disclosure is not limited thereto.

Also, in some embodiments, fields of view of the plurality of camera modules 1100*a*, 1100*b*, and 1100*c* may be different. In this case, the plurality of camera modules 1100*a*, 1100*b*, and 1100*c* may include different optical lenses, not limited thereto.

In some embodiments, the plurality of camera modules 1100*a*, 1100*b*, and 1100*c* may be disposed to be physically separated from each other. That is, the plurality of camera modules 1100*a*, 1100*b*, and 1100*c* may not use a sensing area of one image sensor 1142, but the plurality of camera modules 1100*a*, 1100*b*, and 1100*c* may include independent image sensors 1142 therein, respectively.

Returning to FIG. 27, the application processor 1200 may include an image processing device 1210, a memory controller 1220, and an internal memory 1230. The application processor 1200 may be implemented to be separated from the plurality of camera modules 1100*a*, 1100*b*, and 1100*c*. For example, the application processor 1200 and the plurality of camera modules 1100*a*, 1100*b*, and 1100*c* may be implemented with separate semiconductor chips.

The image processing device 1210 may include a plurality of sub image processors 1212*a*, 1212*b*, and 1212*c*, an image generator 1214, and a camera module controller 1216.

The image processing device 1210 may include the plurality of sub image processors 1212*a*, 1212*b*, and 1212*c*, the number of which corresponds to the number of the plurality of camera modules 1100*a*, 1100*b*, and 1100*c*.

Image data respectively generated from the camera modules 1100*a*, 1100*b*, and 1100*c* may be respectively provided to the corresponding sub image processors 1212*a*, 1212*b*, and 1212*c* through separated image signal lines ISLa, ISLb, and ISLc. For example, the image data generated from the camera module 1100*a* may be provided to the sub image processor 1212*a* through the image signal line ISLa, the image data generated from the camera module 1100*b* may be provided to the sub image processor 1212*b* through the image signal line ISLb, and the image data generated from the camera module 1100*c* may be provided to the sub image processor 1212*c* through the image signal line ISLc. This image data transmission may be performed, for example, by using a camera serial interface (CSI) based on the MIPI (Mobile Industry Processor Interface), but the present disclosure is not limited thereto.

Meanwhile, in some embodiments, one sub image processor may be disposed to correspond to a plurality of camera modules. For example, the sub image processor 1212*a* and the sub image processor 1212*c* may be integrally implemented, not separated from each other as illustrated in FIG. 16; in this case, one of the pieces of image data respectively provided from the camera module 1100*a* and the camera module 1100*c* may be selected through a selection element (e.g., a multiplexer), and the selected image data may be provided to the integrated sub image processor.

The image data respectively provided to the sub image processors 1212*a*, 1212*b*, and 1212*c* may be provided to the image generator 1214. The image generator 1214 may generate an output image by using the image data respectively provided from the sub image processors 1212*a*, 1212*b*, and 1212*c*, depending on image generating information Generating Information or a mode signal.

In detail, the image generator 1214 may generate the output image by merging at least a portion of the image data respectively generated from the camera modules 1100*a*, 1100*b*, and 1100*c* having different fields of view, depending on the image generating information (i.e., "Generating Information") or the mode signal. Also, the image generator 1214 may generate the output image by selecting one of the image data respectively generated from the camera modules 1100*a*, 1100*b*, and 1100*c* having different fields of view, depending on the i Generating Information or the mode signal.

In some embodiments, the Generating Information may include a zoom signal or a zoom factor. Also, in some embodiments, the mode signal may be, for example, a signal based on a mode selected from a user.

In the case where the Generating Information is the zoom signal (or zoom factor) and the camera modules 1100*a*, 1100*b*, and 1100*c* have different visual fields of view, the image generator 1214 may perform different operations depending on a kind of the zoom signal. For example, in the case where the zoom signal is a first signal, the image generator 1214 may merge the image data output from the camera module 1100*a* and the image data output from the camera module 1100*c* and may generate the output image by using the merged image signal and the image data output from the camera module 1100*b* that is not used in the merging operation. In the case where the zoom signal is a second signal different from the first signal, without the image data merging operation, the image generator 1214 may select one of the image data respectively output from the camera modules 1100*a*, 1100*b*, and 1100*c* and may output the selected image data as the output image. However, the present disclosure is not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212*a*, 1212*b*, and 1212*c* and performing high dynamic range (HDR) processing on the plurality of image data.

The camera module controller 1216 may provide control signals to the camera modules 1100*a*, 1100*b*, and 1100*c*, respectively. The control signals generated from the camera module controller 1216 may be respectively provided to the corresponding camera modules 1100*a*, 1100*b*, and 1100*c* through control signal lines CSLa, CSLb, and CSLc separated from each other.

One of the plurality of camera modules 1100*a*, 1100*b*, and 1100*c* may be designated as a primary camera (e.g., 1100*b*) depending on the Generating Information including a zoom signal or the mode signal, and the remaining camera modules (e.g., 1100*a* and 1100*c*) may be designated as a secondary camera. The above designation information may be included in the control signals, and the control signals including the designation information may be respectively provided to the corresponding camera modules 1100*a*, 1100*b*, and 1100*c* through the control signal lines CSLa, CSLb, and CSLc separated from each other.

Camera modules operating as a primary and a secondary may be changed depending on the zoom factor or an operating mode signal. For example, in the case where the field of view of the camera module 1100*a* is wider than the field of view of the camera module 1100*b* and the zoom factor indicates a low zoom ratio, the camera module 1100*b* may operate as a primary, and the camera module 1100*a* may operate as a secondary. In contrast, in the case where the zoom factor indicates a high zoom ratio, the camera module 1100*a* may operate as a primary, and the camera module 1100*b* may operate as a secondary.

In some embodiments, the control signal provided from the camera module controller 1216 to each of the camera modules 1100*a*, 1100*b*, and 1100*c* may include a sync enable signal. For example, in the case where the camera module 1100*b* is used as a primary camera and the camera modules 1100*a* and 1100*c* are used as a secondary camera, the camera module controller 1216 may transmit the sync enable signal to the camera module 1100*b*. The camera module 1100*b* that is provided with sync enable signal may generate a sync signal based on the provided sync enable signal and may provide the generated sync signal to the camera modules 1100*a* and 1100*c* through a sync signal line SSL. The camera module 1100*b* and the camera modules 1100*a* and 1100*c* may be synchronized with the sync signal to transmit image data to the application processor 1200.

In some embodiments, the control signal provided from the camera module controller 1216 to each of the camera modules 1100*a*, 1100*b*, and 1100*c* may include mode information according to the mode signal. Based on the mode information, the plurality of camera modules 1100*a*, 1100*b*, and 1100*c* may operate in a first operating mode and a second operating mode with regard to a sensing speed.

In the first operating mode, the plurality of camera modules 1100*a*, 1100*b*, and 1100*c* may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the memory 1230 provided therein or the external memory 1400 placed outside the application processor 1200. Afterwards, the application processor 1200 may read and decode the encoded image signals from the memory 1230 or the external memory 1400 and may display image data generated based on the decoded image signals. For example, the corresponding one among sub image processors 1212*a*, 1212*b*, and 1212*c* of the image processing device 1210 may perform decoding and may also perform image processing on the decoded image signal.

In the second operating mode, the plurality of camera modules 1100*a*, 1100*b*, and 1100*c* may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the memory 1230 or the external memory 1400.

The PMIC 1300 may supply powers, for example, power supply voltages to the plurality of camera modules 1100*a*, 1100*b*, and 1100*c*, respectively. For example, under control of the application processor 1200, the PMIC 1300 may supply a first power to the camera module 1100*a* through a power signal line PSLa, may supply a second power to the camera module 1100*b* through a power signal line PSLb, and may supply a third power to the camera module 1100*c* through a power signal line PSLc.

In response to a power control signal PCON from the application processor 1200, the PMIC 1300 may generate a power corresponding to each of the plurality of camera modules 1100*a*, 1100*b*, and 1100*c* and may adjust a level of the power. The power control signal PCON may include a power adjustment signal for each operating mode of the plurality of camera modules 1100*a*, 1100*b*, and 1100*c*. For example, the operating mode may include a low-power mode. In this case, the power control signal PCON may include information about a camera module operating in the low-power mode and a set power level. Levels of the powers respectively provided to the plurality of camera modules 1100*a*, 1100*b*, and 1100*c* may be identical to each other or may be different from each other. Also, a level of a power may be dynamically changed.

In an embodiment, each or at least some of the plurality of camera modules 1100*a*, 1100*b*, and 1100*c* may include the image sensor device 100/300 described with reference to FIGS. 1 to 26. That is, each or at least some of the plurality of camera modules 1100*a*, 1100*b*, and 1100*c* may simultaneously perform the readout operations on at least two rows and thus may simultaneously generate main data, ROI data, and sub-data. Accordingly, without the decrease in the frame rate of the main data, each or at least some of the plurality of camera modules 1100*a*, 1100*b*, and 1100*c* may support a fast frame rate with respect to the range of interest or may provide the sub-data. The main data, the ROI data, or the sub-data provided from each or at least some of the plurality of camera modules 1100*a*, 1100*b*, and 1100*c* may be used or processed by the application processor 1200.

Figure 29:
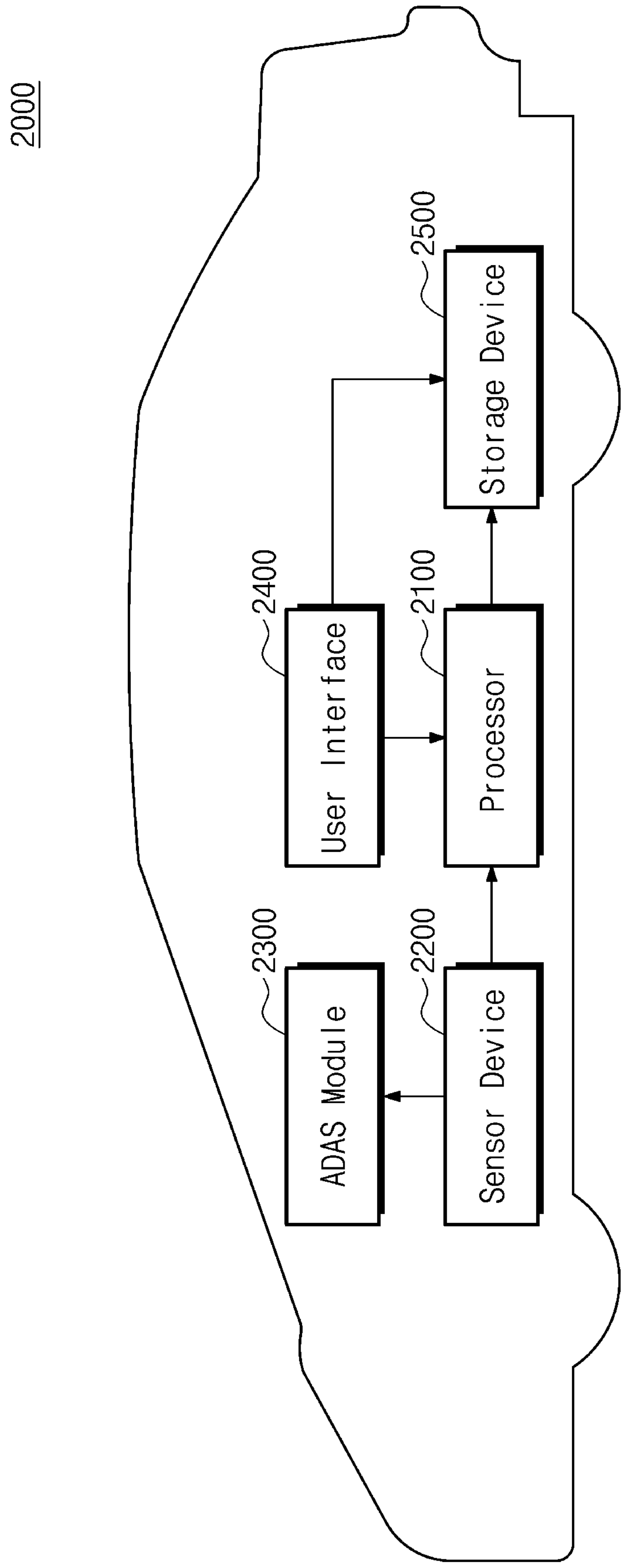
FIG. 29 is a diagram illustrating an automated driving system to which an image sensor device according to an embodiment of the present disclosure is applied.

FIG. 29 is a diagram illustrating an automated driving system to which an image sensor device according to an embodiment of the present disclosure may be applied. Referring to FIG. 29, an automated driving system 2000 may include a processor 2100, a sensor device 2200, an advanced driver assistance system (ADAS) module 2300, a user interface 2400, and a storage device 2500. In an embodiment, the automated driving system 2000 may be included in an automotive electronic system. The automated driving system 2000 may assist a driver such that driving of the vehicle is assisted, or may autonomously control the driving of the vehicle without the intervention of the driver or with the intervention of the driver minimized.

The processor 2100 may control an overall operation of the automated driving system 2000. The sensor device 2200 may be configured to sense various operation or sensing information of the automated driving system 2000. Alternatively, the sensor device 2200 may be configured to capture the front, rear, or side view of the automated driving system 2000 or the vehicle mounted with the automated driving system 2000.

The ADAS module 2300 may control operations (e.g., a steering operation, a braking operation, and an acceleration operation) of the automated driving system 2000 based on the sensing information from the sensor device 2200. In an embodiment, the sensor device 2200 may include the image sensor device described with reference to FIGS. 1 to 28. That is, the sensor device 2200 may provide an image of a fast frame rate with respect to the range of interest ROI. In this case, it may be easy to identify an obstacle located in a specific range of the front, rear, or side of the vehicle. Accordingly, the ADAS module 2300 may control the vehicle more accurately.

The user interface 2400 may provide information about the automated driving system 2000 to the driver or user or may receive information about the control of the automated driving system 2000 from the driver or user. For example, the user interface 2400 may be connected to an automotive control device such as a steering device, a braking device, an acceleration device, or a power device and may obtain various information to be provided to the driver through the automotive control device. Alternatively, the user interface 2400 may include a touch display panel that provides information about the automated driving system 2000 or the vehicle to the driver or receives information from the driver through the touch or operation of the driver.

The storage device 2500 may be configured to store information about the operation of the automated driving system 2000. In an embodiment, the storage device 2500 may be a data storage system for automated driving (DS-SAD).

According to embodiments, an image sensor device may simultaneously perform the readout operations on at least two pixel rows. In this case, without the decrease in the frame rate of the entire range, the image sensor device may support a fast frame rate with respect to a specific range (e.g., a range of interest) or may provide sub-frame data for improving the quality of image. Accordingly, an image sensor device with improved performance and an operation method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor device comprising:

a first pixel located at a first row and a first column, corresponding to a first color filter, and configured to output a first pixel signal through a first column line;

a second pixel located at a second row different from the first row and the first column, corresponding to the first color filter, and configured to output a second pixel signal through a second column line;

a third pixel located at the first row and the first column, corresponding to a second color filter, and configured to output a third pixel signal through a third column line;

a fourth pixel located at the first row and the first column, corresponding to a third color filter, and configured to output a fourth pixel signal through a fourth column line;

a fifth pixel located at the first row and the first column, corresponding to a fourth color filter, and configured to output a fifth pixel signal through a fifth column line; and a conversion circuit configured to receive the first pixel signal through the first column line, receive the second pixel signal through the second column line, and generate first image data and second image data based on the first pixel signal and the second pixel signal, wherein the first pixel signal and the second pixel signal are respectively output through the first column line and the second column line simultaneously, and wherein the third pixel signal, the fourth pixel signal, and the fifth pixel signal are respectively output through the third column line, the fourth column line, and the fifth column line simultaneously with the first pixel signal and the second pixel signal.

2. The image sensor device of claim 1, wherein the conversion circuit is further configured to:

further receive the third pixel signal, the fourth pixel signal, and the fifth pixel signal through the third column line, the fourth column line, and the fifth column line, respectively; and generate the first image data based on the first pixel signal, the third pixel signal, the fourth pixel signal, and the fifth pixel signal.

3. The image sensor device of claim 1, further comprising:

a sixth pixel located at the second row and the first column, corresponding to the second color filter, and configured to output a sixth pixel signal through a sixth column line, wherein the sixth pixel signal is output through the sixth column line simultaneously with the first pixel signal and the second pixel signal.

4. The image sensor device of claim 3, wherein the conversion circuit is further configured to:

receive the sixth pixel signal through the sixth column line; and generate third image data based on the sixth pixel signal.

5. The image sensor device of claim 1, wherein a second frame rate corresponding to the second image data is higher than a first frame rate corresponding to the first image data.

6. The image sensor device of claim 5, wherein a range expressed by the second image data is a portion of a range expressed by the first image data.

7. The image sensor device of claim 1, wherein a first frame rate corresponding to the first image data is identical to a second frame rate corresponding to the second image data.

8. The image sensor device of claim 7, wherein a range expressed by the first image data corresponds to a range expressed by the second image data.

9. The image sensor device of claim 1, wherein each of the first pixel and the second pixel has a split photodiode structure including a large photodiode and a small photodiode.

10. The image sensor device of claim 9, wherein the first pixel signal includes:

a first component pixel signal output from the large photodiode of the first pixel in a first high conversion mode;

a second component pixel signal output from the large photodiode of the first pixel in a first low conversion mode;

a third component pixel signal output from the small photodiode of the first pixel in a second high conversion mode; and a fourth component pixel signal output from the small photodiode of the first pixel in a second low conversion mode.

11. The image sensor device of claim 10, wherein the conversion circuit includes:

a first analog-to-digital converter (ADC) configured to sample the first component pixel signal, the third component pixel signal, and the fourth component pixel signal; and a second ADC configured to sample the second component pixel signal, wherein the second ADC samples the second component pixel signal while the first ADC samples the first component pixel signal, the third component pixel signal, and the fourth component pixel signal, and wherein the first image data are based on a result of sampling the first component pixel signal, the third component pixel signal, and the fourth component pixel signal by the first ADC and a result of sampling the second component pixel signal by the second ADC.

12. An image sensor device comprising:

a first pixel located at a first row and a first column, corresponding to a first color filter, and configured to output a first pixel signal through a first column line;

a second pixel located at a second row different from the first row and the first column, corresponding to the first color filter, and configured to output a second pixel signal through a second column line;

a switching circuit connected to the first column line and the second column line;

a first analog-to-digital converter (ADC) configured to receive one of the first pixel signal and the second pixel signal from the switching circuit and to generate first image data by sampling the one pixel signal thus received; and a second ADC configured to receive the other of the first pixel signal and the second pixel signal from the switching circuit and to generate second image data by sampling the other pixel signal thus received, wherein, when the first pixel is associated with the first image data, the switching circuit performs a first switching operation such that the first column line is connected to the first ADC and the second column line is connected to the second ADC, and wherein, when the first pixel is associated with the second image data, the switching circuit performs a second switching operation such that the first column line is connected to the second ADC and the second column line is connected to the first ADC.

* * * * *